US012151922B2

(12) United States Patent
Zahdeh et al.

(10) Patent No.: US 12,151,922 B2
(45) Date of Patent: Nov. 26, 2024

(54) AUTONOMOUS TRANSPORT VEHICLE WITH SYNERGISTIC VEHICLE DYNAMIC RESPONSE

(71) Applicant: Symbotic LLC, Wilmington, MA (US)

(72) Inventors: Akram Zahdeh, Wilmington, MA (US); Todd Kepple, Wilmington, MA (US); Edward MacDonald, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 367 days.

(21) Appl. No.: 17/664,948

(22) Filed: May 25, 2022

(65) Prior Publication Data

US 2022/0402736 A1 Dec. 22, 2022

Related U.S. Application Data

(60) Provisional application No. 63/213,589, filed on Jun. 22, 2021.

(51) Int. Cl.
| | |
|---|---|
| *B66F 9/075* | (2006.01) |
| *B25J 5/00* | (2006.01) |
| *B25J 19/00* | (2006.01) |
| *B62D 21/11* | (2006.01) |
| *B62D 21/18* | (2006.01) |
| *B66F 9/06* | (2006.01) |

(52) U.S. Cl.
CPC ........... *B66F 9/07586* (2013.01); *B25J 5/007* (2013.01); *B25J 19/0091* (2013.01); *B62D 21/11* (2013.01); *B62D 21/18* (2013.01); *B66F 9/063* (2013.01); *B66F 9/07559* (2013.01)

(58) Field of Classification Search
CPC ...................................................... B60G 23/00
See application file for complete search history.

(56) References Cited

U.S. PATENT DOCUMENTS

| | | | | |
|---|---|---|---|---|
| 5,348,326 A | * | 9/1994 | Fullenkamp | A61G 1/042 280/43 |
| 8,397,367 B2 | * | 3/2013 | Melone | A01D 34/64 29/469 |

(Continued)

FOREIGN PATENT DOCUMENTS

| | | | | |
|---|---|---|---|---|
| CN | 111605643 A | * | 9/2020 | ........... B60K 7/0007 |
| CN | 211493575 U | * | 9/2020 | |

(Continued)

*Primary Examiner* — Nicole T Verley
(74) *Attorney, Agent, or Firm* — Perman & Green, LLP

(57) ABSTRACT

An autonomous transport robot for transporting a payload is provided and includes a frame with an integral payload support, a transfer arm connected to the frame for autonomous transfer of payload to and from the frame, and a drive section with at least a pair of traction drive wheels astride the drive section, the drive section being connected to the frame. The at least the pair of traction drive wheels have a fully independent suspension coupling each traction drive wheel of the at least the pair of traction drive wheels to the frame, with at least one intervening pivot link between at least one traction drive wheel and the frame configured to maintain a substantially steady state traction contact patch between the at least one traction drive wheel and a rolling surface over rolling surface transients throughout traverse of the at least one traction drive wheel over the rolling surface.

20 Claims, 31 Drawing Sheets

(56) References Cited

U.S. PATENT DOCUMENTS

| | | | |
|---|---|---|---|
| 9,187,244 B2 * | 11/2015 | Toebes | ................ B65G 1/0492 |
| 11,077,708 B2 | 8/2021 | Kwa et al. | |
| 11,760,148 B2 * | 9/2023 | Smith | ................. B60W 40/10 |
| | | | 701/37 |
| 2012/0195724 A1 * | 8/2012 | Toebes | .................. B62D 53/00 |
| | | | 280/124.1 |
| 2014/0339788 A1 * | 11/2014 | Toebes | .................. B62D 53/00 |
| | | | 280/400 |
| 2022/0267091 A1 * | 8/2022 | Ota | ....................... B66F 9/0755 |
| 2023/0050980 A1 * | 2/2023 | Zahdeh | ................... G01S 17/89 |
| 2023/0234397 A1 * | 7/2023 | Dada | .................... B60B 33/066 |
| | | | 16/19 |

FOREIGN PATENT DOCUMENTS

| | | | | |
|---|---|---|---|---|
| CN | 112224732 A | * | 1/2021 | ........... B65G 1/0407 |
| CN | 113184072 A | * | 7/2021 | |
| CN | 114393965 A | * | 4/2022 | |
| CN | 216301281 U | * | 4/2022 | |
| FR | 3035875 A1 | * | 11/2016 | ........... B62B 3/0618 |
| JP | 2008155652 A | * | 7/2008 | |
| JP | 4577305 B2 | * | 11/2010 | |
| JP | 2014237359 A | * | 12/2014 | |
| WO | WO-2011044405 A1 | * | 4/2011 | ............... A61G 5/04 |
| WO | WO-2017197121 A1 | * | 11/2017 | ........... B65G 1/0478 |

* cited by examiner

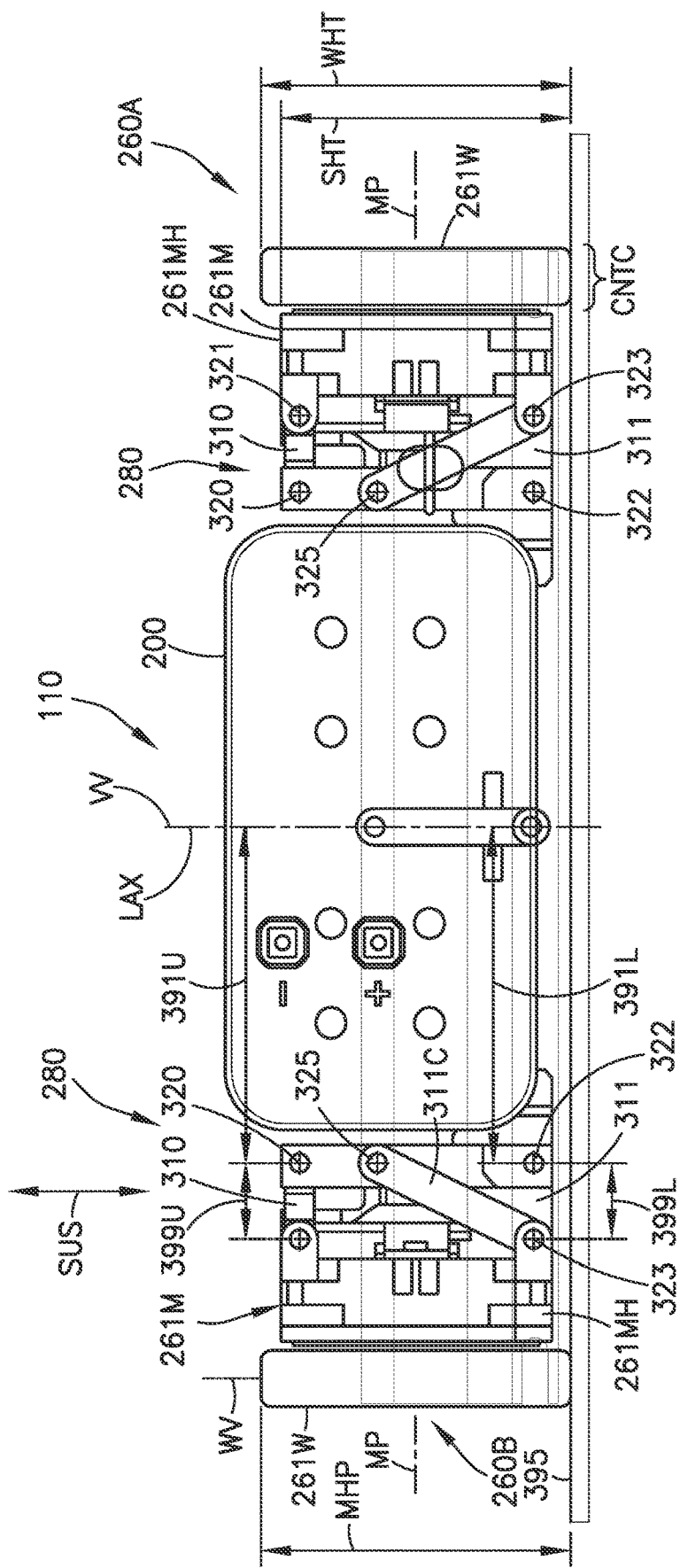

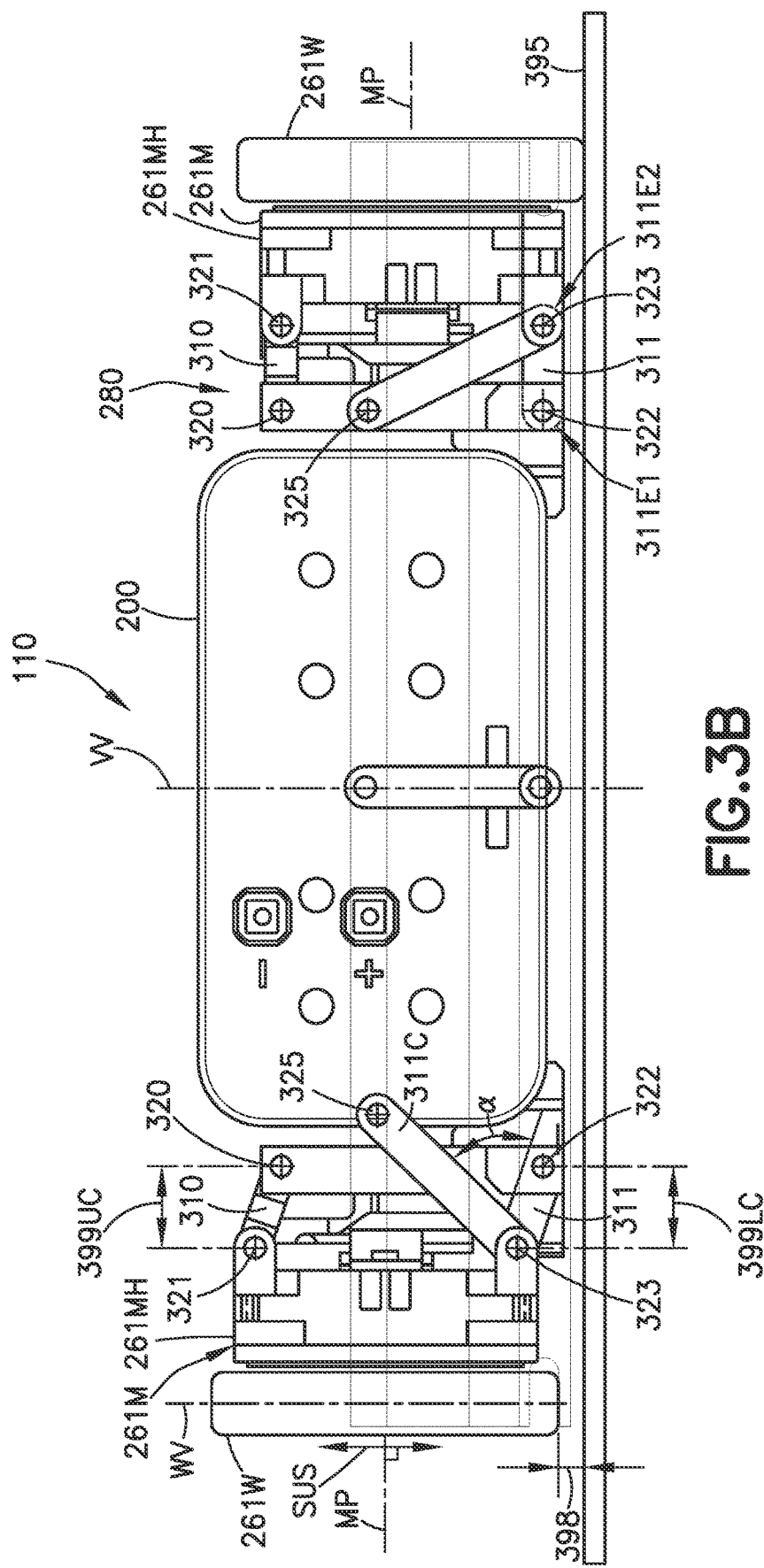

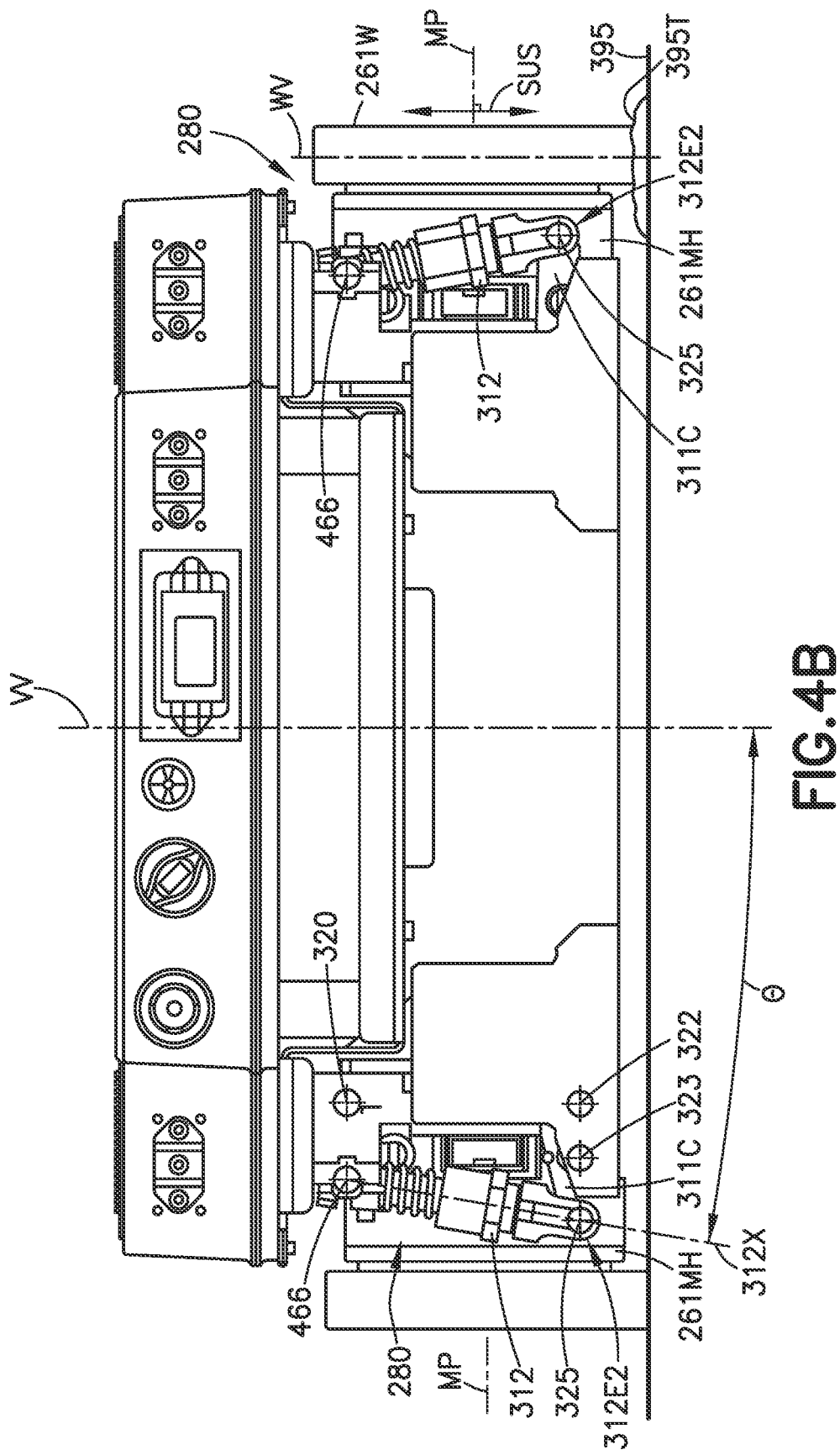

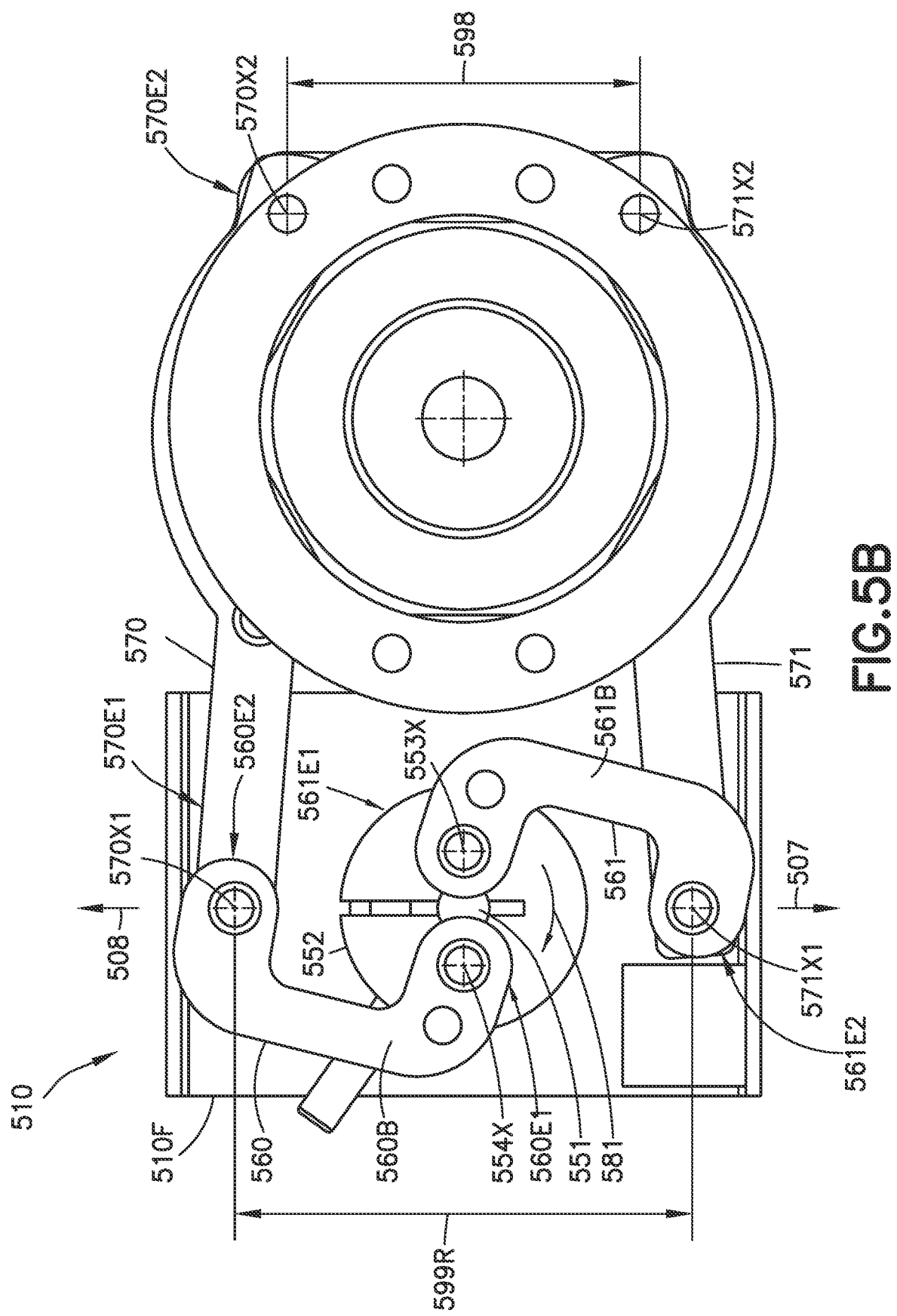

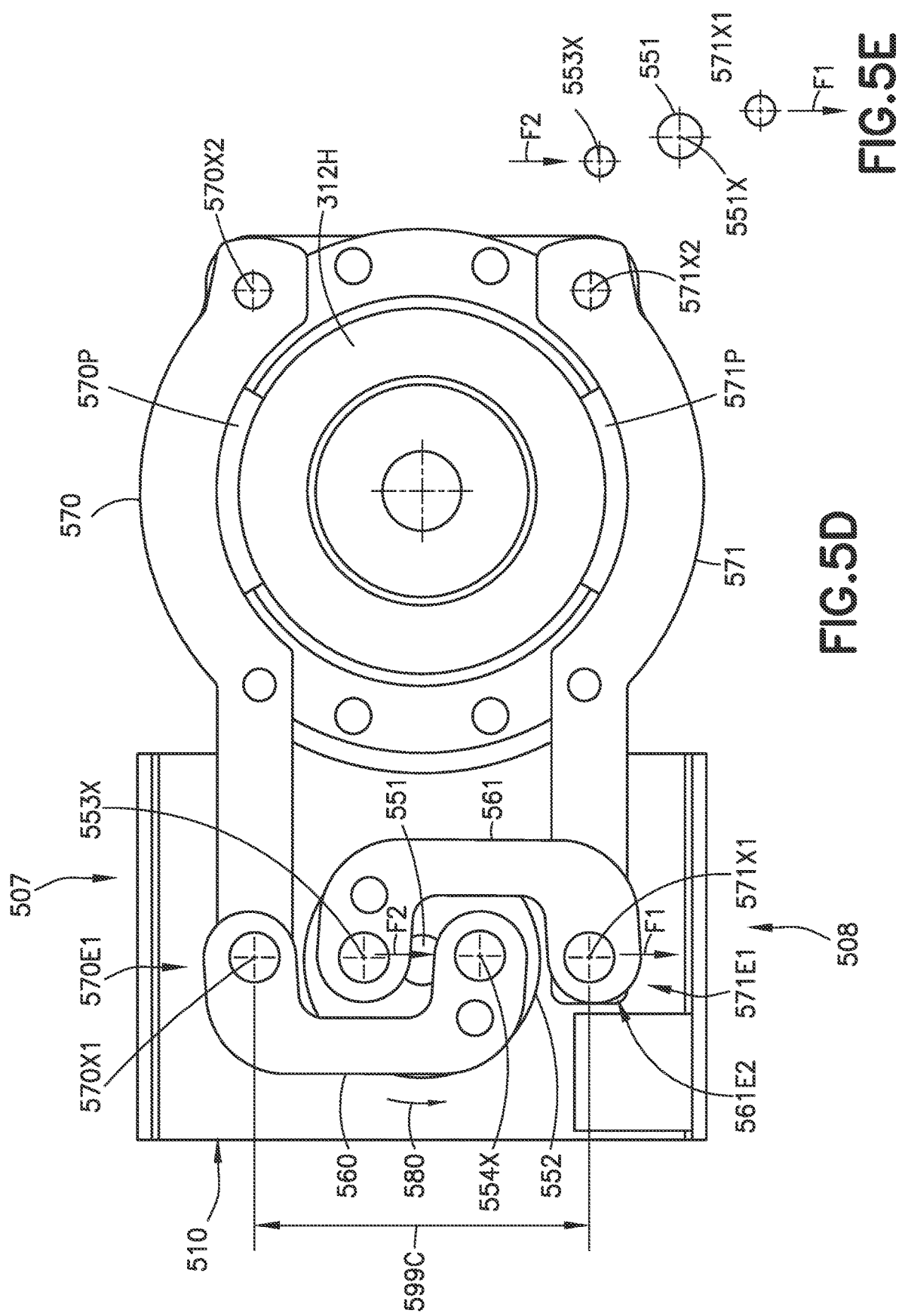

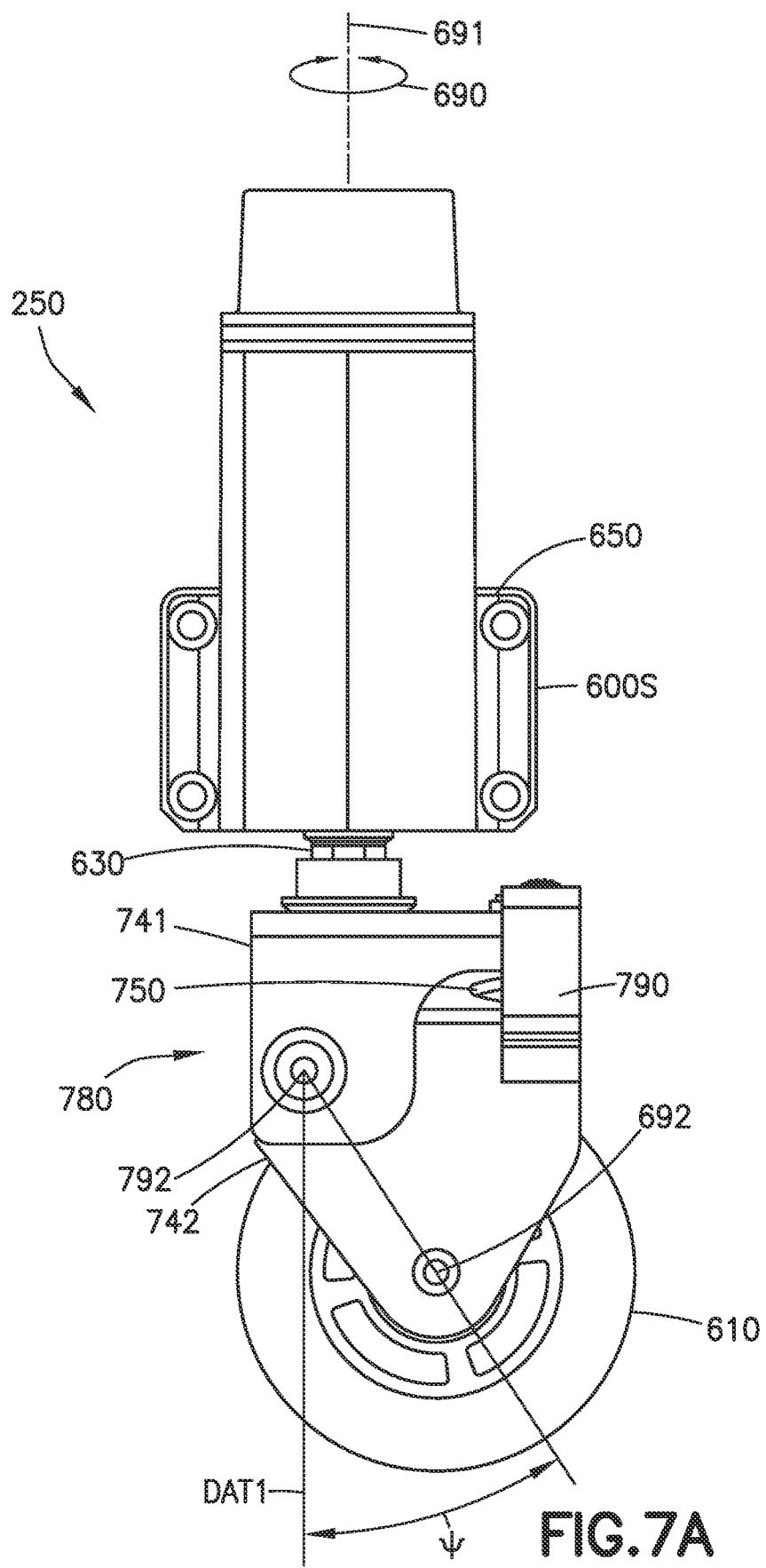

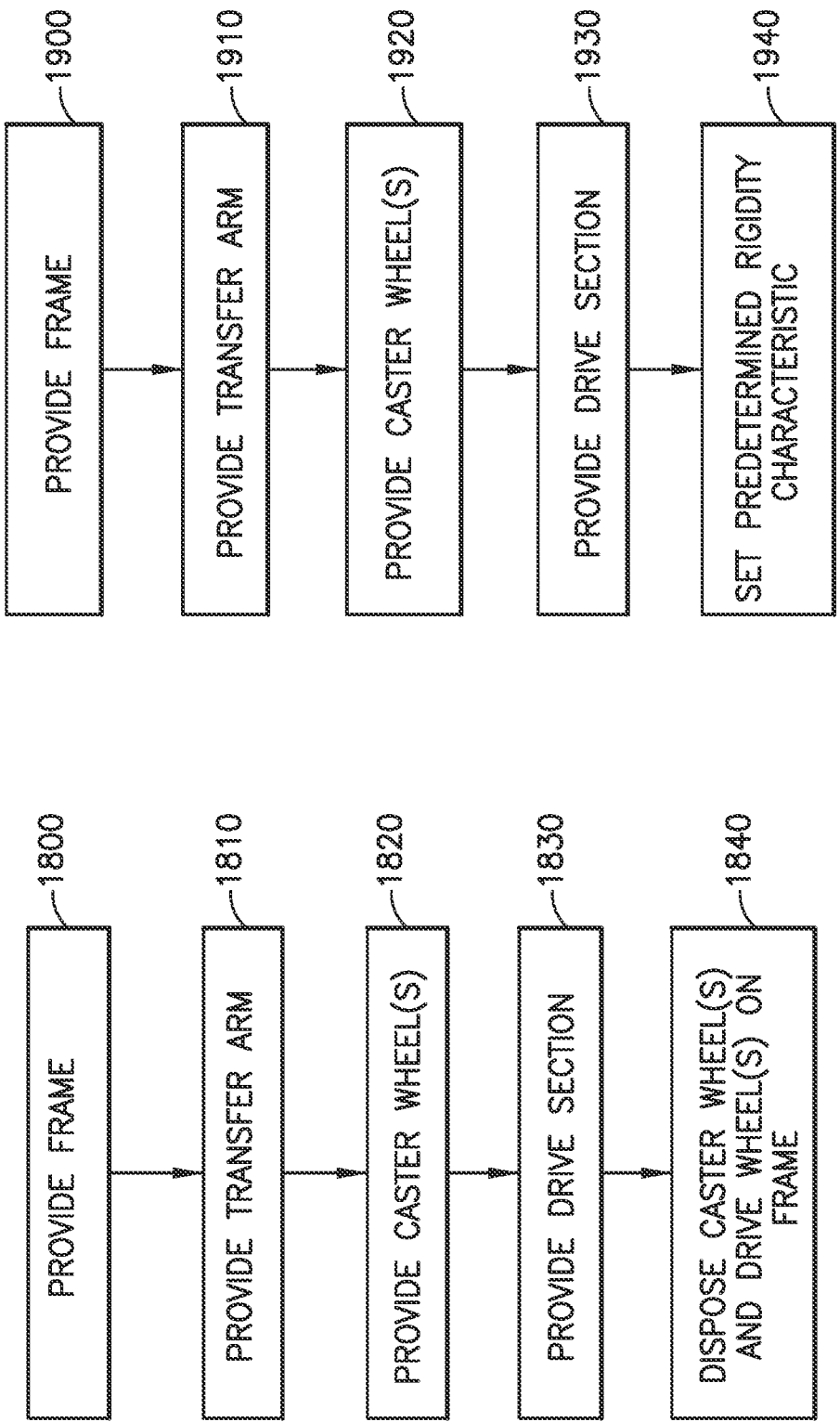

AUTONOMOUS TRANSPORT VEHICLE WITH SYNERGISTIC VEHICLE DYNAMIC RESPONSE

CROSS-REFERENCE TO RELATED APPLICATIONS

This application is a non-provisional of and claims the benefit of U.S. provisional patent application No. 63/213,589 filed on Jun. 22, 2021, the disclosure of which is incorporated herein by reference in its entirety.

BACKGROUND

1. Field

The disclosed embodiment generally relates to material handling systems, and more particularly, to transports for automated storage and retrieval systems.

2. Brief Description of Related Developments

Generally conventional autonomous transport vehicles in automated storage and retrieval systems (such as in warehouses or stores) are supported on wheels that are fixed (e.g., hard mounted) to a frame of the autonomous transport vehicle. With the conventional wheel configuration the trajectory of the autonomous transport vehicle along a transport path may be altered with a traversal of the autonomous transport vehicle over uneven portion of a deck or aisle on/along which the autonomous transport vehicle traverses. Vibrations may also be induced to the storage structure of the automated storage and retrieval system with traverse of the autonomous transport vehicle over on/along the deck or aisle, which vibrations may induce movement of case unit(s) held on racks of the automated storage and retrieval system structure.

One or more wheels of the conventional autonomous transport vehicles are drive wheels that drive the autonomous transport vehicle on/along the deck and aisle. In some circumstances the drive wheels may lose traction with the deck or aisle causing the drive wheel to slip. This drive wheel slippage may cause create odometry/localization challenges with respect to locating the autonomous transport vehicle within the automated storage and retrieval system structure. Some conventional autonomous transport vehicles employ a direct drive for driving the drive wheels which may increase the odometry/localization challenges due to, for example, a large inertia ratio between the wheel drive motors and the chassis of the autonomous transport vehicle. In some instances the wheel slip of the direct drive motors may more than about 90° of wheel slip/rotation before controls of the autonomous transport vehicle begin to mitigate the wheel slip. The above-mentioned wheel slip may create discrepancies with respect to localization/positioning of the autonomous transport vehicles within the storage structure.

BRIEF DESCRIPTION OF THE DRAWINGS

The foregoing aspects and other features of the disclosed embodiment are explained in the following description, taken in connection with the accompanying drawings, wherein:

FIG. 3A is a schematic elevation view of an end of the autonomous transport vehicle of FIG. 2 in a first state in accordance with aspects of the disclosed embodiment;

FIG. 3B is an elevation view of an end of the autonomous transport vehicle of FIG. 2 in a second state accordance with aspects of the disclosed embodiment;

FIG. 4B is an elevation view of an end of the autonomous transport vehicle of FIG. 2 in a second state accordance with aspects of the disclosed embodiment;

FIG. 5B is a schematic plan illustration of a portion of the autonomous transport vehicle of FIG. 2 in a first state in accordance with aspects of the disclosed embodiment;

FIGS. 5D and 5E are schematic plan illustrations of a portion of the autonomous transport vehicle of FIG. 2 in a second state in accordance with aspects of the disclosed embodiment;

FIG. 7A is a schematic elevation view of the portion of the autonomous transport vehicle of FIG. 6A in a first state in accordance with aspects of the disclosed embodiment;

FIG. 18 is an exemplary flow diagram of a method in accordance with aspects of the disclosed embodiment;

FIG. 19 is an exemplary flow diagram of a method in accordance with aspects of the disclosed embodiment;

DETAILED DESCRIPTION

Figure 1:
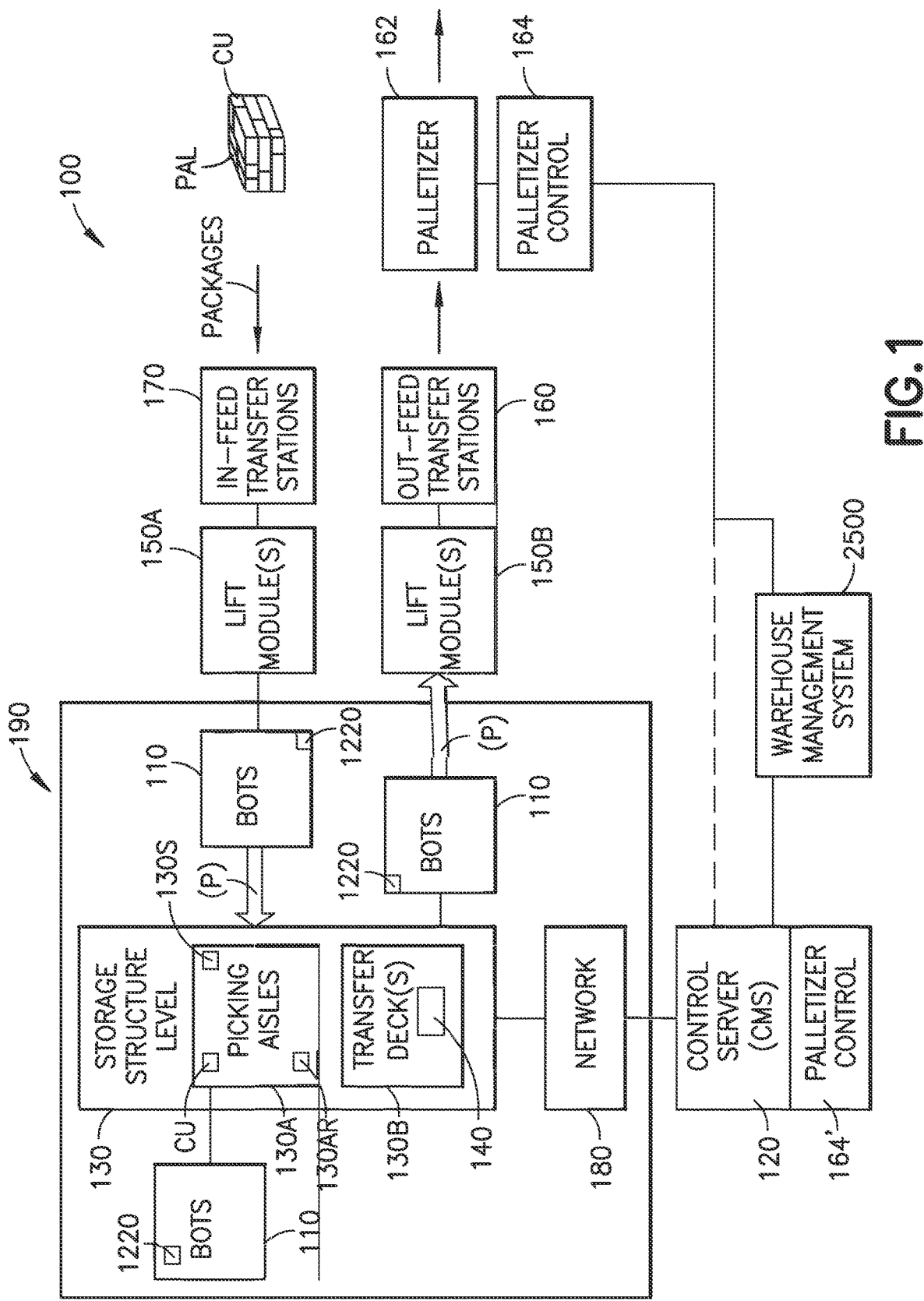
FIG. 1 is a schematic block diagram of an exemplary automated storage and retrieval system incorporating aspects of the disclosed embodiment.

FIG. 1 illustrates an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

Figure 10:
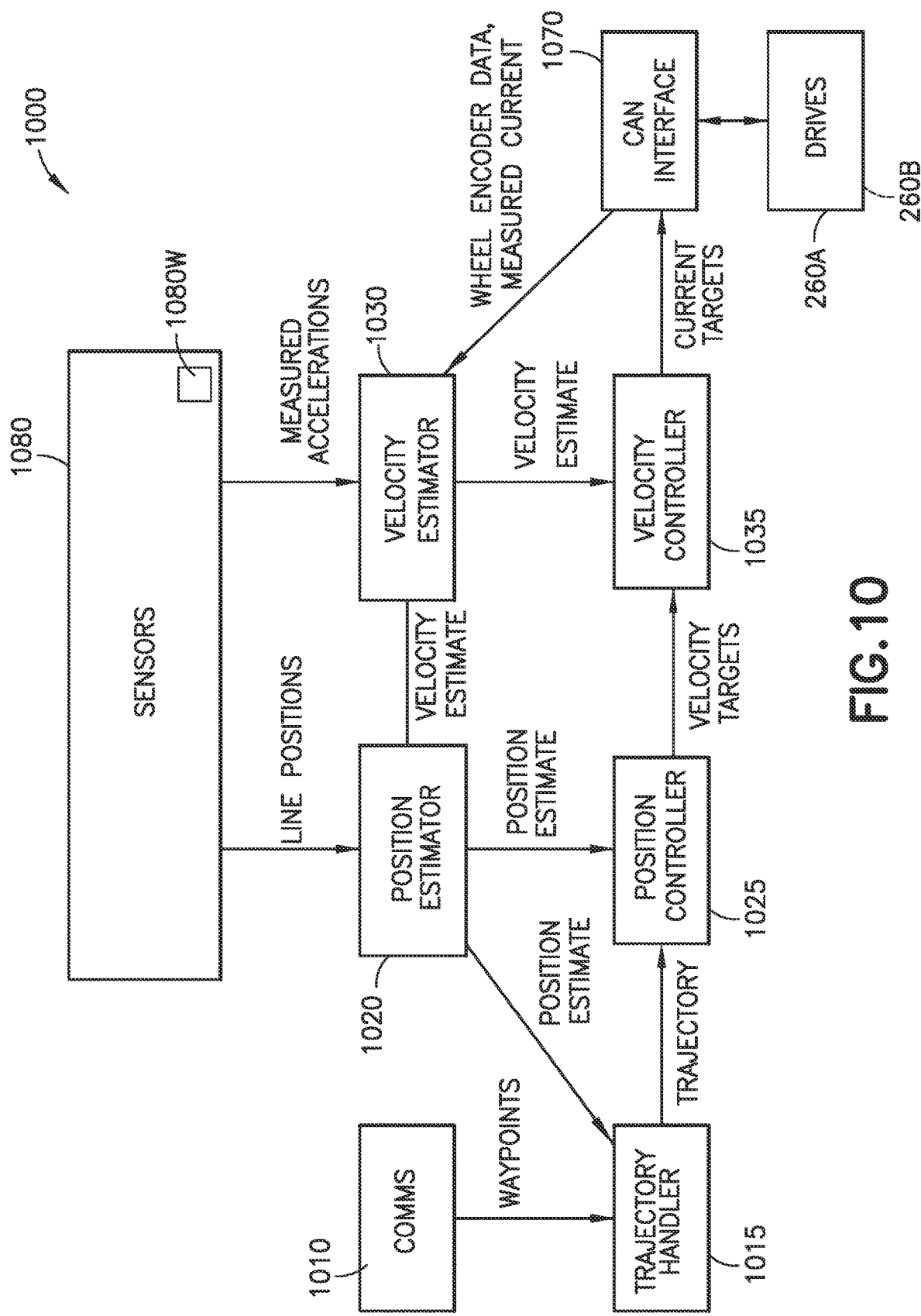
FIG. 10 is a schematic block diagram of a traction control system of the autonomous transport vehicle of FIG. 2 in accordance with aspects of the disclosed embodiment.

The aspects of the disclosed embodiment provide for synergistic dynamic response of an autonomous transport vehicle 110 (of the automated storage and retrieval system 100) in transit through the automated storage and retrieval system 100. In accordance with the aspects of the disclosed embodiment, the autonomous transport vehicle 110 (also referred to herein as an autonomous transport robot) includes a fully independent suspension system and traction control system that synergistically provide a dynamic response of the autonomous transport vehicle 110 in transit that effects superior localization (from wheel odometry) of the autonomous transport vehicle within the automated storage and retrieval system 100 when compared to conventional autonomous transport vehicles whose position/location is determined with wheel odometry. For example, the fully independent suspension 280, 780 (see FIG. 2) is configured to maintain a substantially steady state contact patch CNTC (see FIG. 3A) between wheels of the autonomous transport vehicle 110 and a rolling surface 395 (see FIG. 2) of the storage and retrieval system 100 (e.g., the wheel is in substantial steady state/continuous contact with the rolling surface) over each rolling surface transient 395T (see FIG. 4B) throughout traverse of the wheel(s) over the rolling surface 395. It is noted that the minimized unspring mass of the drive wheels 260A, 260B may at least in part contribute to maintaining the substantially steady state contact patch CNTC as there is less unsprung mass to influence wheel hop off the rolling surface 395 (e.g., where the greater the unsprung mass the greater the wheel hop off the rolling surface). The substantially steady state contact patch CNTC provides for accurate wheel odometry (e.g., as determined by wheel position sensors/encoders 1080W of the sensors 1080—see FIG. 10) determination of the autonomous transport vehicle 110 with the respective wheels in transit on the rolling surface 395 and over any transients 395T (FIG. 4B—such as joints, debris, etc.) that may exist on the rolling surface 395 and that would otherwise cause the wheels to lift away from (e.g., affecting inaccuracies in wheel odometry) the rolling surface 395. The traction control system 1000 (see FIG. 10) is configured with a low latency that mitigates wheel slippage to less than about 1° of wheel slip/rotation, that along with the maintaining of the substantially steady state contact path CNTC synergistically provides the autonomous transport vehicle with superior localization (from wheel odometry) within the automated storage and retrieval system 100 compared to conventional autonomous transport vehicles.

In accordance with the aspects of the disclosed embodiment, the fully independent suspension system and the traction control system 1000 provide a dynamic response of the autonomous transport vehicle 110 in transit that effects superior takt times for fulfilling product orders. For example, the fully independent suspension is configured to provide the autonomous transport vehicle with a substantially constant/steady state ride height RHT (see FIG. 8A) at which case units CU are held. The fully independent suspension also reduces vibration of the autonomous transport vehicle (due to traverse of the autonomous transport vehicle through the storage structure) that may otherwise cause movement of the case unit(s) within a payload bed 210B (see FIG. 2) of the autonomous transport vehicle. As noted above, the traction control system 100 has a low latency for resolving wheel slip and may substantially prevent yawing of the autonomous transport vehicle that may otherwise cause movement of the case unit(s) within a payload bed 210B of the autonomous transport vehicle. Here, the synergistic dynamic response of the autonomous transport vehicle 110 in transit provides for ungripped/released manipulation of case unit(s) CU within the payload bed 210B substantially simultaneously with start and stop traverse motions of the autonomous transport vehicle 110 along the rolling surface as described herein, which effects the superior takt times compared to conventional autonomous transport vehicles whose traversal along a surface is stopped prior to releasing the case unit(s) for manipulation.

The fully independent suspension system of the autonomous transport vehicle 110 may also effect locating the ride height RHT at a minimized height from the rolling surface. Minimizing the ride height RHT provides for placement of case unit support surfaces of case unit holding locations closer to the rolling surface 395, which may increase a vertical storage density of the automated storage and retrieval system 100.

The automated storage and retrieval system 100 in FIG. 1, may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, and shipping units) may include cases of items/unit (e.g. case of soup cans, boxes of cereal, etc.) or individual item/units that are adapted to be taken off of or placed on a pallet. In accordance with the exemplary embodiment, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system may be generally described as a storage and retrieval engine 190 coupled to a palletizer 162. In greater detail now, and with reference still to FIG. 1, the storage and retrieval system 100 may be configured for installation in, for example, existing warehouse structures or adapted to new warehouse structures. As noted before the system 100 shown in FIG. 1 is representative and may include for example, in-feed and out-feed conveyors terminating on respective transfer stations 170, 160, lift module(s) 150A, 150B, a storage structure 130, and a number of autonomous transport vehicles 110 (also referred to herein as robots, "bots," or autonomous transport robots). It is noted that the storage and retrieval engine 190 is formed at least by the storage structure 130 and the bots 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system 100 may also include robot or bot transfer stations (not shown) that may provide an interface between the bots 110 and the lift module(s) 150A, 150B. The storage structure 130 may include multiple levels of storage rack modules where each storage structure level 130L of the storage structure 130 includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the bots 110 (such as along rails 130AR) while in other aspects the picking aisles are configured to provide unrestrained travel of the bot 110 (e.g., the picking aisles are open and undeterministic with respect to bot 110 guidance/travel). The transfer decks 130B have open and undeterministic bot support travel surfaces along which the bots 110 travel under guidance and control provided by bot steering (as will be described herein). In one or more aspects, the transfer decks have multiple lanes between which the bots 110 freely transition for accessing the picking aisles 130A and/or lift modules 150A, 150B. As used herein, "open and undeterministic" denotes the travel surface of the picking aisle and/or the transfer deck has no mechanical/physical restraints/guides (such as guide rails) that delimit the travel of the autonomous transport vehicle 110 to any given path along the travel surface. It is noted that while the aspects of the disclosed embodiment are described with respect to a multilevel storage array, the aspects of the disclosed embodiment may be equally applied to a single level storage array that is disposed on a facility floor or elevated above the facility floor.

The picking aisles 130A, and transfer decks 130B also allow the bots 110 to place case units CU into picking stock and to retrieve ordered case units CU. In alternate aspects, each level may also include respective bot transfer stations 140. The bots 110 may be configured to place case units, such as the above described retail merchandise, into picking stock in the one or more storage structure levels 130L of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more storage structure levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100.

As may be realized, the storage and retrieval system 100 may include multiple in-feed and out-feed lift modules 150A, 150B that are accessible by, for example, bots 110 of the storage and retrieval system 100 so that one or more case unit(s), uncontained (e.g. case unit(s) are not held in trays), or contained (within a tray or tote) can be transferred from a lift module 150A, 150B to each storage space on a respective level and from each storage space to any one of the lift modules 150A, 150B on a respective level. The bots 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example reciprocating lift, or any other suitable configuration. The lift module(s) 150A, 150B include any suitable controller (such as controller 120 or other suitable controller coupled to controller 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system may include a control system, comprising for example one or more control servers 120 that are communicably connected to the in-feed and out-feed conveyors and transfer stations 170, 160, the lift modules 150A, 150B, and the bots 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) 120 managing the case flow system. The network 180 may further include suitable communication for effecting a bi-directional interface with the bots 110. For example, the bots 110 may include an on-board processor/controller 1220. The network 180 may include a suitable bi-directional communication suite enabling the bot controller 1220 to request or receive commands from the control server 180 for effecting desired transport (e.g. placing into storage locations or retrieving from storage locations) of case units and to send desired bot 110 information and data including bot 110 ephemeris, status and other desired data, to the control server 120. As seen in FIG. 1, the control server 120 may be further connected to a warehouse management system 2500 for providing, for example, inventory management, and customer order fulfillment information to the CMS 120 level program. A suitable example of an automated storage and retrieval system arranged for holding and storing case units is described in U.S. Pat. No. 9,096,375, issued on Aug. 4, 2015 the disclosure of which is incorporated by reference herein in its entirety.

Figure 2:
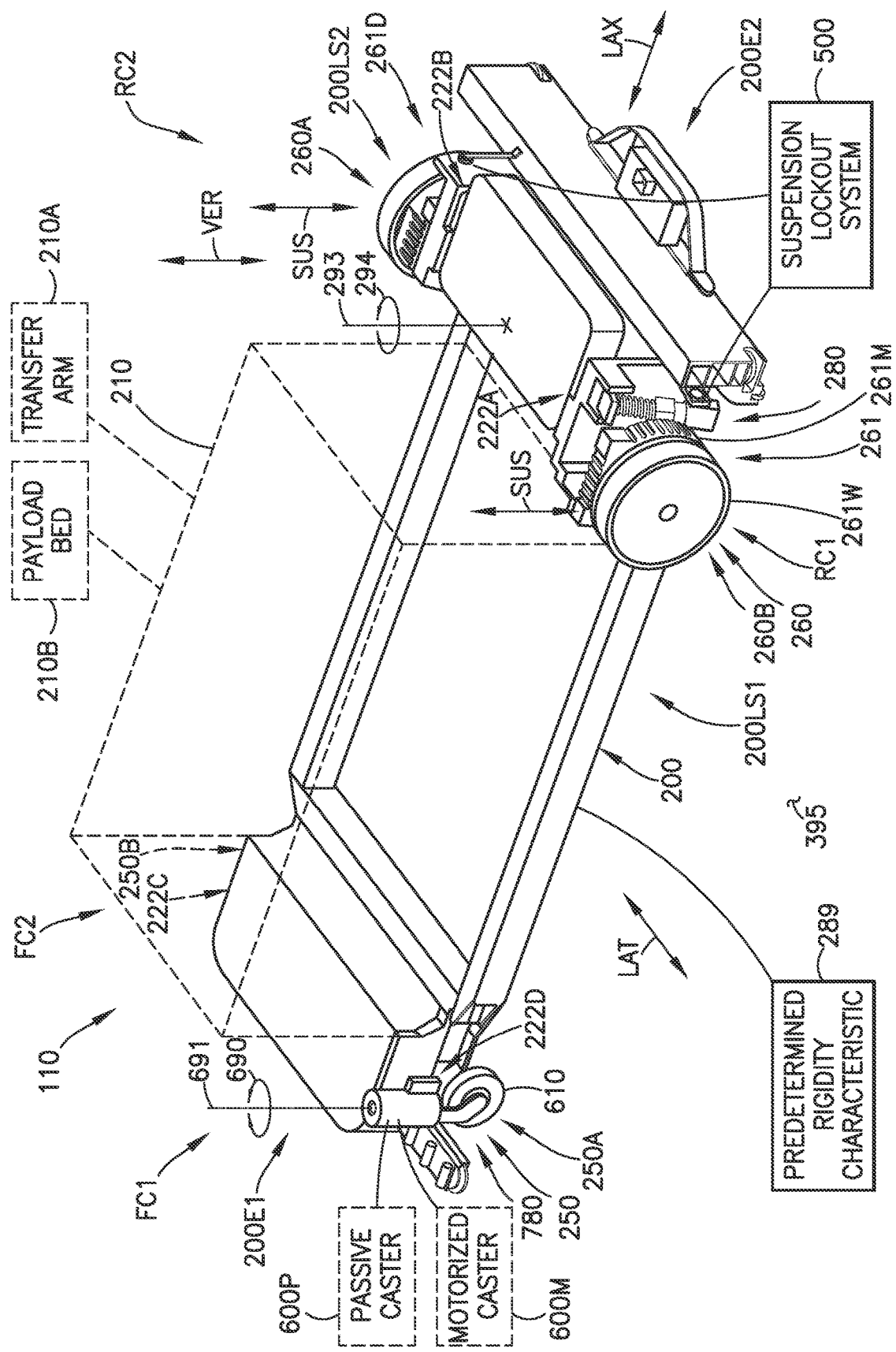
FIG. 2 is a schematic perspective illustration of an autonomous transport vehicle of the automated storage and retrieval system of FIG. 1 in accordance with aspects of the disclosed embodiment.

Referring now to FIG. 2, the autonomous transport vehicle or bot 110 (which may also be referred to herein as an autonomous guided vehicle or robot) includes a chassis or frame 200 with an integral payload support or bed 210B. The frame 200 has a front end 200E1 and a back end 200E2 that define a longitudinal axis LAX of the autonomous transport vehicle 110. The frame 200 may be constructed of any suitable material (e.g., steel, aluminum, composites, etc.) and includes a case handling assembly 210 configured to handle cases/payloads transported by the autonomous transport vehicle 110. The case handling assembly 210 includes any suitable payload bed 210B on which payloads are placed for transport and/or any suitable transfer arm 210A connected to the frame and configured for autonomous transfer of payload(s) to and from the frame 200 (e.g., transfer of payload(s) between the autonomous transport vehicle 110 and a payload holding location, such as any suitable payload storage location, a shelf of lift module 150A, 150B, and/or any other suitable payload holding location). The transfer arm 210A is configured to extend laterally in direction LAT and/or vertically in direction VER to transport payloads to and from the payload area 210. Examples of suitable payload beds 210B and transfer arms 210A and/or autonomous transport vehicles to which the aspects of the disclosed embodiment may be applied can be found in United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The frame 200 includes one or more idler wheels 250 (also referred to as casters or caster wheels) disposed adjacent the front end 200E1. The frame also includes one or more drive wheels 260 disposed adjacent the back end 200E2. In other aspects, the position of the idler wheels 250 and drive wheels 260 may be reversed (e.g., the drive wheels 260 are disposed at the front end 200E1 and the idler wheels 250 are disposed at the back end 200E2). It is noted that in some aspects, the autonomous transport vehicle 110 is configured to travel with the front end 200E1 leading the direction of travel or with the back end 200E2 leading the direction of travel. In one aspect, idler wheels 250A, 250B (which are substantially similar to idler wheel 250 described herein) are located at respective front corners of the frame 200 at the front end 200E1 and drive wheels 260A, 260B (which are substantially similar to drive wheel 260 described herein) are located at respective back corners of the frame 200 at the back end 200E2 (e.g., a support wheel is located at each of the four corners of the frame 200) so that the autonomous transport vehicle 110 stably traverses the transfer deck(s) 130B and picking aisles 130A of the storage structure 130. Here, the caster wheel(s) 250A, 250B and the drive wheel(s) 260A, 260B roll, on a rolling surface 395 effecting autonomous transport vehicle 110 traversal over the rolling surface 395.

The autonomous transport vehicle 100 includes a drive section 261D connected to the frame 200. The drive section 261D has at least a pair of traction drive wheels 260 (also referred to as drive wheels 260—see drive wheels 260A, 260B) astride the drive section 261D. As described herein, the drive wheels 260 have a fully independent suspension 280 (also referred to as a (fully) independent multi-link suspension system) coupling each drive wheel 260A, 260B of the at least pair of drive wheels 260 to the frame 200, with at least one intervening pivot link (e.g., the upper and lower frame links 310, 311 described herein) between at least one drive wheel 260A, 260B and the frame 200 configured to maintain a substantially steady state traction contact patch CNTC (FIG. 3A—noting that a similar substantially steady state traction contact patch may be maintained for each caster wheel 250A, 250B by the respective fully independent suspension 80 (described herein) thereof) between the at least one drive wheel 260A, 260B and rolling surface 395 (also referred to as autonomous vehicle travel surface 395) over each rolling surface transient(s) 395T (see FIG. 4B, e.g., bumps, debris located on the rolling surface, surface transitions such as transitions between picking aisles and the transfer deck, transitions between transfer deck floor panels, transitions between different rail portions of the picking aisles, etc.) throughout traverse of the at least one drive wheel 260A, 260B over the rolling surface 395.

The fully independent suspension 280 of drive wheel 260A is independent from the independent suspension 280 of drive wheel 260B. Each fully independent suspension 280 of each drive wheel 260A, 260B is also independent from the fully independent suspension 780 (described herein) of each other of the at least one caster wheel 250A, 250B. As described herein, the caster wheel(s) 250A, 250B and the drive wheel(s) 260A, 260B of the, and the respective fully independent suspension 780, 280 thereof, are disposed on the frame 200 astride the integral payload support or bed 210B so that the payload seat surface 210AFS at the payload datum position PDP is disposed at a minimum distance MIND above the rolling surface 395 as described herein.

The substantially steady state traction contact patch CNTC is disposed at a predetermined reference position (see FIG. 3A) of the at least one drive wheel 260A, 260B throughout traverse of the at least one traction drive wheel 260A, 260B over the rolling surface 395. As an example, the predetermined reference position of the substantially steady state traction contact patch CNTC is a designed for position (e.g., such as effected by suspension geometry) located at the bottom of the at least one traction drive wheel 260A, 260B. In accordance with the exemplary embodiment, the substantially steady state traction contact patch CNTC is located at the predetermined reference position of the at least one drive wheel 260A, 260B throughout transient (e.g., reactive short term movement of the wheel effected by fully independent suspension 280 of the autonomous transport vehicle 110) of the at least one drive wheel 260A, 260B due to traverse of the at least one drive wheel 260A, 260B over the rolling surface 395 transients 395T. The fully independent suspension 280 may also effect the substantially steady state traction contact patch CNTC being disposed at the predetermined reference position of the at least one drive wheel 260A, 260B substantially independent of the transients of the at least one drive wheel 260A, 260B due to traverse of the at least one drive wheel 260A, 260B over the rolling surface transients 395T.

As will also be described herein, the fully independent suspension 280 includes at least one intervening pivot link between the at least one drive wheel 260A, 260B and the frame 200 and is configured to generate a substantially linear (see FIGS. 3B and 4B) transient response to the drive wheel 260A, 260B, to rolling over surface transients 395T of the autonomous vehicle travel surface 395 in a linear wheel travel direction SUS throughout each transient, where the linear wheel travel direction SUS is substantially normal to a major plane MP of the frame 200 (see FIGS. 3B and 4B).

In one aspect, each drive wheel 260 comprises a drive unit 261 that is independently coupled to the frame 200 by a respective fully independent multi-link suspension system 280, so that each drive wheel 260 is independently movable in a wheel travel direction SUS relative to the frame and any other drive wheel(s) 260 that is/are also coupled to the frame as will be described in greater detail herein. Here, each drive wheel 260 moves in the wheel travel direction SUS relative to the frame 200 independent of movement of the other drive wheel(s) 260 in the wheel travel direction SUS. It is noted that each drive unit 261 comprises any suitable drive motor 261M and a wheel 261W. The drive motor 261M is coupled to and rotationally drives the wheels 261W so as to propel the autonomous transport vehicle 110 in a travel direction. Here the motors 261M of two drive wheels 260A, 260B may be operated at the same time and at substantially the same rotational speed to propel the autonomous transport vehicle 110 in a substantially straight line path of travel. In other aspects, the motors 261M of the two drive wheels 260A, 260B may be operated at the same time (or at different times) and at different rotational speeds to propel the autonomous transport vehicle 110 along an arcuate path of travel or to pivot the autonomous transport vehicle in direction 294 about vehicle pivot axis 293. The vehicle pivot axis 293 may be located about midway between the two drive wheels 260A, 260B. The differential operation of the motors 261M of the respective drive wheels 260A, 260B that effects turning and/or pivoting of the autonomous guided vehicle 110 as described above is referred to herein as differential drive wheel steering.

Referring to FIGS. 2, 3A, 3B, 3C, and 3D, in one aspect, referring to drive wheel 260B for explanatory purposes only (noting drive wheel 260A is substantially similar), each independent multi-link suspension system 280 includes an upper frame link 310, a lower frame link 311, and a biasing member 312 (also referred to herein for exemplary purposes as a shock absorber). The upper frame link 310 has a first end 310E1 (FIG. 3C) pivotally coupled to the frame at upper frame pivot axis 320. The upper frame link 310 also has a second end 310E2 (FIG. 3C) pivotally coupled to a motor housing 621MH of the motor 621M about upper motor pivot axis 321. The lower frame link 311 has a first end 311E1 (FIG. 3B) pivotally coupled to the frame at lower frame pivot axis 322. The lower frame link 311 also has a second end 311E2 (FIG. 3B) pivotally coupled to the motor housing 621MH about lower motor pivot axis 323. It is noted that while the upper frame link 310 and the lower frame link 311 are each illustrated as being monolithic, in other aspects there may be more than one upper frame link 310 and/or more than one lower frame link 311. The lower frame link 311 and the upper frame link 310 are akin to or otherwise form a double wishbone suspension system.

A distance 391U between the longitudinal axis LAX of the autonomous transport vehicle 110 and the upper frame pivot axis 320 may be substantially the same as another distance 391L between the longitudinal axis LAX and the lower frame pivot axis 322. A distance 399U between the upper frame pivot axis 320 and the upper motor pivot axis 321 (e.g., the length of the upper frame link 310) may be substantially the same as another distance 399L between the lower frame pivot axis 322 and the lower motor pivot axis 323 (e.g., the length of the lower frame link 311). The substantially equal distances 391U, 391L and the substantially equal distances 399U, 399L provide for a substantially camber free movement of the drive wheel 260B in the wheel travel direction SUS, where "camber" is the angle between vertical axis of a wheel WV and a vertical axis of the vehicle VV when viewed from the front or rear of the vehicle (see FIGS. 3A and 3B). For example, as can be seen by comparing FIGS. 3A and 3B, the wheel 261W (shown in FIG. 3A) is substantially perpendicular to the autonomous vehicle travel surface 395 (and the vertical axis of the wheel WV is substantially parallel with the vertical axis of the vehicle VV) with the wheel in substantial contact (e.g., at the substantially steady state traction contact patch CNTC) with the autonomous vehicle travel surface 395. The wheel 261W (shown in FIG. 3B) remains substantially perpendicular to the autonomous vehicle travel surface 395 (and the vertical axis of the wheel WV remains substantially parallel with the vertical axis of the vehicle VV) with the wheel lifted off of the autonomous vehicle travel surface 395 by any suitable distance 398 (i.e., the camber of the wheel does not change with movement of the wheel in the wheel travel direction SUS). In other aspects, the distances 399U, 399L, 391U, 391L may be any suitable distances to effect the substantially camber free movement of the drive wheel 260B in the wheel travel direction SUS.

Figure 3C:
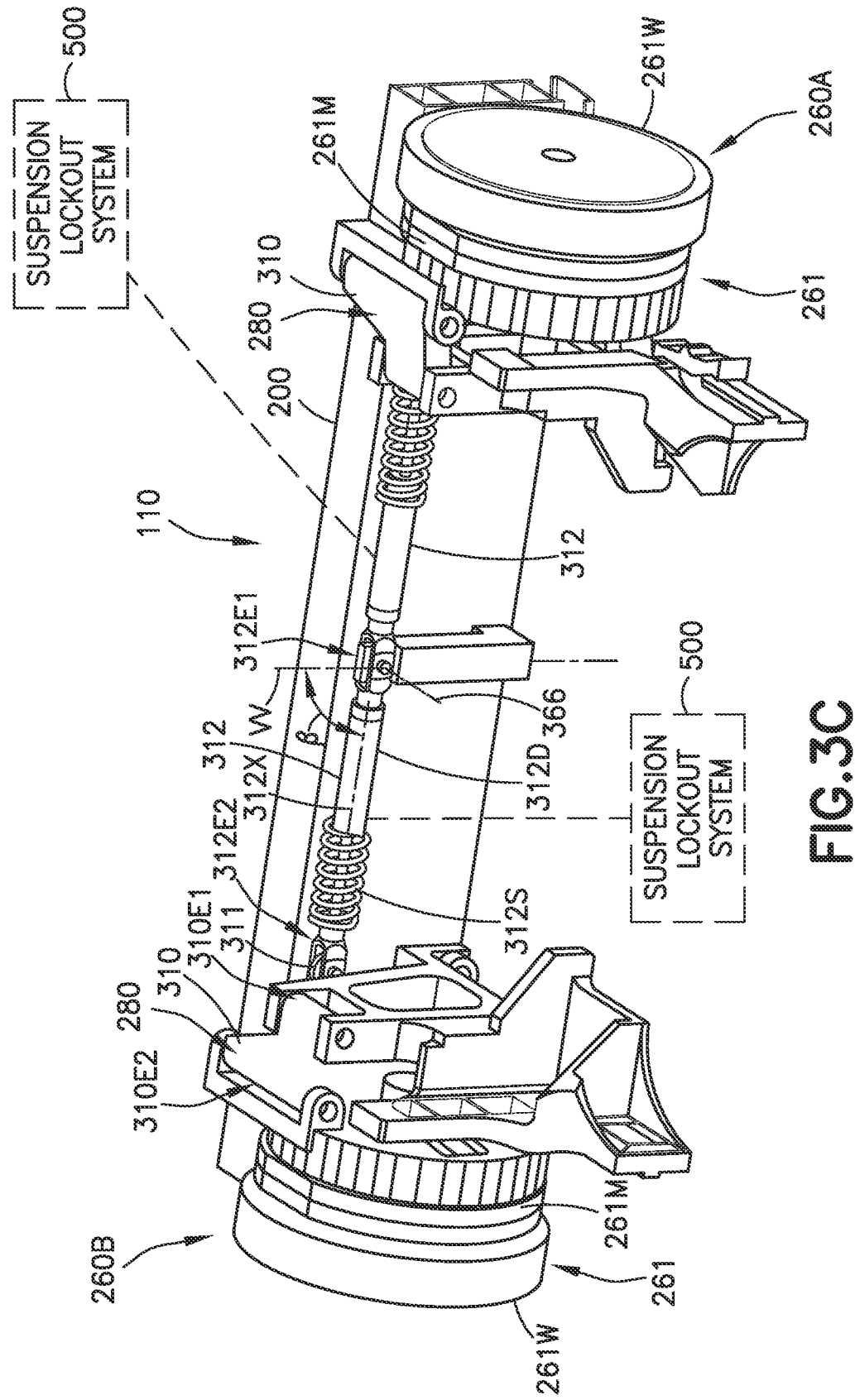
FIG. 3C is a schematic perspective illustration of the autonomous transport vehicle of FIG. 3A in accordance with aspects of the disclosed embodiment.
Figure 3D:
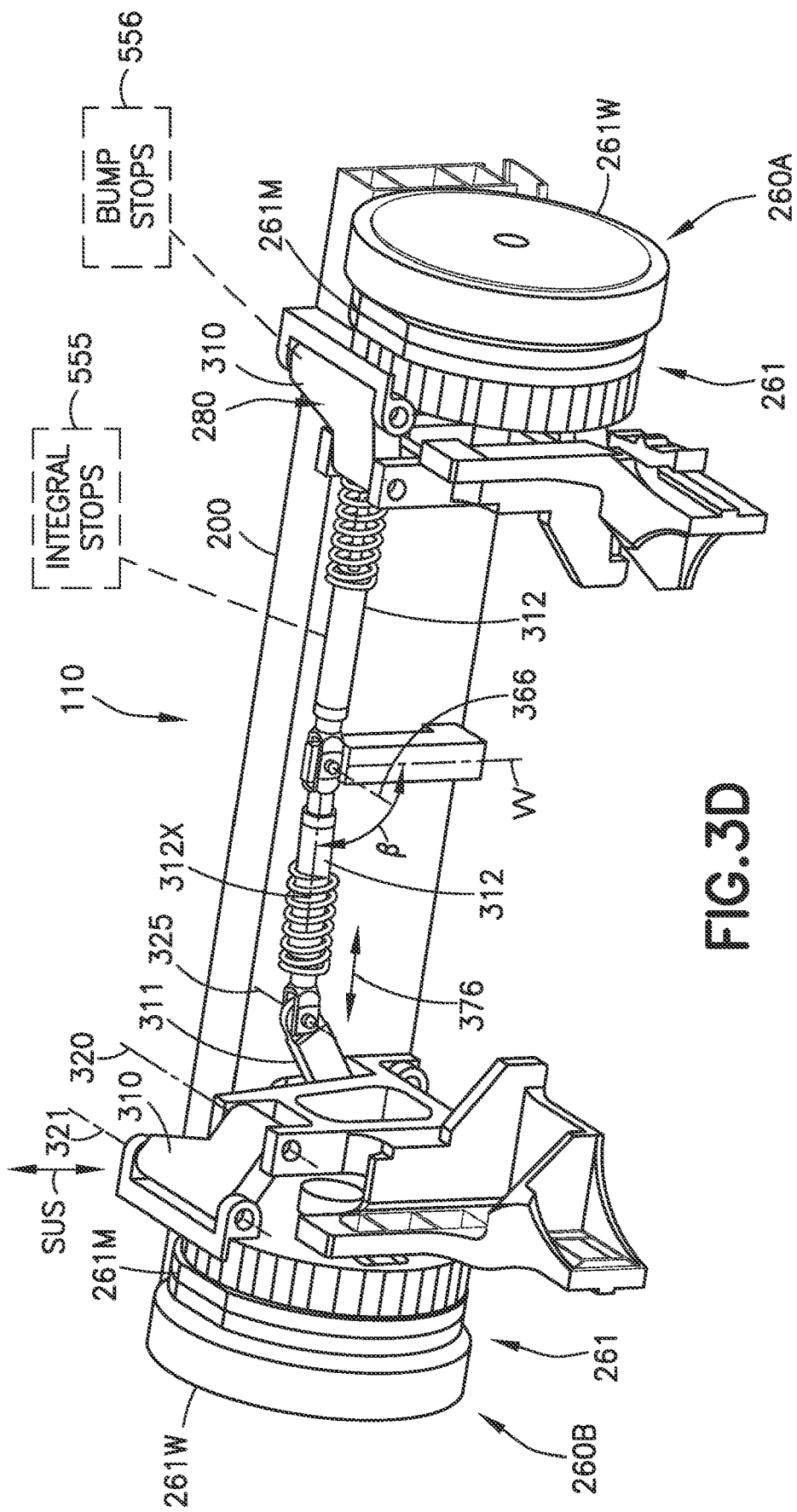
FIG. 3D is a schematic perspective illustration of the autonomous transport vehicle of FIG. 3B in accordance with aspects of the disclosed embodiment.
Figure 4A:
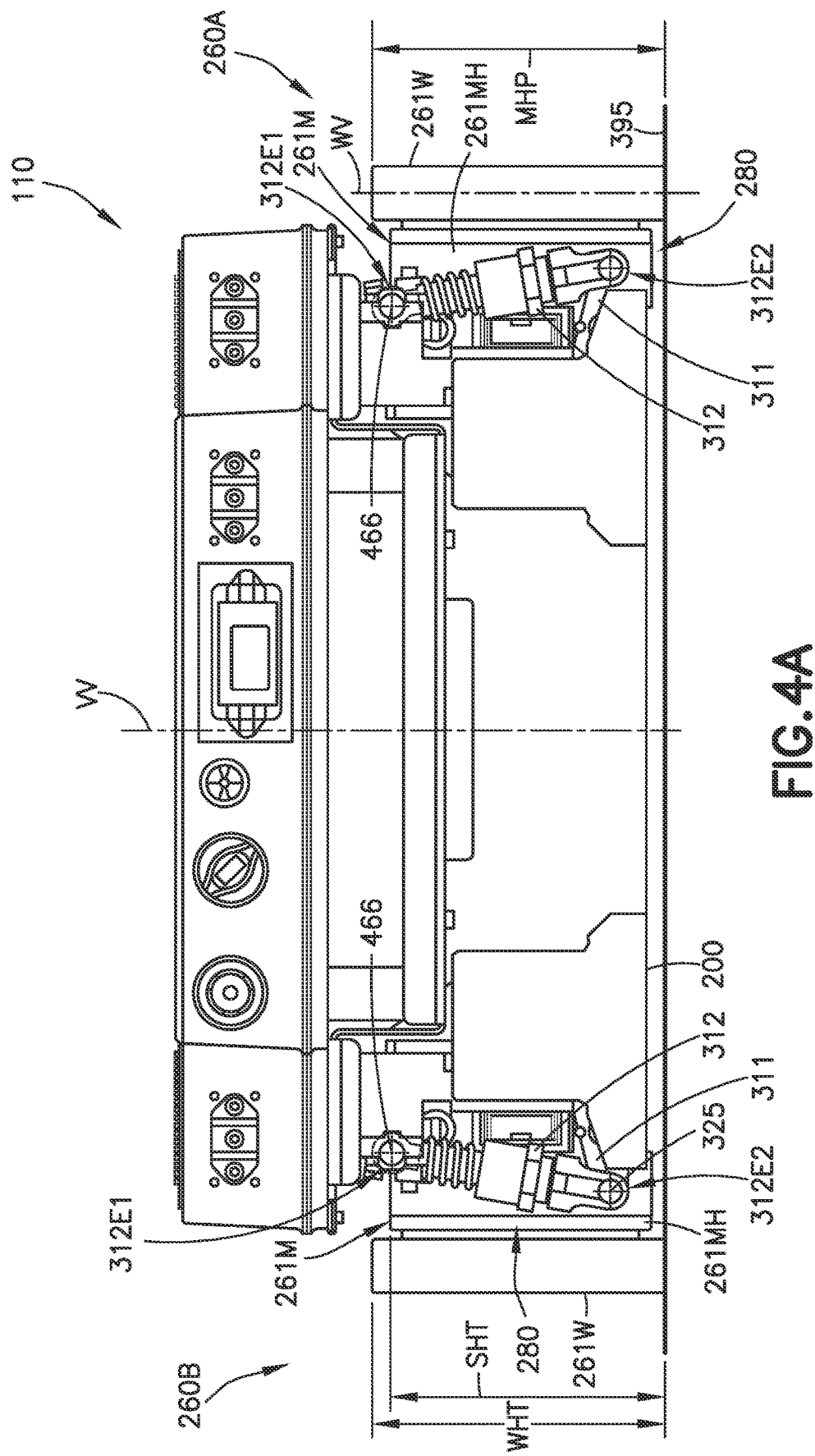
FIG. 4A is a schematic elevation view of an end of the autonomous transport vehicle of FIG. 2 in a first state in accordance with aspects of the disclosed embodiment.

The wheel 261W is biased towards the autonomous vehicle travel surface 395 by the shock absorber 312. A first end 312E1 of the shock absorber 312 is pivotally coupled to the frame 200 about shock absorber pivot axis 366 and a second end 312E2 of the shock absorber 312 is connected to, for example, the lower frame link 311 by a connecting link 311C. It should be understood that employment of the shock absorber 312 is exemplary and in other aspects any suitable biasing member such as a torsion bar may be coupled to the connecting link 311C for biasing the wheel 261W as described herein. In one aspect, the connecting link 311C is integrally formed with or otherwise coupled to the lower frame link 311 so that an angle α between the lower frame link 311 and the connecting link 311C is substantially constant and does not change. The connecting link 311C extends from the lower frame link 311 so that a free end of the connecting link 311C is pivotally coupled to the second end of the shock absorber 312 about a connecting link pivot axis 325. In this manner, as the wheel 261W travels in the wheel travel direction SUS the lower frame link pivots about lower frame pivot axis 322 to cause the connecting link to push on the shock absorber 312 in shock absorber compression/extension direction 376 so that movement of the wheel 261W in the wheel travel direction SUS is damped by the shock absorber 312 and the wheel is biased by the shock absorber 312 against the autonomous vehicle travel surface 395. As shown in FIGS. 3C and 3D the shock absorber 312 extends in a substantially horizontal direction (e.g., substantially parallel with the autonomous vehicle travel surface 395 or substantially perpendicular to a direction of articulated wheel travel direction SUS provided by the upper and lower frame links 310, 311) that is substantially transverse to the longitudinal axis LAX. In this aspect, an angle β (FIG. 3C) of a longitudinal axis 312X of the shock absorber 312 relative to the vertical axis of the vehicle VV may range from being about perpendicular to the vertical axis of the vehicle VV to an angle of more than about 45° relative to the vertical axis of the vehicle VV.

While the shock absorber 312 is described as being coupled to the lower frame link 311, in other aspects the shock absorber 312 may be coupled to the upper frame link 310 in a manner substantially similar to that describe above by moving the shock absorber 312 closer to a bottom of the frame 200 (e.g., adjacent the autonomous vehicle travel surface 395). In still other aspects, respective dampers may be coupled to both the upper frame link 310 and the lower frame link 311 in a manner substantially similar to that described above, such as to increase the bias on the wheel 261W depending on a weight of payload carried by the autonomous transport vehicle 110. The shock absorber 312 may be a hydraulically damped coil over shock, a gas spring, an undamped coil over shock, a damper with an internal spring, or any other suitable shock absorber. Further, while the shock absorber 312 is illustrated as a unit that includes both a damper 312D and spring 312S (see FIG. 3C) in other aspects the shock absorber 312 may include a damper that is separate and distinct from the spring where each of the spring and damper are coupled to the frame and the lower frame link 311 independent of each other (e.g., such as in a side-by-side or one-over-the-other spatial relationship, rather than an in-line relationship).

Referring to FIGS. 2, 4A, 4B, and 4C, in one aspect, referring to drive wheel 260A for explanatory purposes only (noting drive wheel 260B is substantially similar), the drive wheel 260 is coupled to the frame 200 by an independent multi-link suspension system 280 substantially similar to that described above with respect to FIGS. 3A-3D. However, in this aspect the shock absorber 312 is arranged in a substantially vertical orientation rather than a substantially horizontal orientation. In this aspect, an angle θ of the longitudinal axis 312X of the shock absorber 312 relative to the vertical axis of the vehicle VV may range from being about parallel with the vertical axis of the vehicle VV to an angle of less than about 45° relative to the vertical axis of the vehicle VV.

In this aspect, the first end 312E1 of the shock absorber 312 is coupled to the frame 200 at shock absorber pivot axis 466. The shock absorber pivot axis 466 is disposed adjacent to or coaxially with the upper frame pivot axis 320 so as to orient the longitudinal axis 312X of the shock absorber 312 substantially vertically (see FIG. 4B). In this aspect, the connecting link 311C of the lower frame link 311 extends towards the wheel 261W so as to be disposed adjacent to or coaxial with the lower motor pivot axis 323, again so that the longitudinal axis 312X of the shock absorber 312 has a substantially vertically orientation (see FIG. 4B). In other aspects, the shock absorber pivot axes 466, 325 may have any suitable spatial relationship relative to the pivot axes 320, 322, 323, 321 that effects orienting the shock absorber in the substantially vertically orientation while biasing the wheel 261W towards the autonomous vehicle travel surface 395.

Referring to FIGS. 2, 3A, 3B, 3C, 3D, 4A, 4B, and 4C, a height profile WHT of the drive wheel 260A, 260B and a height profile SHT of the fully independent suspension 280 (see FIGS. 3A and 4A), inclusive of the intervening pivot link of the fully independent suspension 280, define a minimum height profile MHP. Here, the minimum height profile MHP is a height profile where the fully independent suspension 280 does not extend above the height profile WHT of the respective drive wheel 260A, 260B.

Figure 8A:
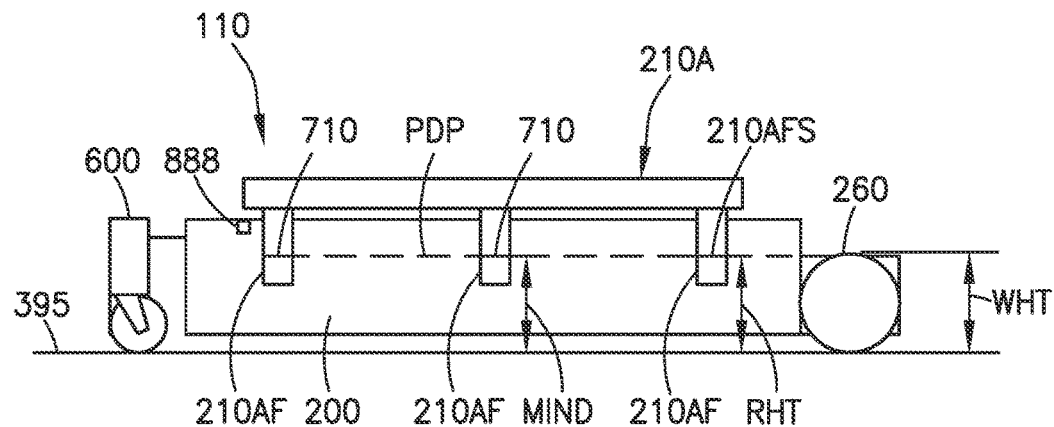
FIG. 8A is a schematic elevation view of the autonomous transport vehicle of FIG. 2 in accordance with aspects of the disclosed embodiment.
Figure 8B:
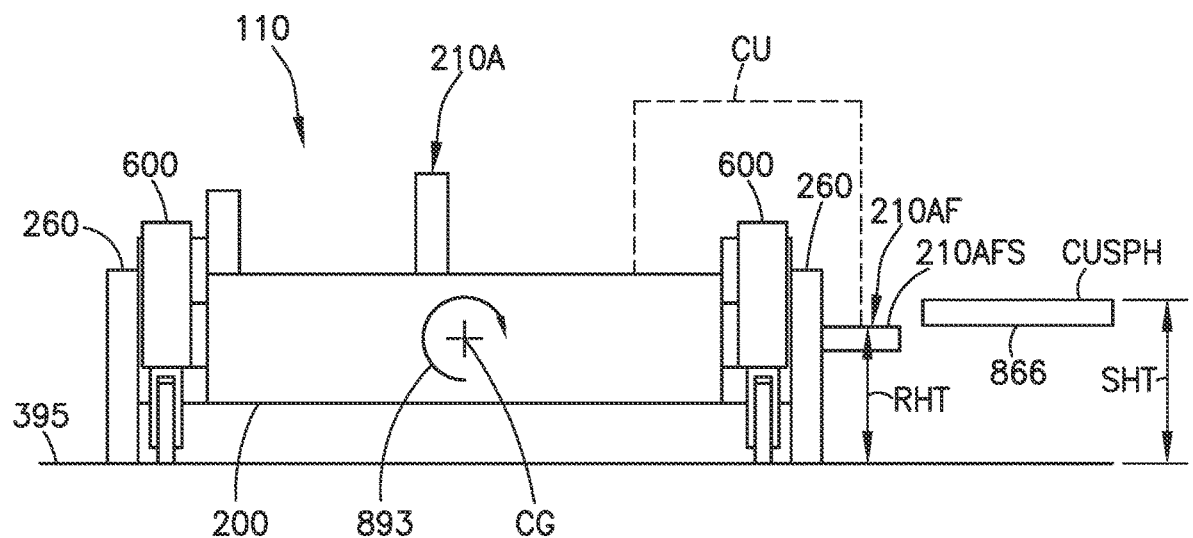
FIG. 8B is a schematic elevation (end) view of the autonomous transport vehicle of FIG. 2 in accordance with aspects of the disclosed embodiment.

Referring now to FIGS. 2, 8A, and 8B, each drive wheel 260A, 260B has a height profile or envelope WHT relative to the rolling surface 395. The height profile WHT is substantially the same for each drive wheel 260A, 260B. Here, the drive wheels 260A, 260B are disposed so that a payload datum position PDP, defined by a case unit support surface 210AFS (also referred to herein as a payload seat surface), of the transfer arm 210A fingers 210AF is at a minimum distance MIND above the rolling surface 395. Here, the minimum distance MIND at which the payload datum position PDP is located is defined by the lowermost position of the case unit support surface 210AFS (e.g., relative to the rolling surface 395) that is allowed by the structure of the autonomous transport vehicle 110 that intervenes between the fingers 210AF of the transfer arm 210A and the rolling surface 395. The lowermost position of the case unit support surface 210AFS (e.g., relative to the rolling surface 395) that is allowed by the structure of the autonomous transport vehicle 110 is such that the minimum distance MIND and the payload datum position PDP extends within the height profile WHT of the traction drive wheels 260A, 260B (e.g., the minimum distance MIND is lower than the top or height of the drive wheels 260A, 260B). It is noted that the payload datum position PDP is coincident with and defined by the case unit support surface 210AFS of the fingers 210AF (also referred to as tines) of the transfer arm 210A (also referred to as an end effector) with the transfer arm 210A retracted into the payload bed 210B and lowered to its lowermost position—see FIG. 8A).

Figure 13:
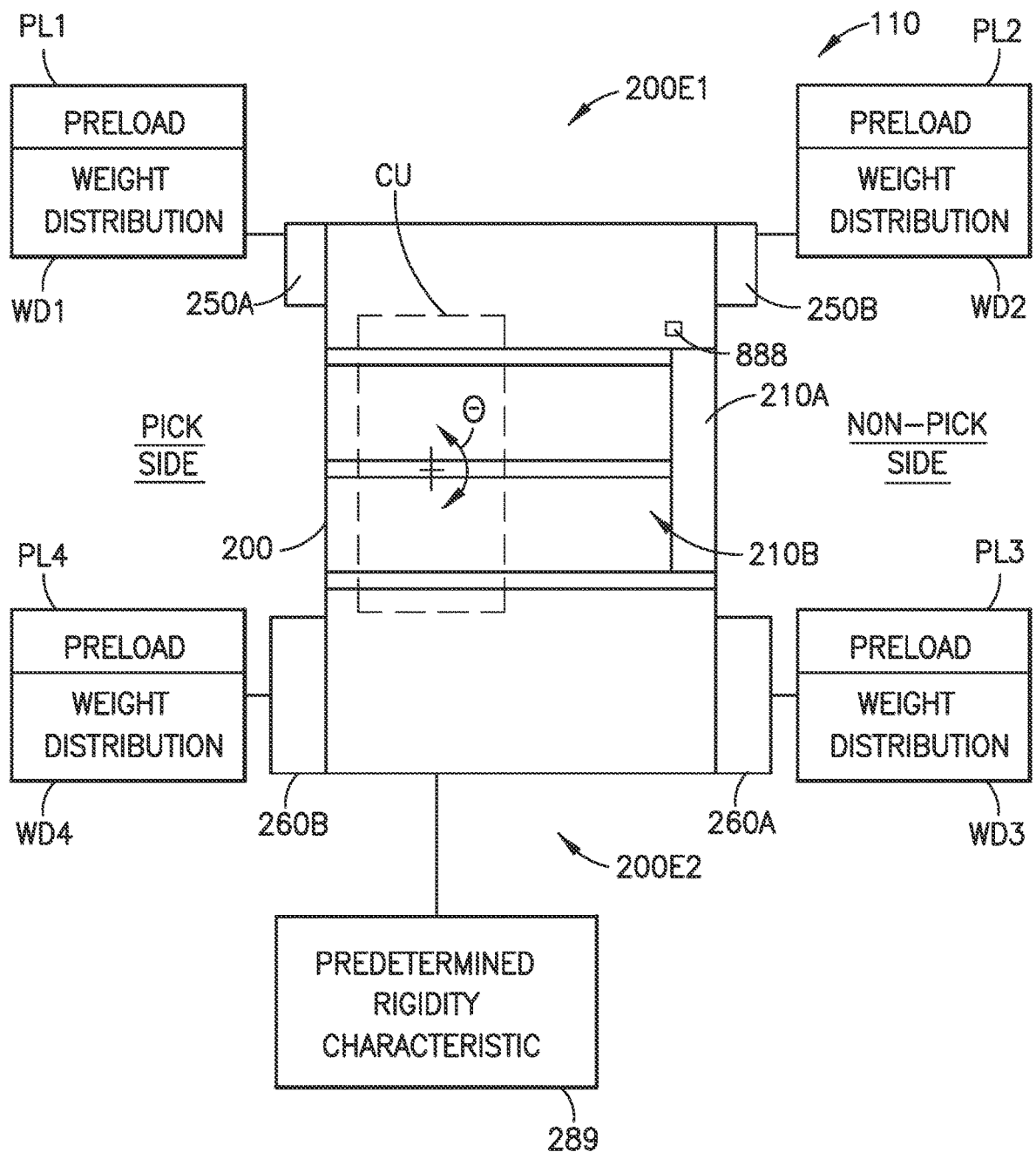
FIG. 13 is an exemplary plan illustration of the autonomous transport vehicle of FIG. 2 in accordance with aspects of the disclosed embodiment.

Referring now to FIGS. 2, 5A, 5B, 5C, and 5D, in one aspect the autonomous transport vehicle 110 includes a suspension lockout system 500 configured to stop movement of (e.g., lock) the independent multi-link suspension system 280 of one or more of the drive wheels 260A, 260B, e.g., the lockout system 500 is configured to lock one or more of the independent multi-link suspension system 280 for a respective drive wheel 260A, 260B in a predetermined position relative to the frame 200. For example, in one aspect, the independent multi-link suspension system 280 of drive wheel 260A may be locked from movement by a lock (described herein) of the suspension lockout system 500 while the independent multi-link suspension system 280 of the drive wheel 260B remains operable (or vice versa). In another aspect, the independent multi-link suspension system 280 of both drive wheels 260A, 260B may be automatically locked, such as by controller 1220) from movement by respective locks (described herein) of the suspension lockout system 500. Locking movement of one or more of the drive wheels 260A, 260B may facilitate transfer of payloads to and from the autonomous transport vehicle 110 by preventing rolling of the autonomous transport vehicle 110 about the longitudinal axis LAX due to, for example moments induced by cantilevered loads on the autonomous transport vehicle 110 that may compress the fully independent suspension on a side of the autonomous transport vehicle 110 from which the transfer arm 21A extends. Here the suspension may be automatically locked by the controller 1220 (e.g., with commands from the controller that effect actuation of the lock) while transferring loads to and from the autonomous transport vehicle 110 and automatically unlocked by the controller 1220 (e.g., with commands from the controller that effect release of the lock) while the autonomous transport vehicle is traversing the transfer deck 130B and picking aisles 130A. As an example, the controller 1220 is configured to receive sensor signals from any suitable sensor (e.g., transfer arm position sensor 888 (see FIGS. 8 and 13) or any other suitable sensor(s) that are configured to sense/detect extension and/or retraction of the transfer arm 210A) and based on the position of the transfer arm 210A (as determined from the sensors signals) effect automatic actuation of the lock/suspension lockout system 500 of a respective fully independent suspension 280 with extension of the transfer arm 210A from frame 200 (e.g., extension from the payload bed 210B and/or from the payload datum position PDP), and effect automatic release of the lock/suspension lockout system 500 of the respective fully independent suspension 280 with retraction of the transfer arm 210A into the frame 200 (e.g., retraction into the payload bed 210B and/or to the payload datum position PDP).

For exemplary purposes only the suspension lockout system 500 will be described with respect to the substantially vertically oriented shock absorbers, but it should be understood that the aspects of the suspension lockout system 500 are equally applicable to the substantially horizontally oriented shock absorbers described herein (see FIG. 3C). The suspension lockout system 500 includes a brake or lock 510 on the shock absorber 312 for each drive wheel 260. When the brake 510 is engaged, movement (e.g., extension and/or retraction) of the respective shock absorber 312 is prevented. When the brake 510 is released, the shock absorber 312 may extend and retract freely (e.g., uninhibited by the brake 510) to effect movement of a respective drive wheel 260 in the wheel travel direction SUS. The controller 1220 is in one or more aspects configured to automatically actuate the brake(s) 510 to prevent movement of the respective shock absorber 312 upon extension of the transfer arm 210A to transfer case units to and from the payload bed 210B. For example, any suitable sensors 888 (see FIG. 8A, e.g., motor current sensors, proximity sensors, etc.) may be provided on the autonomous transport vehicle 110 that detect extension of the transfer arm 210A. The sensors 888 send sensor signals to the controller 1220 and based on the sensor signals the controller 1220 actuates the brake(s) 510 so that the transfer arm extension substantially does not cause tilting/tipping of the frame 200 (e.g., tilting such as from compression of the fully independent suspension described herein due to cantilevered loading of the frame 200). In other aspects, the brake(s) 510 may be locked at any suitable time to effect any suitable autonomous transport vehicle 110 operation.

Figure 4C:
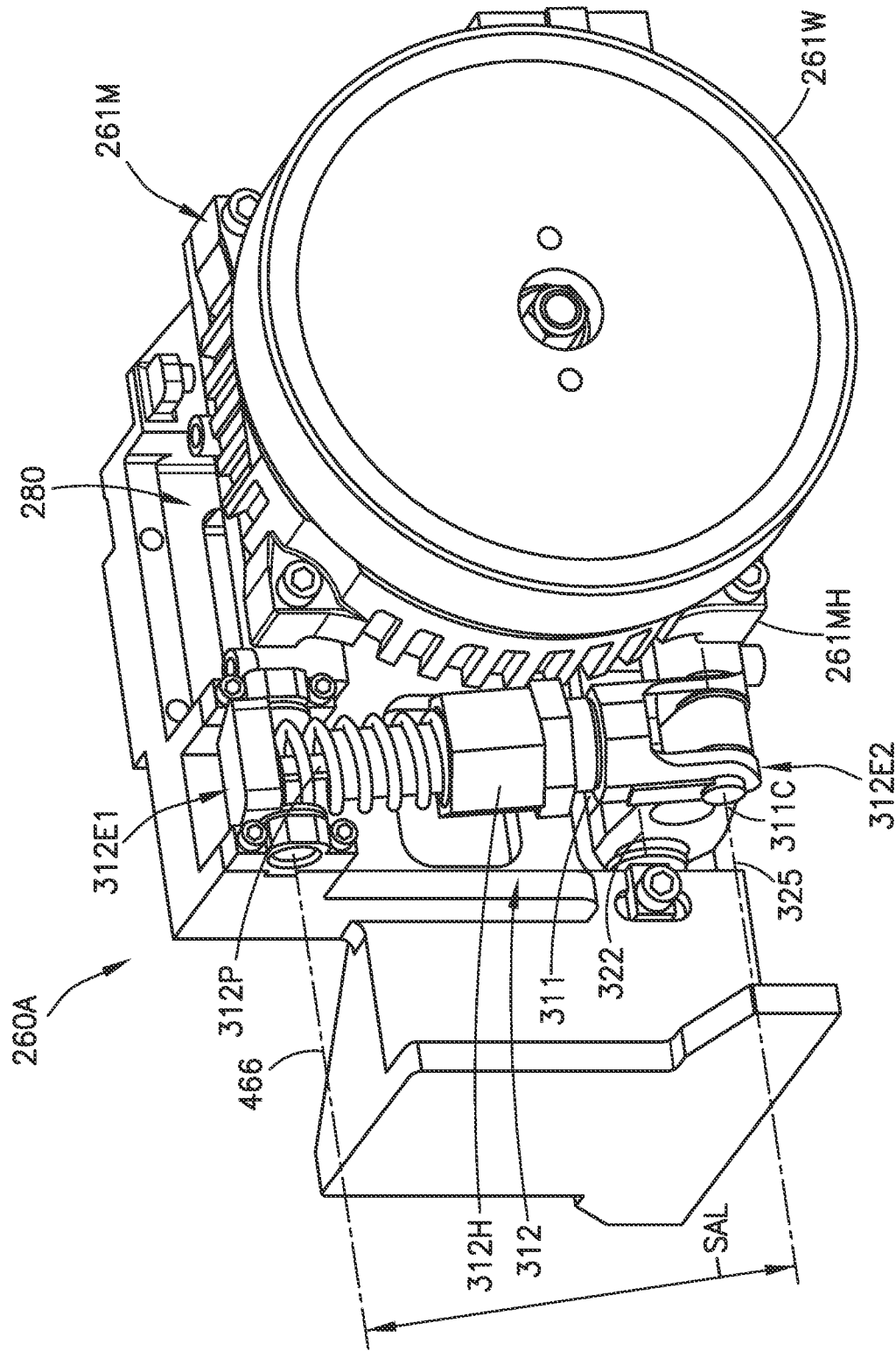
FIG. 4C is a schematic perspective illustration of a portion of the autonomous transport vehicle of FIG. 2 in accordance with aspects of the disclosed embodiment.
Figure 5A:
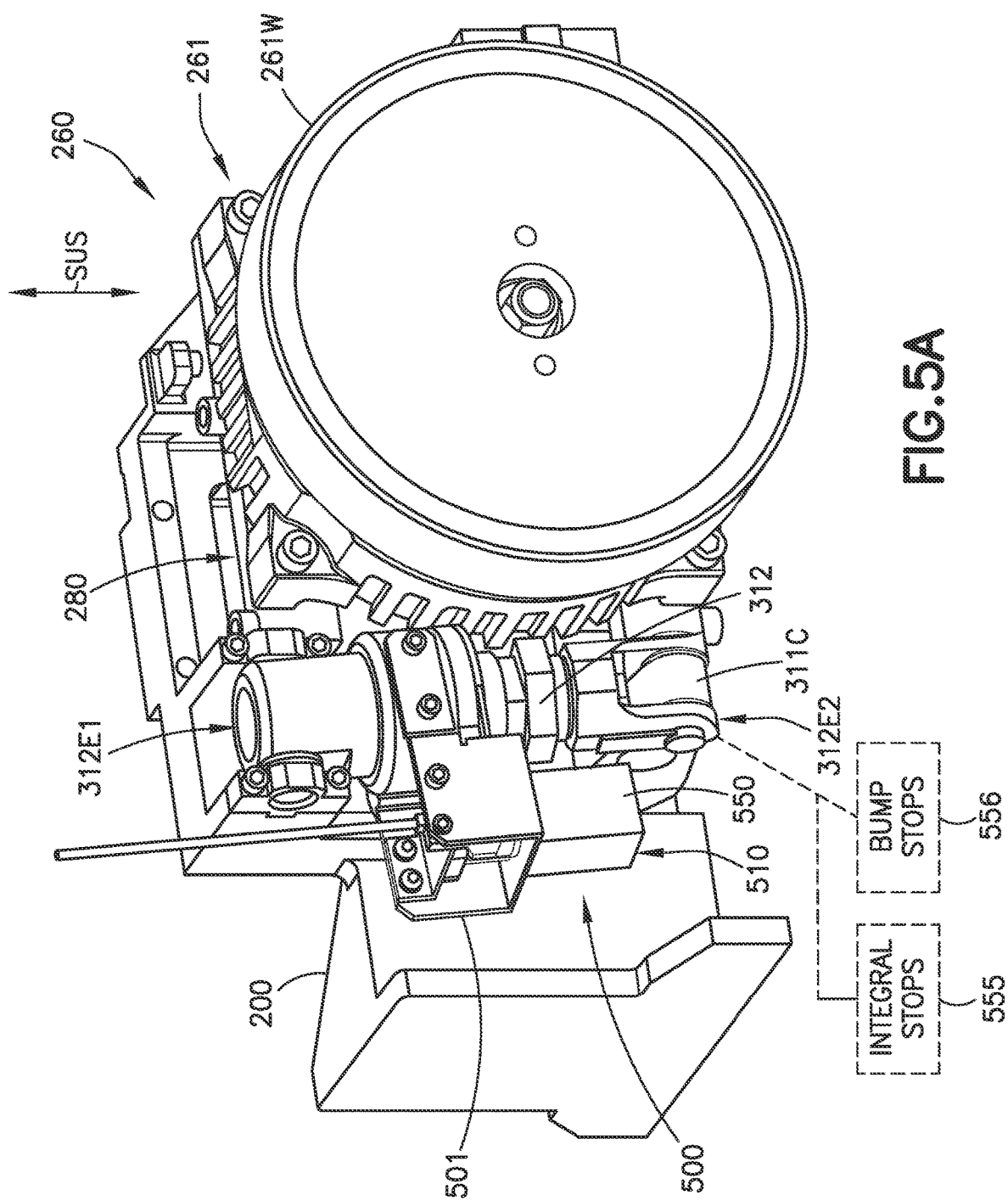
FIG. 5A is a schematic plan illustration of a portion of the autonomous transport vehicle of FIG. 2 in accordance with aspects of the disclosed embodiment.
Figure 5C:
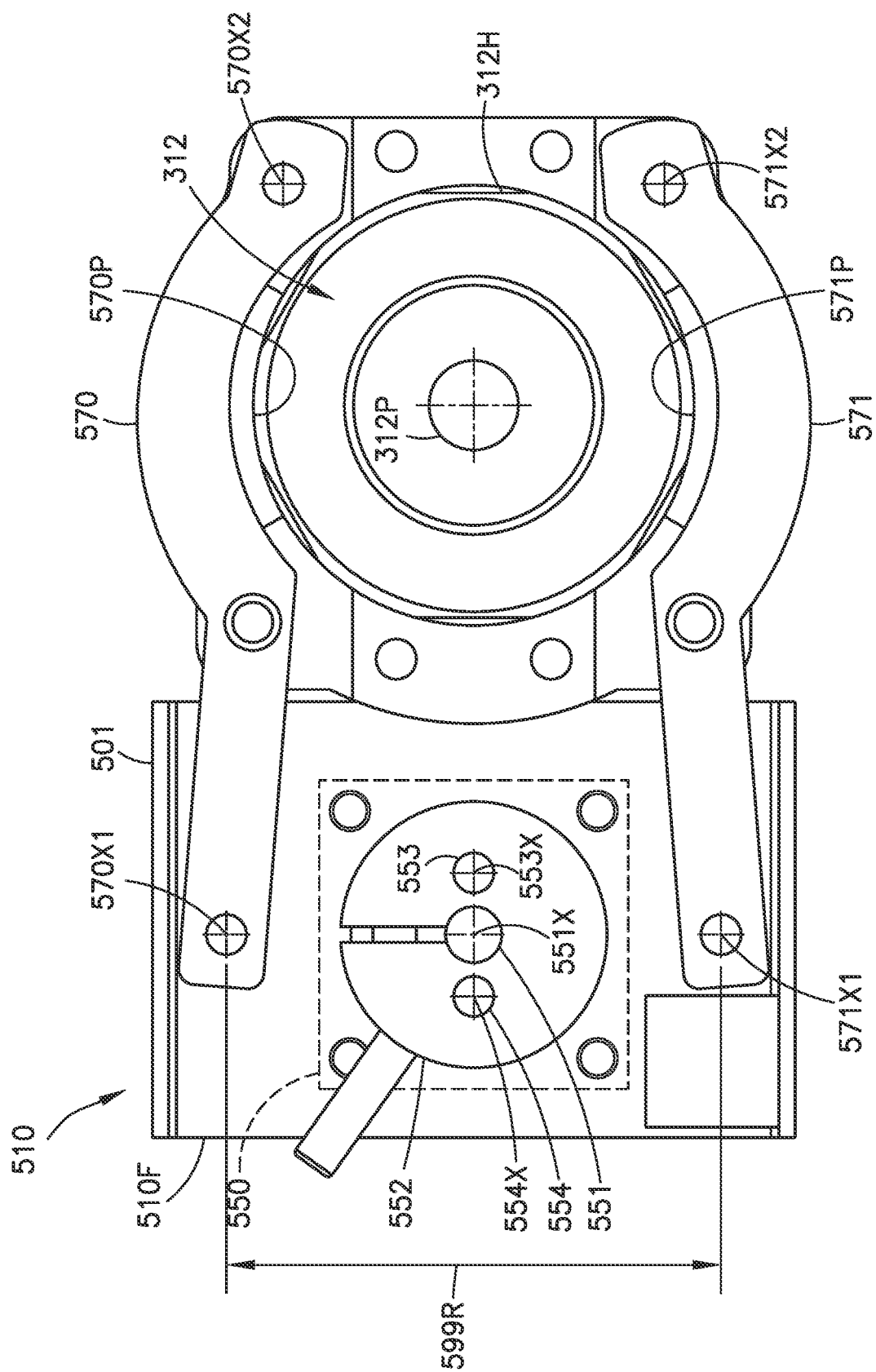
FIG. 5C is a schematic plan illustration of a portion of the autonomous transport vehicle of FIG. 2 in the first state in accordance with aspects of the disclosed embodiment.

Referring also to FIG. 4C, the shock absorber 312 includes a shock housing 312H and a piston 312P that extends from and reciprocates relative to the shock housing 312H (or vice versa depending on which end of the shock absorber is held stationary). In this example the piston 312P includes the first end 312E1 of the shock absorber 312 and the shock housing 312H includes the second end 312E2. As described above, the first end 312E1 (and hence the piston 312P) is coupled to the frame 200 about shock absorber pivot axis 466 where the shock absorber pivot axis 466 remains stationary (i.e., in a fixed unmovable position) relative to the frame 200. The second end 312E2 of the shock absorber 312 is coupled to the lower frame link 311 about the connecting link pivot axis 325, where the connecting link pivot axis 325 moves relative to the frame 200 as the wheel 261W moves in the wheel travel direction SUS. As will be described in greater detail below, the brake 510 engages the shock housing 312H (e.g., the reciprocating portion of the shock absorber 312) so as to prevent movement of the shock housing 312H and hence, prevents movement of the respective independent multi-link suspension system 280. It should be understood that in other aspects, such as where the piston 312P reciprocates relative to the shock housing 312H (such as in FIGS. 3C and 3D) the brake may engage the piston 312P so as to prevent movement of the shock housing 312H and hence, prevents movement of the respective independent multi-link suspension system 280.

Still referring to FIGS. 5A, 5B, 5C, and 5D, the brake 510 includes a frame 510F, a motor 550 (FIG. 5A), lock links 560, 561, and brake levers 570, 571. The configuration of the brake 510 illustrated is exemplary and in other aspects may have any suitable configuration. The motor 550 may be any suitable motor including but not limited to a stepper motor, a servo motor, linear actuator, etc. The motor 550 is coupled to the frame 510F in any suitable manner, such as with mechanical fasteners. A shaft collar 552 is coupled to an output shaft 551 of the motor 550, such as by friction or in any other suitable manner, so that the output shaft 551 drives rotation of the shaft collar 552. The shaft collar includes eccentric lock link pivots 553, 554, each having a respective lock link pivot axis 553X, 554X. Each lock link 560, 561 has a substantially "U" shaped configuration which includes a first end 560E1, 561E1 a second end 560E2, 561E1, and a base portion 560B, 561B that connects the respective first end 560E1, 561E1 to the respective second end 560E2, 561E2, where the first end 560E1, 561E1 and second end 560E2, 561E2 project from a common side of the respective base portion 560B, 561B to form the substantially "U" shaped configuration. In other aspects, the lock links 560, 561 may have any suitable configuration.

In one aspect, the first end 560E1 of the lock link 560 is coupled to eccentric lock link pivot 554 so as to pivot about lock link pivot axis 554X. The second end 560E2 of the lock link 560 is coupled to a first end 570E1 of brake lever 570 about a first brake lever pivot axis 570X1 so that the brake lever 570 pivots relative to the lock link 560. A second end 570E2 of the brake lever 570 is coupled to the frame 510F so as to pivot about second brake lever pivot axis 570X2.

Similarly, the first end 561E1 of the lock link 561 is coupled to eccentric lock link pivot 553 so as to pivot about lock link pivot axis 553X. The second end 561E2 of the lock link 561 is coupled to a first end 571E1 of brake lever 571 about a third brake lever pivot axis 571X1 so that the brake lever 571 pivots relative to the lock link 561. A second end 571E2 of the brake lever 571 is coupled to the frame 510F so as to pivot about fourth brake lever pivot axis 571X2. In other aspects, a linear actuator may extend between the pivot axes 570X1, 571X1 such that extension and retraction of the linear actuator effects movement of the brake levers 570, 571 to lock and release the brake 510.

Each of the brake levers 570, 571 include a friction pad 570P, 571P that are arranged relative to one another in an opposing relationship so as to grip and release shock housing 312H. As described above, the second ends 570E2, 571E2 of the brake levers 570, 571 are coupled to the frame 510F about a respective one of the second brake lever pivot axis 570X2 and the fourth brake lever pivot axis 571X2 so that a distance 598 between the second brake lever pivot axis 570X2 and the fourth brake lever pivot axis 571X2 is fixed and does not change. Rotation of the shaft collar 552 by the motor 550 causes an eccentric rotation of the lock links 560, 561 so that the lock links 560, 561 push or pull (depending on a direction of rotation of the shaft collar 552) the first end 570E1, 571E1 of the respective brake lever 570, 571 so that a distance between the first brake lever pivot axis 570X1 and the third brake lever pivot axis 571X1 increases or decreases (depending on a direction of rotation of the shaft collar 552). For example, the brake 510 is shown in a released configuration in FIGS. 5B and 5C where the friction pads 570P, 571P are not in contact with the shock housing 312H (i.e., the respective independent multi-link suspension system 280 is free to move). The brake is shown in a locked configuration in FIG. 5D where the friction pads 570P, 571P are in contact with the shock housing 312H (i.e., the respective independent multi-link suspension system 280 is locked to stop wheel travel in wheel travel direction SUS). In the unlocked configuration the distance between the first brake lever pivot axis 570X1 and the third brake lever pivot axis 571X1 is distance 599R. In the locked configuration the distance between the first brake lever pivot axis 570X1 and the third brake lever pivot axis 571X1 is distance 599C, where the distance 599C is less than the distance 599R.

To lock the brake 510 from the unlocked configuration the shaft collar 552 is rotated in direction 580 (FIG. 5D) so that the lock links 560, 561 move the first ends 570E1, 571E1 of the brake levers 570, 571 towards each other to reduce/decrease the distance between the first brake lever pivot axis 570X1 and the third brake lever pivot axis 571X1 to distance 599C so that the friction pads 570P, 571P contact the shock housing 312H. For example, when the shaft collar 552 is rotated in direction 580, the lock link 560 moves the first end 570E1 of the brake lever 570 in direction 507 while lock link 561 moves the first end 571E1 of the brake lever 571 in the opposite direction 508.

To unlock the brake 510 from the locked configuration the shaft collar 552 is rotated in direction 581 (FIG. 5B) so that the lock links 560, 561 move the first ends 570E1, 571E1 of the brake levers 570, 571 away from each other to increase the distance between the first brake lever pivot axis 570X1 and the third brake lever pivot axis 571X1 to distance 599R so that the friction pads 570P, 571P are not in contact with the shock housing 312H. For example, when the shaft collar 552 is rotated in direction 581, the lock link 561 moves the first end 571E1 of the brake lever 571 in direction 507 while lock link 560 moves the first end 570E1 of the brake lever 570 in the opposite direction 508.

As can be seen in FIG. 5D, the "U" shaped configuration of the lock links 560, 561 provide for an over-center locking of the brake levers 570, 571 in the locked configuration substantially without aid of force by the motor 550. For example, referring to FIGS. 5D and 5E with the brake 510 in the locked configuration, the friction pads 570P, 571P are compressed against the shock housing 312H which causes force F1 to be exerted by the brake lever 571 on the second end 561E2 of lock link 561 at the third brake lever pivot axis 571X1 (a similar force is exerted on the second end 560E2 of lock link 560 by brake lever 570). The force F1 on the lock link 561 in turn generates force F2 at the lock link pivot axis 553X (a similar force is generated at lock link pivot axis 554X). As can be seen in FIG. 5E the forces F1, F2 may be substantially equal in magnitude and are located on opposite sides of the center (e.g., axis of rotation 551X) of the drive shaft 551/shaft collar 552 (i.e., over-center) such that a moment generated about axis of rotation 551X by force F2 cancels out another moment generated about axis of rotation 551X by force F1 so as to maintain the brake 510 in the locked configuration substantially without aid from the motor 550. The motor 550 provides sufficient torque to overcome the over-center locking so as to move the brake levers 570, 571 between the locked and unlocked configurations.

Figure 6A:
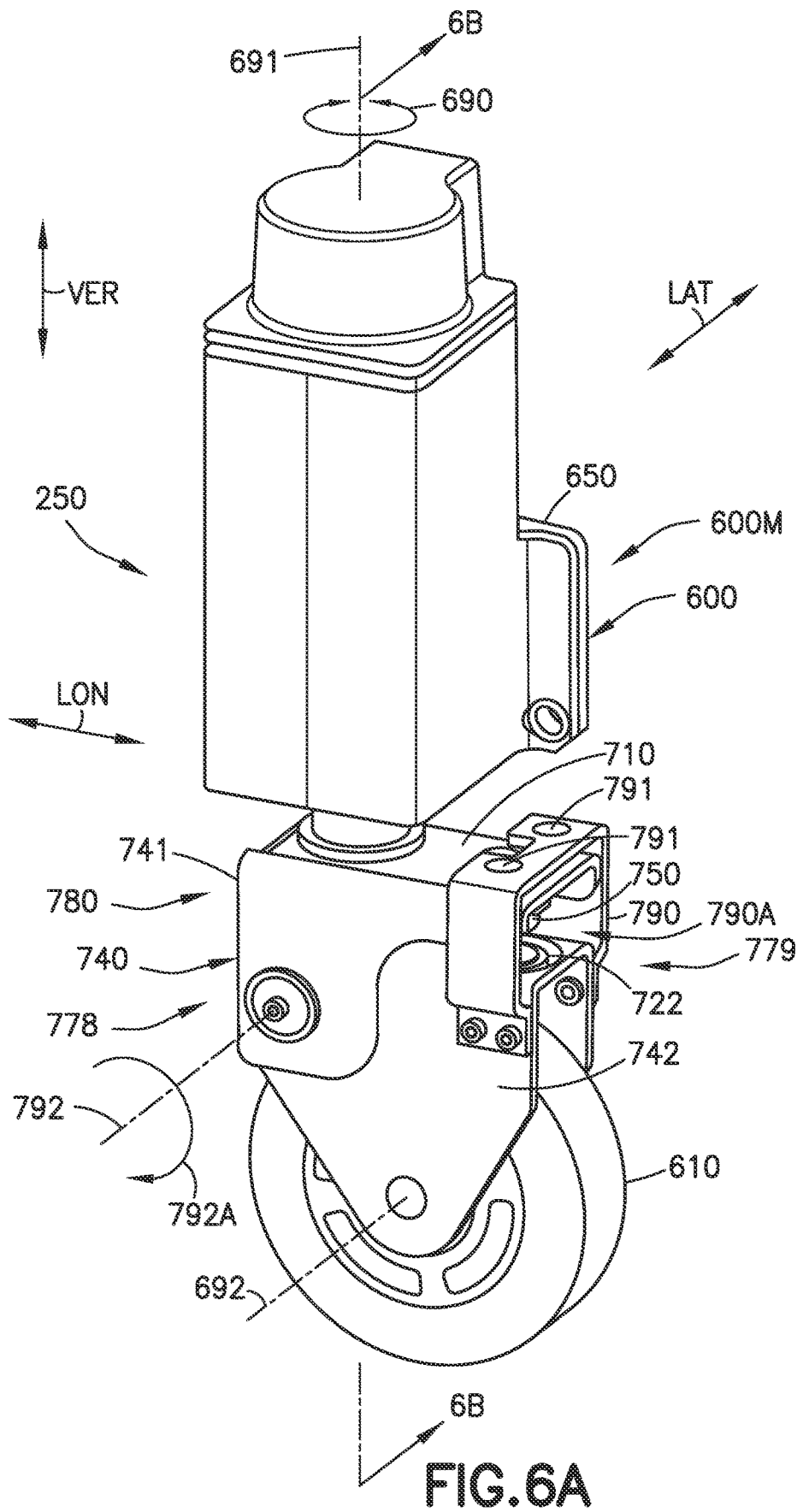
FIG. 6A is a schematic perspective illustration of a portion of the autonomous transport vehicle of FIG. 2 in accordance with aspects of the disclosed embodiment.
Figure 6B:
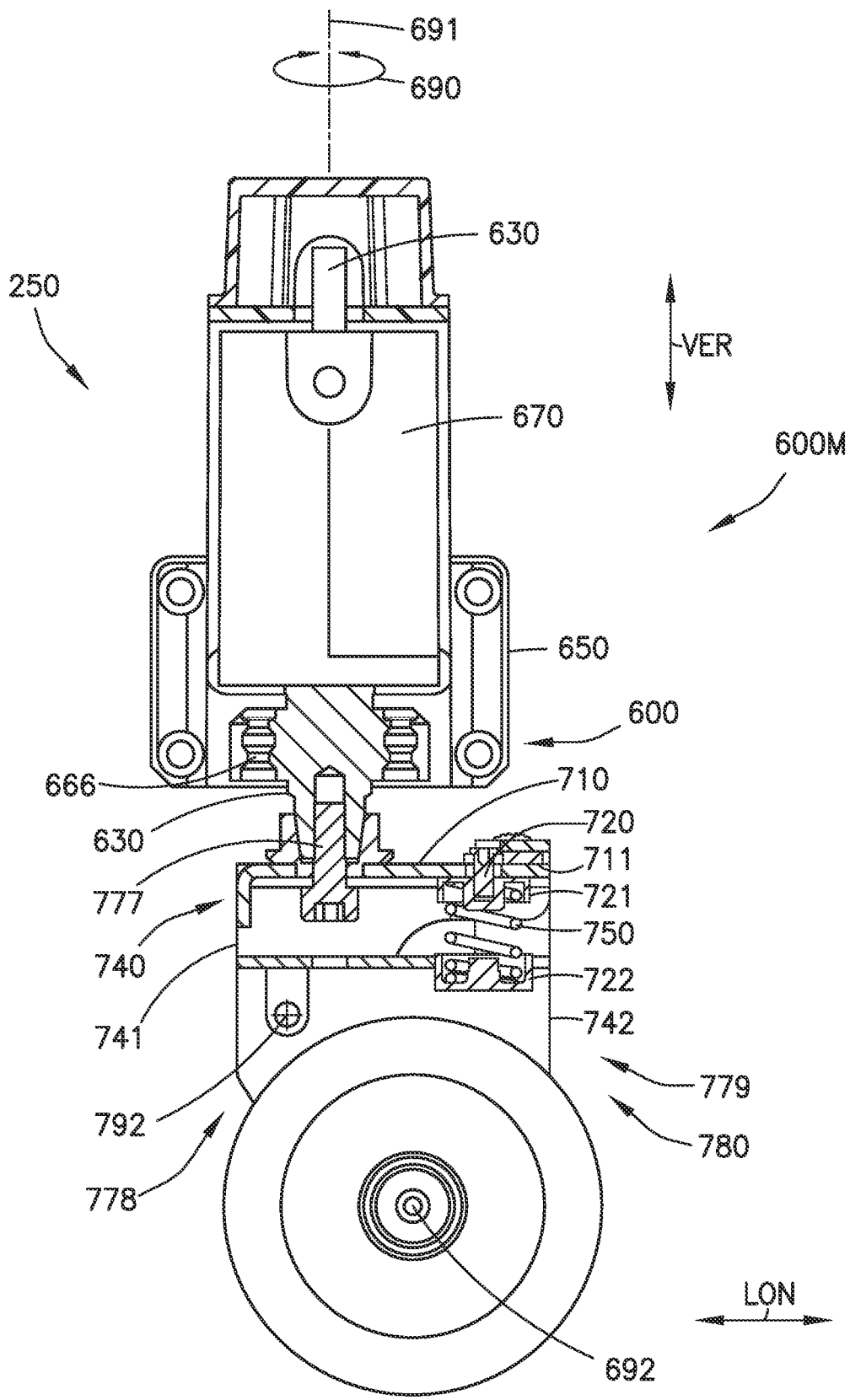
FIG. 6B is a schematic partial section view of the portion of the autonomous transport vehicle of FIG. 6A in accordance with aspects of the disclosed embodiment.

As described above, the frame 200 includes one or more idler wheels 250 disposed adjacent the front end 200E1. In one aspect, an idler wheel 250 is located adjacent each front corner of the frame 200 so that in combination with the drive wheels 310 disposed at each rear corner of the frame 200, the frame 200 stably traverses the transfer deck 130B and picking aisles 130A of the storage structure 130. Referring to FIGS. 2, 6A, and 6B, in one aspect, each idler wheel 250 comprises any suitable caster 600. In one aspect, the caster 600 is an un-motorized or passive caster 600P (see FIG. 2) where the wheel 610 of the caster 600P pivots passively in direction 690 about caster pivot axis 691 in response to changes in a travel direction of the autonomous transport vehicle 110. In other aspects, the caster 600 is a motorized caster 600M (see FIGS. 2, 6A, and 6B) that is configured to actively pivot the wheel 610 in direction 690 about caster pivot axis 691.

Regardless of whether the caster 600 is a passive caster 600P or a motorized caster 600M the caster 600 includes an articulated fork 740 suspension system as described herein. The articulated fork caster 600S in combination with the drive wheels 260 provide the autonomous transport vehicle 100 with independent suspension at all four corners of the frame 200 to effect the stable traverse of the frame 200 along/on the transfer deck 130B and picking aisles 130A of the storage structure 130 as described in greater detail herein.

In one or more aspects, where the casters 600 are motorized casters 600M, each motorized caster 600M includes a frameless motor 670 that is integrated into a caster frame 650 and includes a caster pivot shaft 630. The caster pivot shaft 630 is rotatably coupled to the caster frame 650 by any suitable bearings 666 and is driven in rotation about axis 691 by the frameless motor 670. The frameless motor 670 may be a servo motor, a stepper motor, or any other suitable type of motor configured to provide controlled intermittent bi-directional rotation of the articulated fork 740 (and the wheel 610 coupled to the articulated fork 740) about the pivot axis 691.

Figure 7B:
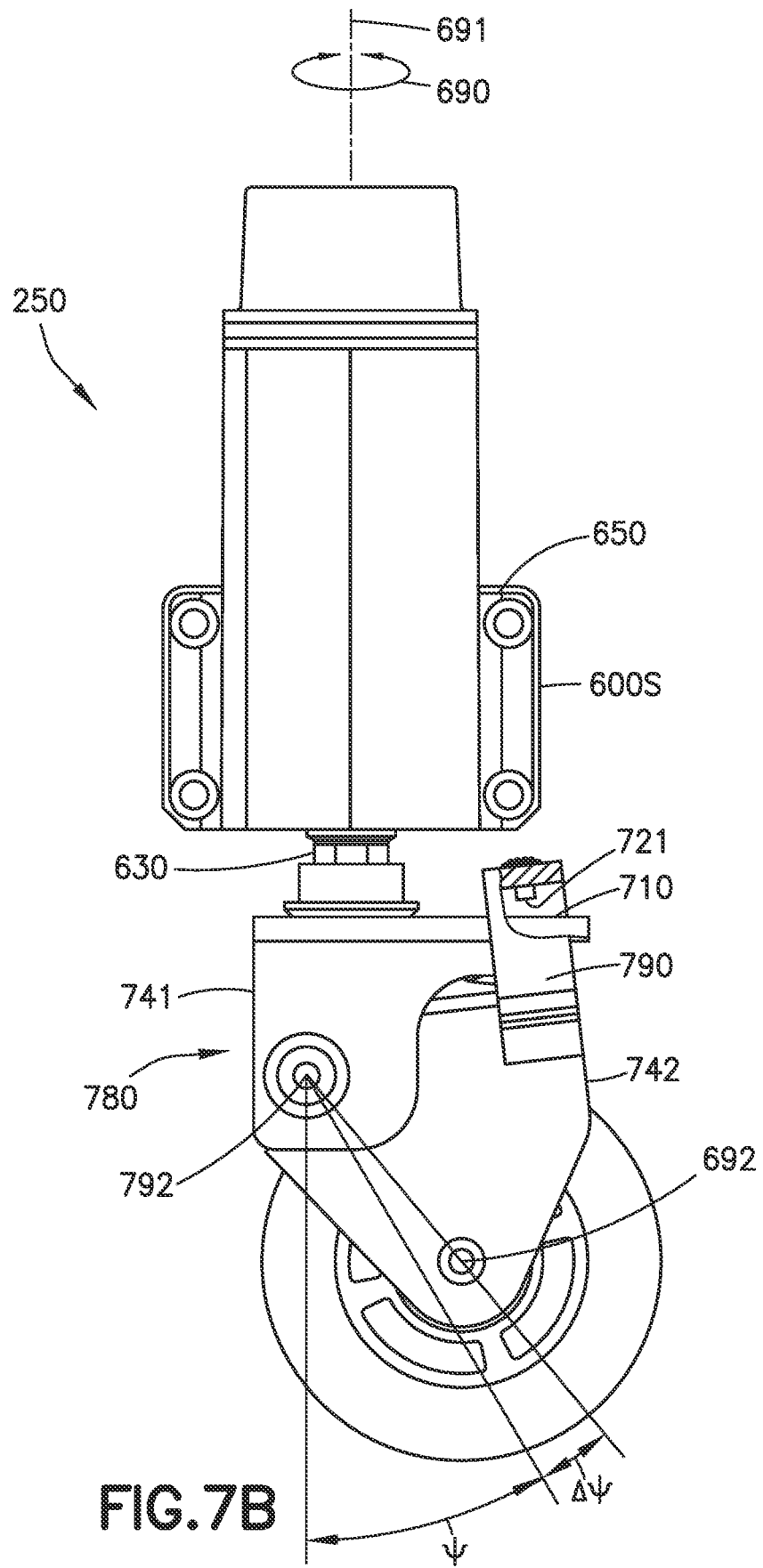
FIG. 7B is a schematic elevation view of the portion of the autonomous transport vehicle of FIG. 6A in a second state in accordance with aspects of the disclosed embodiment.

The caster 600 having the articulated fork 740 is illustrated in FIGS. 7A and 7B as a motorized caster 600M for exemplary purposes only; however, in other aspects the caster 600 having the articulated fork 740 may be the passive caster 600P described above. As noted above, the caster 600 (whether motorized or passive) in combination with the drive wheels 260 provide the autonomous transport vehicle 110 with four-wheel fully independent suspension (i.e., an independent suspension at each of the four corners of the frame 200). The four-wheel fully independent suspension is configured for autonomous transport vehicle handling/vehicle drive dynamics with different/variable suspension geometries at the front end 200E1 (and at each corner of the front end 200E1) and at the rear end 200E2 (and at each corner of the rear end 200E2) of the autonomous transport vehicle 110. The different/variable suspension geometries effect synergism in autonomous transport vehicle 110 handling/vehicle drive dynamics between each of the articulated fork casters 600S and drive wheels 260 as well as wheel compliance (e.g., relative to the rolling or vehicle travel surface 395—see FIGS. 3A and 3B) in wheelbase (i.e., wheel compliance between the front end 200E1 and the back end 200E2), wheel compliance in wheel track (i.e., wheel compliance between the lateral sides 200LS1, 200LS2—see FIG. 2), and diagonal wheel compliance (i.e., wheel compliance between opposite front and back corners FC1, RC2 and wheel compliance between opposite front and back corners FC2, RC1—see FIG. 2). The articulated fork casters 200S in combination with the drive wheels 260 provide the autonomous transport vehicle 110 with and maintains a stable platform when the autonomous transport vehicle 110 picks and places case units CU and traverses the rolling surface 390.

As noted above, each of the caster 600 includes a fully independent suspension 780 that has the articulated fork 740 which is coupled to the caster pivot shaft 630 (or in other aspects a caster pivot shaft of the passive caster 600P) in any suitable manner, such as with any suitable mechanical and/or chemical fastener 777. The articulated fork 740 includes a fork frame 741 and a fork pivot arm 742. The fork frame 741 includes a leading end 778 that leads travel of the articulated fork caster 600S. The fork frame 741 also includes a trailing end 779 that trails travel of the caster 600. The fork frame 741 defines a pivot axis 792 adjacent the leading end 778 where the fork pivot arm 742 is coupled to the fork frame 741 for rotation about pivot axis 792. The wheel 610 is coupled to the fork pivot arm 742 about axis of rotation 692 so that the wheel 610 and fork pivot arm 742 rotate about axis 792 as a unit.

The rotational (or pivoting) motion between the fork frame 741 and the fork pivot arm 742 is biased against a stop, so that the autonomous transport vehicle 110 frame 200 is substantially level with the rolling surface 395 (see FIGS. 3A, 3B, 8A and 8B). For example, the rotational (or pivoting) motion between the fork frame 741 and the fork pivot arm 742 is limited by a suspension travel stop 790 that extends from the fork pivot arm 742 so as to substantially contact or otherwise engage, adjacent the trailing end 779, a stop surface 710 of the fork frame 741. In the example illustrated in FIGS. 6A, 6B, 7A, and 7B the suspension travel stop 790 forms an "open boxed frame" with an aperture 790A (FIG. 6A) defined thereby. The fork frame 741 extends into the aperture 790A so that the stop surface 710 of the fork frame 741 engages one or more corresponding stop surfaces 721 of the suspension travel stop 790. The stop surfaces 721 are one or more protruding surfaces (e.g., ends of pins 791 integrally formed with or otherwise coupled to and forming a part of the suspension travel stop 790) that extend from the "open boxed frame" towards the stop surface 710; however, in other aspects the one or more surfaces 721 have any suitable configuration for contacting/engaging the stop surface 710 of the fork frame 741.

As can be seen in FIGS. 6A, 6B, 7A, and 7B, the suspension travel stop 790 is configured to arrest rotational movement of the fork pivot arm 742 in direction 792A (FIG. 6A) relative to the fork frame 741. It is noted that the configuration of the suspension travel stop 790 is exemplary and in other aspects the suspension travel stop may have any suitable configuration for arresting rotational movement of the fork pivot arm 742 in direction 792A (FIG. 6A) relative to the fork frame 741.

The caster 600 includes a biasing member 750 disposed between the fork frame 741 and fork pivot arm 742. The biasing member 750 is illustrated as a compression spring; however, in other aspects the biasing member 750 may be a torsion spring or bar disposed to apply biasing torque in direction 792A against the fork pivot arm 742 at the axis of rotation 792 or any other suitable resilient member configured to bias rotation of the fork pivot arm about axis of rotation 792 in direction 792A.

The caster 600 includes one or more seats 711, 722, e.g., spring seats or other receiving members configured to receive ends of the biasing member 750 and restrain movement of the ends of the biasing member 750 relative to a respective one of the fork frame 741 and fork pivot arm 742. For example, one end of the biasing member 750 is retained within a seat 722 of the pivoting fork arm 742 so as to be restrained from movement in the directions LON, LAT, VER (see FIGS. 6A, 6B). The seat 722 is coupled to the fork pivot arm 742 in any suitable manner or is integrally formed with the fork pivot arm 742.

The other end of the biasing member 750 is retained within a seat 711 that is movably coupled to the fork frame 741 so as to reciprocate in a direction VER, where the direction VER extends along the caster pivot axis 691. For example the seat includes a recess that receives an adjustment member 711 (e.g., screw or other movable post) so that the adjustment member 711 restrains movement of the seat 721 in direction LAT and in direction LON while effecting movement of the seat 722 in direction VER. For example, the fork frame 741 includes a threaded aperture (shown in FIG. 6B) through which the adjustment member 711 extends and to which the adjustment member is threadably engaged (e.g., the adjustment member 711 includes threads that mate with the threads of the threaded aperture). Rotation of the adjustment member 711 about its axis of rotation drives adjustment member 711 and the seat 721 (against the biasing force of the biasing member 750) in direction VER to compress or relax the biasing member 750 so as to set a preload exerted by the biasing member 750 on the fork pivot arm 742. In one or more other aspects, the seat 721 is fixed to the fork frame 741 so as to be stationary, relative to the fork frame 741, in directions LON, LAT, VER where the preload of the biasing member 750 is set (not-adjustable) by (or with) a configuration of the biasing member (e.g., a length of the biasing member, a number of coils, a spring rate, biasing member wire thickness, etc.).

As may be realized, the autonomous transport vehicle carries case units CU having different weights and sizes (e.g., for exemplary purposes only the case units CU may weigh up to about 60 lbs or more). Here the weight/mass supported by the autonomous transport vehicle 110 suspension varies depending on the case unit CU being transported. The casters 600 are configured to resist any moments induced on the frame 200 when picking and placing the case units CU. For example, to transfer case units to and from the autonomous transport vehicle 110, the transfer arm 210A is extended and retracted as shown in, for example, FIG. 8B. With the transfer arm 210A extended, fingers 210AF of the transfer arm 210A and any case unit CU held on the fingers 210AF are cantilevered from the frame 200, where the cantilevered fingers 210AF and case unit CU create a moment 893 (see FIG. 8B) about, for example, a center of gravity CG of the autonomous transport vehicle 110. This moment 893, left un-countered, would cause the autonomous transport vehicle 110 to tilt/tip and become un-level relative to the rolling surface 395 and any case unit holding location 866 to and from which case units CU are picked/placed. Here, the spring rate and spring preload of the at least the biasing member 750 of each caster 600 is configured so that when the heaviest case unit CU expected to be handled by the autonomous transport vehicle 110 is being held by the cantilevered fingers 210AF (such as during a pick/place action of the transfer arm 210A), the stop surface 710 of the fork frame 741 is substantially engaged with (e.g., in substantial contact with) the one or more corresponding stop surfaces 721 of the suspension travel stop 790 and the autonomous transport vehicle 110 remains level relative to the rolling surface 395 and any case unit holding location 866 to and from which case units CU are picked/placed.

In addition to maintaining the autonomous transport vehicle 110 level, the casters 600 are configured to maintain a consistent ride height RHT (which is coincident with the payload datum position PDP) of the autonomous transport vehicle 110. To maintain the consistent ride height RHT (e.g., so the ride height does not change regardless of the case unit weight/mass held by the autonomous transport vehicle 110) the spring rate and the spring preload of at least the biasing member 750 of each caster 600 is sized so that when the heaviest case unit CU expected to be handled by the autonomous transport vehicle 110 is being held by the autonomous transport vehicle 110, the stop surface 710 of the fork frame 741 is substantially engaged with (e.g., in substantial contact with) the one or more corresponding stop surfaces 721 of the suspension travel stop 790. As may be realized, the shock absorber 312 of the multi-link suspension system 280 (see FIGS. 3C, 3D, and 4A-4C) is configured with a spring rate and spring preload that is sized so that when the heaviest case unit CU expected to be handled by the autonomous transport vehicle 110 is being held by the autonomous transport vehicle 110, the ride height RHT is maintained.

Referring also to FIGS. 2, 8A, and 8B, the frame 200 includes wheel interfaces 222A-222D. Each of the drive wheels 260 is coupled to the frame 200 at a respective interface 222A, 222B, where the interface 222A, 222B couples the drive wheel 260 to the frame 200 at a known location on the frame 200. The interfaces 222A, 222B, in one or more aspects, include the multilink suspension system 280 link-to-frame mounting points (axes) described herein; while in other aspects, the drive wheels 260 and multilink suspension system 280 are provided as a modular unit, where the modular unit has a frame mount configured to couple with the interface 222A, 222B. Each of the casters 260 is coupled to the frame 200 at a respective interface 222C, 222D, where the interface 222C, 222D couples the caster 260 to the frame 200 at a known location on the frame 200. The interfaces 222C, 222D includes coupling features (e.g., threaded holes, locating pins, recesses, stop surfaces, etc.) that mate with the corresponding coupling features (e.g., recesses, locating pins, fastener through holes, stop surfaces, etc.) of the caster frame 650.

Mounting the casters 600 and the drive wheels 620 to the frame at known locations in combination with known suspension geometry of each of the casters 600 and drive wheels 620 facilitates setting the ride height RHT of the autonomous transport vehicle 110. For example, with respect to the casters 600, the biasing member 750 biases the one or more stop surfaces 721 of the fork pivot arm 742 against the stop surface 710 of the fork frame 741 to set an angle $\Psi$ between the axis of rotation 792 of the fork pivot arm 742 and the axis of rotation 692 of the wheel 610, where the angle $\Psi$ is measured relative to a datum DAT1 that is defined by an axial direction of extension of the caster pivot axis 691 (See FIG. 7A). This angle $\Psi$ at least in part sets a ride height RHT of the autonomous vehicle 110 relative to the rolling surface 395.

The multi-link suspension system 280 of each drive wheel 260 is also configured to have a predetermined extension that at least in part sets the ride height RHT. For example, the shock absorbers 312, in one or more aspects, include integral stops 555 (such as between the piston 312P and the shock housing 312H—see FIG. 5A) that limit the extension of the shock absorber to a known length SAL (see FIG. 4C); while in other aspects the extension travel of the shock absorbers 312 (and of the multi-link suspension system 280) is limited in any suitable manner, including but not limited to, bump stops 556 (see FIG. 5A) mounted to the frame 200 that interface with and arrest travel of one or more suspension links of the multi-link suspension system 280.

As can be seen in FIGS. 8A and 8B, the ride height RHT (and payload datum position PDP) of the autonomous transport vehicle 110 is measured from the rolling surface 395 to a case unit support surface 210AFS (also referred to herein as a payload seat surface) of the transfer arm 210A fingers 210AF; however, in other aspects the ride height RHT can be measured from the rolling surface 395 to any suitable location on the autonomous transport vehicle 110 (such as the bottom of the frame 200 or any other suitable location. Here the ride height RHT is set so that the transfer arm 210A can access (i.e., pick and place) case units CU at each case unit holding location accessible from the transfer deck 130B and picking aisles 130A. For example, as illustrated in FIG. 8B the ride height RHT corresponding to the case unit support surface 210AFS of the fingers 210AF is lower than a height SHT of a case unit support plane CUSPH of case unit holding location 866 so that the transfer arm 210A is raised and lowered for picking and placing case units from and to the case unit holding location 866.

As described herein, the ride height RHT (which is coincident with the payload datum position PDP) is at a minimum distance MIND above the rolling surface 395. The minimized distance of the ride height RHT from the rolling surface 395 effects placement of the case unit support plane CUSPH of the case unit holding location 866 (e.g., such as a shelf of a storage rack in a picking aisle or other suitable location of the storage structure 130) closer to the rolling surface 395 compared to conventional storage and retrieval systems. Here, the vertical storage density of storage structure 130 (and of the storage and retrieval system 100) may be increased based on the minimized ride height RHT of the autonomous transport vehicle 100.

In accordance with the aspects of the disclosed embodiment, referring to FIGS. 2, 3C, 3D, 6B, and 13 the fully independent suspension of the autonomous transport vehicle is tuned (such as by adjusting the preload as described herein) to minimize transient vibration induced to the storage structure (e.g., which vibrations may cause movement/migration of case units from predetermined locations on a storage shelf or other case unit holding location) by traverse of the autonomous transport vehicle 110 over the rolling surface 395 of the transfer deck 130B and/or picking aisle 130A, as well as to minimize transient vibrations of the autonomous transport vehicle 110 as the autonomous transport vehicle traverses the rolling surface 395. The frame 200 of the autonomous transport vehicle 110 has a predetermined rigidity characteristic 289 (e.g., a vibrational characteristic of the frame) that defines a transient response of the frame 200 from transient loads imparted to the frame 200 via at least one of the at least one caster wheel 250A, 250B and at least one traction drive wheel 260A, 260B.

The predetermined rigidity characteristic 289 is set (e.g., tuned) based on a predetermined transient response characteristic (e.g., one or more of response frequency, impact G-force in the X, Y, and/or Z directions, and acceleration in the X, Y, and/or Z directions) of the fully independent suspension 780, 280 of at least one of the at least one caster wheel 250A, 250B and the at least one traction drive wheel 260A, 260B and/or the a predetermined transient response characteristic of the fully independent suspension 780, 280 of at least one of the at least one caster wheel 250A, 250B and the at least one traction drive wheel 260A, 260B is set (e.g., tuned) based on the predetermined rigidity characteristic 289 of the frame 200. The predetermined rigidity characteristic 289 may also be set/tuned based on a predetermined transient response characteristic e.g., one or more of response frequency, impact G-force in the X, Y, and/or Z directions, and acceleration in the X, Y, and/or Z directions) of the frame 200 determining the transient response of the frame 200 from transients of the at least one caster wheel 250A, 250B and at least one drive wheel 260A, 260B rolling on the rolling surface 395. The predetermined rigidity characteristic 289 of the frame 200 determines the frame 200 as being substantially rigid relative to the fully independent suspension of at least one caster wheel 250A, 250B and least one drive wheel 260A, 260B of the drive wheels 260A, 260B rolling on the rolling surface 395. The predetermined rigidity characteristic 289 may also be set based on a predetermined transient response characteristic of the frame 200 with the autonomous transport vehicle carrying a payload and/or without carrying a payload (e.g., unloaded).

For example, each of the biasing members 312, 750 at each corner of the autonomous transport vehicle 110 are preloaded with a respective preload P1, P2, P3, P4 that depends on one or more of a mass of the autonomous transport vehicle 110 and a payload (e.g., case units CU) to be carried by the autonomous transport vehicle 110. The preloads P1, P2, P3, P4 have, in some aspects, substantially similar values while in other aspects one or more of the preloads P1, P2, P3, P4 may be set to a different value than other ones of the preloads P1, P2, P3, P4. The preloads P1, P2, P3, P4 may also be set to provide any suitable weight distribution of the autonomous transport vehicle 110 (e.g., to set a portion of the weight of the autonomous transport vehicle and payload carried by each wheel).

As an exemplary preload arrangement, as noted herein, the preload PL1, PL2 of the casters 250A, 250B may each be set to a weight of the heaviest case unit CU transported by the autonomous transport vehicle so that as the transfer arm 210A is extended to transfer case units CU to and from the payload bed 210B the frame 200 remains substantially level (e.g., parallel) with the rolling surface 395 and, with the transfer arm 210A at its lowermost position within the payload bed 210B, at a predetermined height (e.g., the ride height RHT) set by the suspension travel stops 790. The preload PL3, PL4 of the drive wheels 290A, 260B may also be set to the weight of the heaviest case unit CU transported by the autonomous transport vehicle so that as the transfer arm 210A is extended to transfer case units CU to and from the payload bed 210B the frame 200 remains substantially level (e.g., parallel) with the rolling surface 395 and, with the transfer arm 210A at its lowermost position within the payload bed 210B, at the ride height RHT set by the stops 555, 556.

In other aspects, one or more of the preloads PL1, PL2, PL3, PL4 of the autonomous transport vehicle 110 may be set to a different value than one or more other preloads PL1, PL2, PL3, PL4. For example, the preloads PL1, PL3, PL4 may be set to a weight of the heaviest case unit CU transported by the autonomous transport vehicle 110 while preload PL2 is set to a load/weight less than the heaviest case unit CU transported by the autonomous transport vehicle 110. Setting the preload PL2 to a load/weight that is less than the heaviest case unit CU transported by the autonomous transport vehicle 110 may reduce peak vibrations/forces between the autonomous transport vehicle 110 and the rolling surface 395 such as where the autonomous transport vehicle 110 traverses a transient (e.g., a step, joint, debris, etc.) on the transport deck 130B and picking aisles 130A.

The preloads PL1, PL2, PL3, PL4 may be set so that the autonomous transport vehicle has about a 40% (front) to about a 60% (rear) weight distribution with the weight distribution, with the autonomous transport vehicle unloaded (e.g., not carrying a payload) between the pick side and non-pick side being substantially the same. It should be understood that while exemplary preloads and weight distributions have been described in other aspects any suitable preloads and weight distribution may be provided to effect minimization of vibration of the autonomous transport vehicle and effect minimization of induced vibrations to the storage structure from the traverse of the autonomous transport vehicle 110 over the rolling surface 395.

Figure 16A:
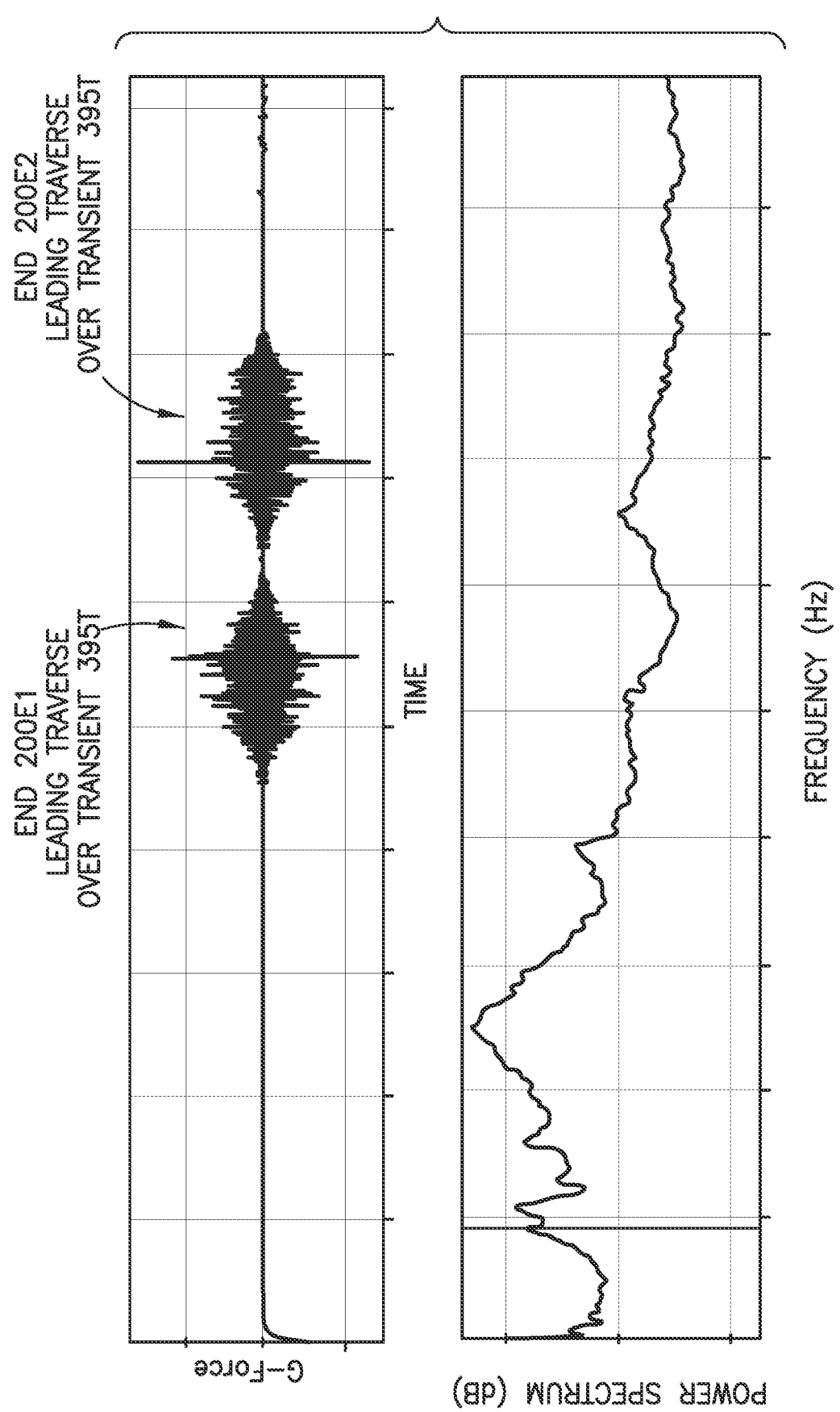
FIGS. 16A and 16B are exemplary plots illustrating tuning of a transient response of the autonomous transport vehicle of FIG. 2 unloaded (not carrying payload) in accordance with aspects of the disclosed embodiment.
Figure 16B:
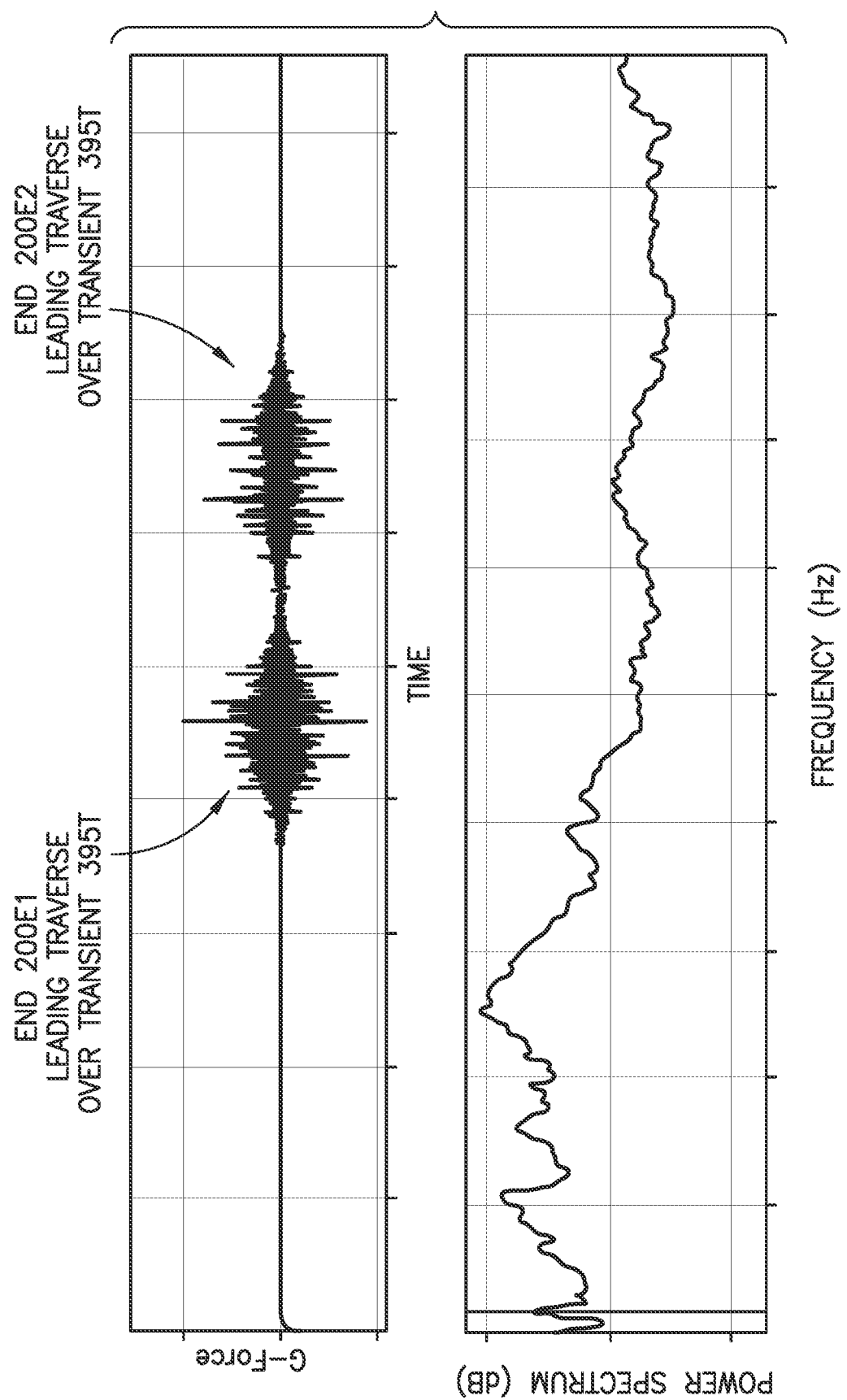

FIGS. 16A and 16B are exemplary plots/graphs illustrating tuning of predetermined rigidity characteristic of the autonomous transport vehicle 110 with the autonomous transport vehicle unloaded (e.g., not carrying a payload/case unit(s)). FIG. 16A illustrates the transient response (as G-force (i.e., force per unit mass due to gravity) and vibrational frequency) of a portion of the frame 200 in response to a transient 395T on the rolling surface 395 that is reacted by the fully independent suspension 780, 280 with the preloads PL1, PL3, PL4 of the fully independent suspension 780, 280 set to substantially the same value (such as set to the weight of the heaviest case unit carried by the autonomous transport vehicle) while preload PL2 is set to a lesser value than preloads PL1, PL3, PL4. FIG. 16B illustrates the transient response and vibrational frequency of the same portion of the frame 200 in response to the transient 395T on the rolling surface 395 that is reacted by the fully independent suspension 780, 280 with the preloads PL1, PL2, PL3, PL4 of the fully independent suspension 780, 280 set to substantially the same value (such as set to the weight of the heaviest case unit carried by the autonomous transport vehicle). As can be seen in FIGS. 16A and 16B both forward traverse (with end 200E1 leading the direction of traverse) and rearward traverse (with end 200E2 leading the direction of traverse) transient load responses of the frame 200 are illustrated with the autonomous transport vehicle 110 traversing over transient 395T on the rolling surface 395. As also can be seen in the transient load response of the frame 200 illustrated in FIG. 16B with the preload PL1, PL2, PL3, PL4 being substantially the same is less than the transient load response of the frame 200 illustrated in FIG. 16A with the preload PL2 being less than the preloads PL1, PL3, PL4.

As may be realized, the tuning illustrated in FIGS. 16A and 16B is exemplary only and that the preloads PL1, PL2, PL3, PL4 of each fully independent suspension at each corner of the frame 200 may be set to any suitable value to reduce/minimize the transient response of the frame to the transient loads imparted to the frame 200 by/through the at least one of the at least one caster wheel 250A, 250B and at least one traction drive wheel 260A, 260B for a given payload carried by the autonomous transport vehicle 110.

Figure 17A:
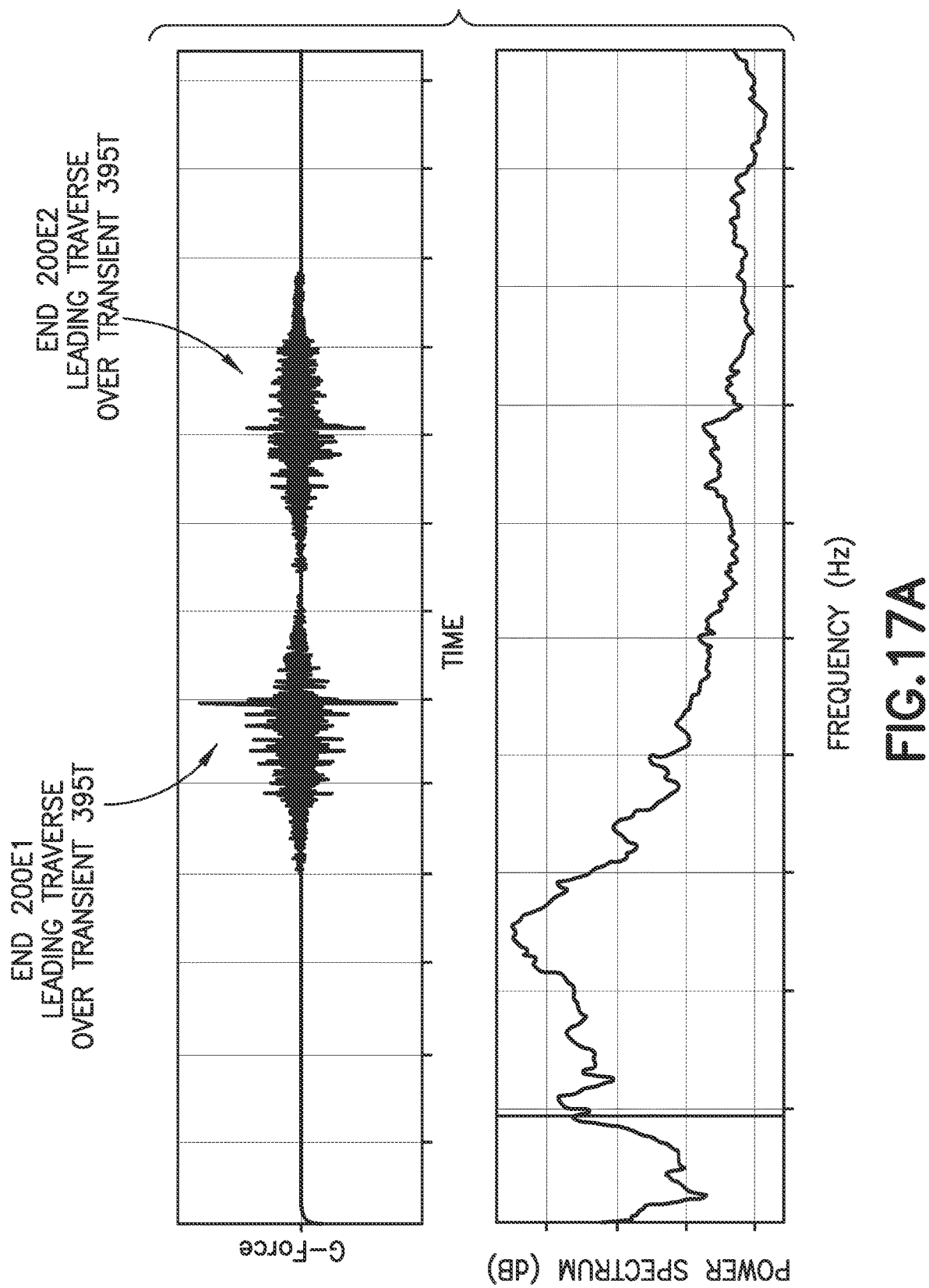
FIGS. 17A and 17B are exemplary plots illustrating tuning of a transient response of the autonomous transport vehicle of FIG. 2 loaded (carrying payload) in accordance with aspects of the disclosed embodiment.
Figure 17B:
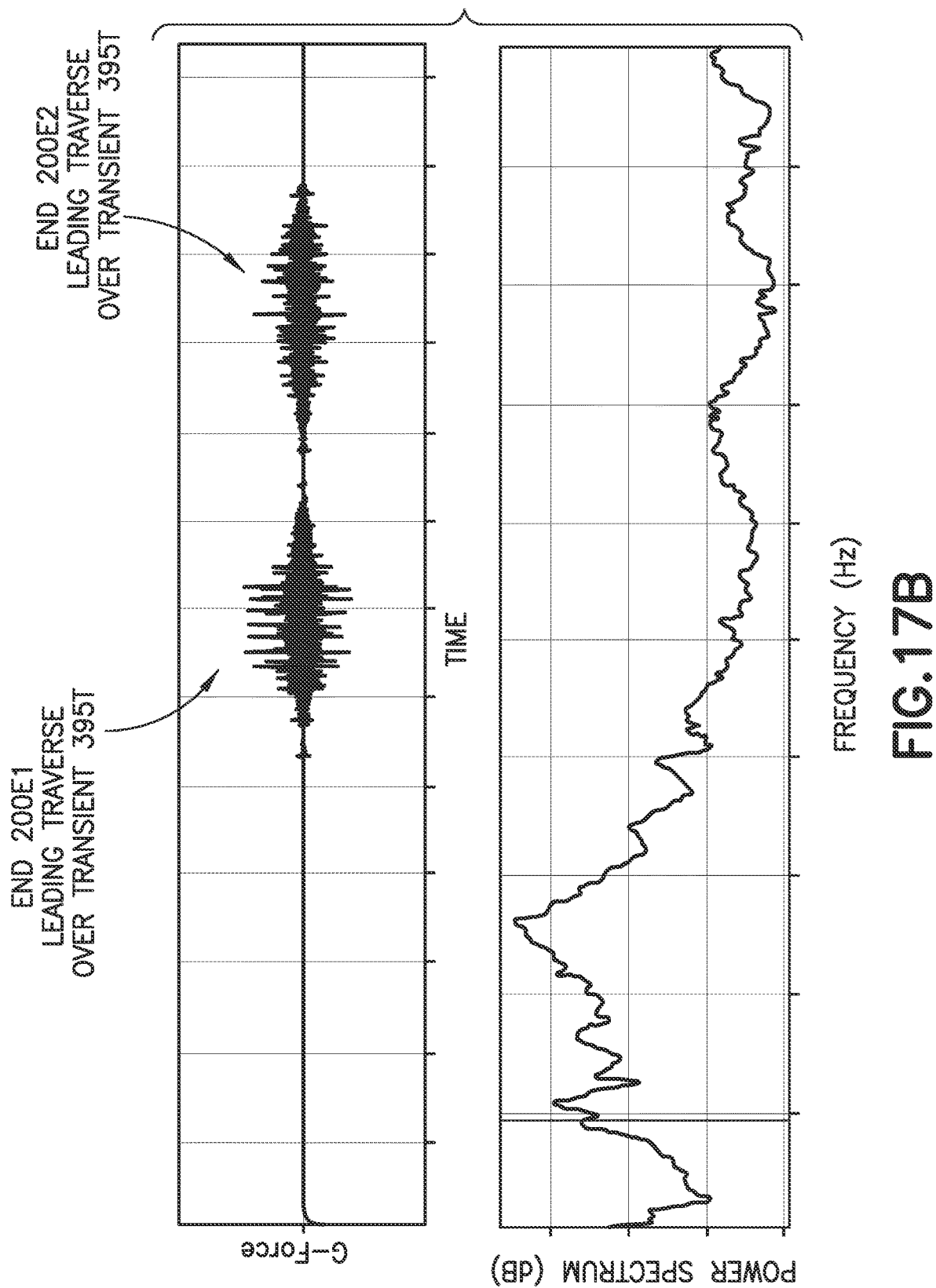

FIGS. 17A and 17B are exemplary plots/graphs illustrating tuning of predetermined rigidity characteristic of the autonomous transport vehicle 110 with the autonomous transport vehicle loaded (e.g., carrying a payload/case unit (s)). FIG. 17A illustrates the transient response (as G-force (i.e., force per unit mass due to gravity) and vibrational frequency) of the same portion of the frame 200 (as in FIGS. 16A and 16B) in response to the same transient 395T on the rolling surface 395 that is reacted by the fully independent suspension 780, 280 with the preloads PL1, PL3, PL4 of the fully independent suspension 780, 280 set to substantially the same value (such as set to the weight of the heaviest case unit carried by the autonomous transport vehicle) while preload PL2 is set to a lesser value than preloads PL1, PL3, PL4. FIG. 17B illustrates the transient response and vibrational frequency of the same portion of the frame 200 in response to the transient 395T on the rolling surface 395 that is reacted by the fully independent suspension 780, 280 with the preloads PL1, PL2, PL3, PL4 of the fully independent suspension 780, 280 set to substantially the same value (such as set to the weight of the heaviest case unit carried by the autonomous transport vehicle). As can be seen in FIGS. 17A and 17B both forward traverse (with end 200E1 leading the direction of traverse) and rearward traverse (with end 200E2 leading the direction of traverse) transient load responses of the frame 200 are illustrated with the autonomous transport vehicle 110 traversing over transient 395T on the rolling surface 395. As also can be seen in the transient load response of the frame 200 illustrated in FIG. 17B with the preload PL1, PL2, PL3, PL4 being substantially the same is less than the transient load response of the frame 200 illustrated in FIG. 17A with the preload PL2 being less than the preloads PL1, PL3, PL4. As may be realized, the tuning illustrated in FIGS. 17A and 17B is exemplary only and that the preloads PL1, PL2, PL3, PL4 of each fully independent suspension at each corner of the frame 200 may be set to any suitable value to reduce/minimize the transient response of the frame to the transient loads imparted to the frame 200 by/through the at least one of the at least one caster wheel 250A, 250B and at least one traction drive wheel 260A, 260B for a given payload carried by the autonomous transport vehicle 110.

As can be seen in comparing FIGS. 16A and 16B with a respective one of FIGS. 17A and 17B, with the tuning of the fully independent suspension 280, 780 the predetermined rigidity characteristic 289 can be set/tuned (with the autonomous transport vehicle loaded and/or unloaded) so that the predetermined rigidity characteristic 289 is substantially the same when the autonomous transport vehicle is loaded and unloaded. In some instances the predetermined rigidity characteristic 289 may be set so that the G-Force and vibrations are less with the autonomous transport vehicle 110 loaded compared to the G-Force and vibrations with the autonomous transport vehicle 110 unloaded. The tuning of predetermined rigidity characteristic 289, as illustrated in FIGS. 16A-17B, minimize low frequency vibratory responses and minimize the G-forces such that the payload (e.g., case unit(s) CU) carried by the autonomous transport vehicle 110 remain in a substantially constant location when held on the payload bed 210B (or transfer arm 210A) in an un-gripped or released state as described herein.

The tuning of the fully independent suspension of the autonomous transport vehicle is such that peak vibrations/forces and durations of the vibrations are minimized (e.g., frame settling times are minimized). The tuning of the fully independent suspension provides for a substantially constant autonomous transport vehicle 110 ride height RHT (and smoothness of motion that maintains the substantially constant ride height) that effects autonomous transport vehicle 110 start/stop traverse motion along the rolling surface 395 substantially simultaneously with the one or more of: placing case units CU to the payload bed 210B, securing (e.g., gripping with any suitable gripping/justification features such as case pushers, fences, etc.) case units CU in the payload bed, and unsecuring (e.g., releasing from grip) case units CU in the payload bed. Here, the tuning of the fully independent suspension provides for "pre-processing" case units CU (e.g., prior to placement of a case unit) or "post processing" case units CU (e.g., after picking a case unit) within the payload bed 210B with the autonomous transport vehicle 110 in motion, traversing along the rolling surface.

Pre-processing of the case units CU with traverse of the autonomous transport vehicle 110 along the rolling surface 395 may include, the release of the case unit(s) CU from grip and justification of the case unit(s) CU to a predetermined position of the payload bed 210B for transfer of the case unit(s) CU from the payload bed to any suitable case unit holding location. Post processing of the case units CU with traverse of the autonomous transport vehicle 110 along the rolling surface 395 may include, lowering the transfer arm 210A to place the case unit(s) CU at the payload datum position PDP (described herein), justification of the case unit(s) CU within the payload bed 210B, and securing of the case unit(s) CU within the payload bed 210B. Respectively pre-processing and post-processing the case unit(s) CU substantially simultaneously with the start traverse and stop traverse motions of the autonomous transport vehicle 110 provides for superior takt times (e.g., for fulling product orders) compared to conventional storage and retrieval systems where the autonomous transport vehicles are not traversing along a rolling surface during operation of the transfer arm/end effector and justification features for case unit pick and place operations.

Referring to FIGS. 2, 9, 10, and 11 the autonomous transport vehicle 110 includes a traction control system 1000 that effects autonomous transport vehicle 110 navigation through the transfer deck 130B and picking aisles 130A. As described herein, the traction control system synergistically operates with the fully independent suspension to provide the autonomous transport vehicle 110 with superior wheel odometry for localization of the autonomous transport vehicle 110 within the storage and retrieval system 100.

As described herein, the autonomous transport vehicle 110 includes a differential drive system (e.g., independently operable drive wheels 260A, 260B) with direct drives (e.g., the output of the drive motors 261M is coupled substantially directly, without gear reduction, to the respective drive wheels 261W) so as to reduce or minimize the "unsprung mass or structure" (e.g., the weight not carried by the fully independent suspension described herein) of the autonomous transport vehicle 110. The drive section 261D is configured so that each traction drive wheel 261W of the at least a pair of traction drive wheels 261W is separately powered by a corresponding traction motor 261M closely coupled with the respective traction drive wheel (i.e., directly driven with a low moment of inertia drive, with near instant motor applied torque). The traction motor 261M for a respective traction drive wheel 261W is distinct and separate from each other traction motor 261W of the drive section 261D corresponding to each other traction drive wheel 261W. Each traction drive wheel 261W of the drive section 261D has the corresponding traction motor 261M separately powering the traction drive wheel 261W closely coupled with the respective traction drive wheel 261W.

In the aspects of the disclosed embodiment, there is a large effective inertia ratio between the autonomous transport vehicle 110 "sprung" structure (i.e., the structure of the autonomous transport vehicle carried by the fully independent suspension—e.g., the frame 200, transfer arm 200, controls, etc.) and the drive motors 261M (e.g., the inertia of the sprung structure is larger than the inertia of the drive motors 261M and the respective wheels 261W). Here, loss of traction between the drive wheels 261W and the rolling surface 395 during acceleration of the autonomous transport vehicle 110 (i.e., a slip event) may result in a rapid acceleration of the drive motors 261M and respective wheels 261W.

Figure 9:
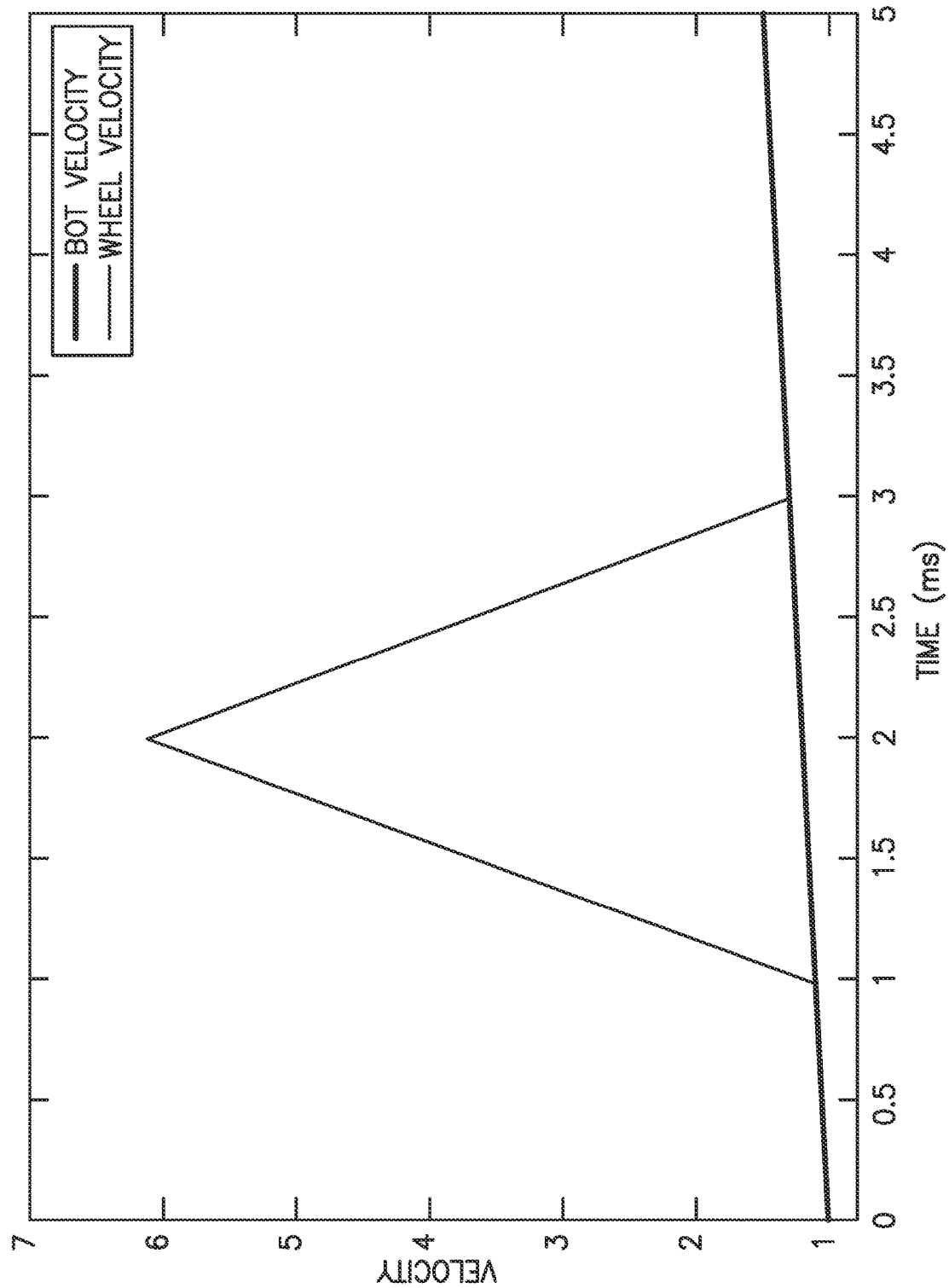
FIG. 9 is an exemplary graph illustrating a wheel slip event in accordance with aspects of the disclosed embodiment.

The traction control system 1000 of the aspects of the disclosed embodiment mitigates slip events by minimizing a slip angle between drive wheels 260A, 260B to an amount that is less than about 1° of relative wheel slip (e.g., upon loss of traction the amount of relative rotation between the wheels 261W of the drive wheels 260A, 260B is less than about 1°). To effect the less than about 1° of relative wheel slip the traction control system 1000 is configured, as described herein, with sufficient bandwidth so as to have a very low latency (e.g., on the order of about less than 2 milliseconds (ms)) from a start of the slip event to a control reaction that mitigates the slip event given a position feedback system that includes noise in the feedback signal. For example, FIG. 9 is a graphical representation of a slip event where the wheel 261W loses (some or all) traction at about t=1 ms and the wheel accelerates beyond the velocity at which the frame 200 is travelling in any given traverse direction. The controller, such as the controller 1220 of the autonomous transport vehicle 110, reacts to reduce the wheel 261W velocity so that the wheel 261W velocity substantially matches (i.e., is synchronized with) the frame 200 velocity. Here, the traction control system 1000 is configured to operate the motors 261M to apply full peak available motor torque in reaction to the slip event.

The traction control system 1000 has a multi-loop architecture that includes a velocity estimation and control and control loop that provides for very fast (e.g., less than about 2 ms data sampling rate) velocity estimation and control. The multi-loop architecture of the traction control system 1000 also includes other loops that operate at a slower (e.g., about less than 10 ms) sampling rate. For example, referring to FIG. 10, the traction control system 1000 (which may be incorporated in the controller 1220 or any other suitable controller onboard the autonomous transport vehicle 110) is communicably coupled to the drive wheels 260A, 260B through, for example, a controller area network (CAN) Bus interface 1070 of the autonomous transport vehicle 110. The traction control system 1000 includes any suitable sensors (e.g., line following sensors, vision systems, accelerometers, wheel encoders, current sensors, etc.) that effect a state determinations (e.g., at least position and acceleration) of the autonomous transport vehicle 110. The traction control system 1000 also includes a communications (e.g., "comms") interface 1010, a trajectory handler 1015, a position estimator 1020, a position controller 1025, a velocity estimator 1030, and a velocity controller 1035. In other aspects, the traction control system 1000 may have any suitable configuration and the configuration shown and described herein is exemplary. In the example provided, the communications interface 1010, trajectory handler 1015, position estimator 1020 and position controller 1025 may operate with a sampling rate of less than about 10 ms (in other aspects the sampling rate may be about 10 ms or more) while the sensors 1080, velocity estimator 1030, and velocity controller 1035 operate at a sampling rate of less than about 2 ms (in other aspects, the sampling rate may be about 2 ms or more).

The sensors 1080 are configured to sense/detect and provide spatial positioning data (e.g., line following positions, visual position data, wheel odometry, etc.) to the position estimator 1020. The sensors 1080 are also configured to sense/detect and provide inertial measurements of the autonomous transport vehicle 110 (e.g., including at least accelerations) to the velocity estimator 1030. The velocity estimator 1030 receives wheel encoder data (e.g., from any suitable wheel encoders 1080W of the drive wheels 260A, 260B, where the wheel encoders 1080W effect wheel odometry determinations) and measured current (e.g., of the motors 261M of the drive wheels 260A, 260B as measured by any suitable current sensors) over the CAN Bus interface 1070. The velocity estimator 1030 provides a velocity estimate to the position estimator 1020. The position estimator 1020 determines a position estimate from the spatial positioning data and the velocity estimate and provides the position estimate to one or more of the trajectory handler 1015 and the position controller 1025. The trajectory handler 1015 is configured to receive waypoint/navigation data from the communications interface 1010 and determines a trajectory of the autonomous transport vehicle 110 based on the waypoint/navigation data and the position estimate. The position controller 1025 receives the trajectory from the trajectory handler 1015 and determines velocity targets of the autonomous transport vehicle 110 based on the trajectory and position estimate.

The velocity estimator 1030 also provides the velocity estimate to the velocity controller 1035. The velocity controller 1035 receives the velocity targets from the position controller 1025 and determines current targets (e.g., for the motors 261M of the drive wheels 260A, 260B) based on the velocity targets and the velocity estimate. The motors 261M of the drive wheels 260A, 260B are operated/driven based on the current targets from the velocity controller 1035.

Figure 11:
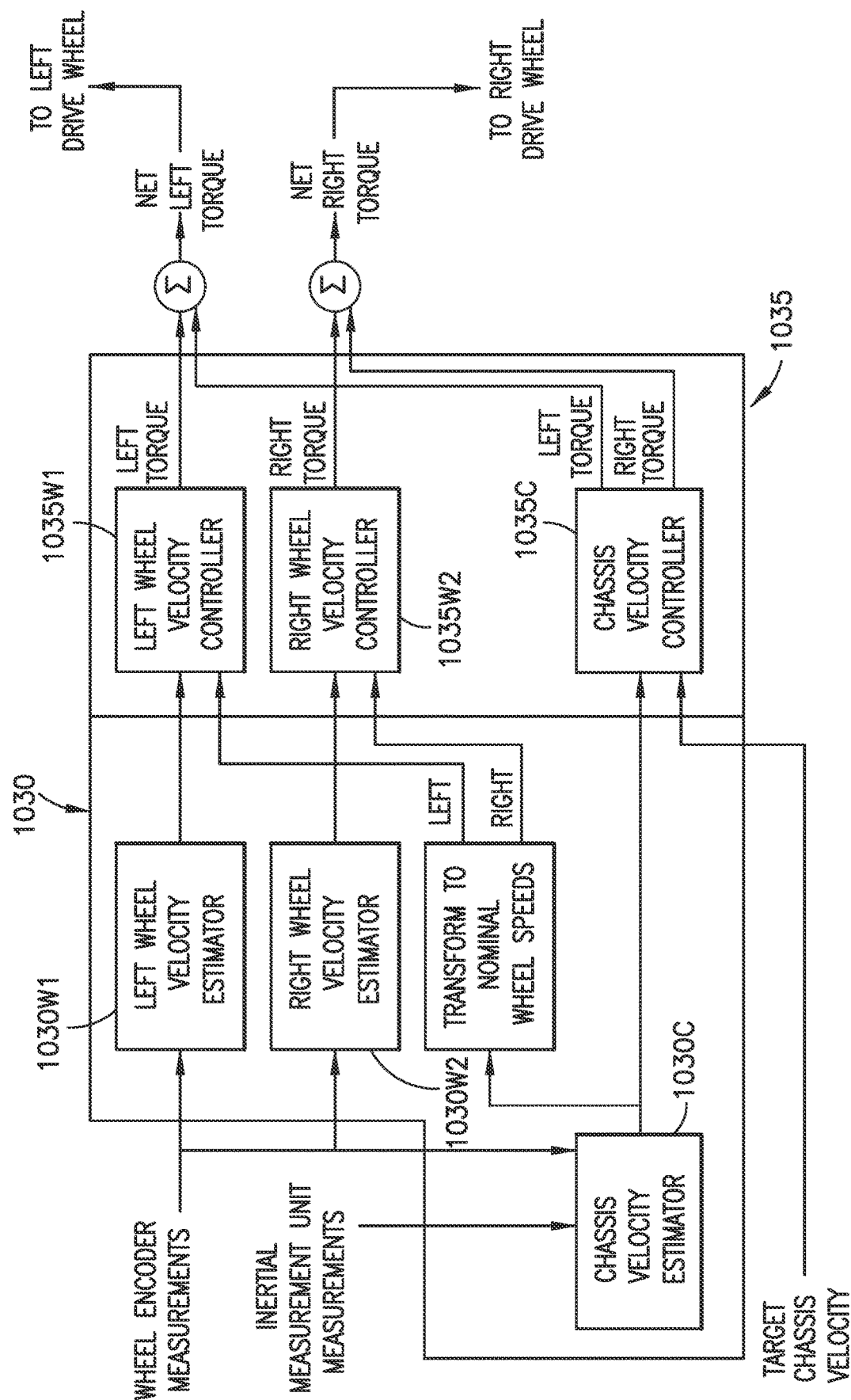
FIG. 11 is a schematic block diagram of a portion of the traction control system of FIG. 10 in accordance with aspects of the disclosed embodiment.

As described herein, the wheel encoder data and measured current (as well as any other sensor data from the sensors 1080) have noise in the respective feedback data signals employed for control of the drive wheels 260A, 260B. To effect the low latency (e.g., less than about 2 ms) response time of the traction control system 1000 with the presence of noise in the feedback signals the velocity controller 1035 and the velocity estimator 1030 are each configured as multi-input and multi-output controllers that, rather than explicitly detect and react to occurring slip events, are configured to resolve incipient slip (e.g., near instantaneous slip resolution so that wheel slip effectively does not occur (e.g., relative rotation of the drive wheels 261W is limited to less than about 1°) and address multiple control objectives (i.e., achieving a predetermined velocity of the autonomous transport vehicle frame 200 while also matching the wheel velocity to the frame velocity). An exemplary configuration of the velocity controller 1035 and velocity estimator 1030 is illustrated in FIG. 11.

The multi-input/multi-output velocity controller 1035 is configured to determined, based on time optimal autonomous transport vehicle trajectory, a predetermined kinematic characteristic (e.g., velocity gradient, acceleration, etc.) of the autonomous transport vehicle 110, and modulates motor applied torque (as described herein) to the traction drive wheel 261W (e.g., from a predetermined applied torque, such as a maximum available applied torque, for optimal trajectory, i.e. modulate motor applied torque from bang-bang control input) to match traction drive wheel 261W rotation with the predetermined kinematic characteristic of the autonomous transport robot within a predetermined wheel slip characteristic of the traction drive wheel 261W relative to the rolling surface 395. The predetermined wheel slip characteristic of the traction drive wheel 261W results in near instantaneous (with respect to the autonomous transport vehicle trajectory path) traction drive wheel 261W rotation modulation resolving wheel slip of the traction drive wheel 261W based on modulated applied torque commanded by the multi-input/multi-output velocity controller 1035. Here, as described herein, the near instantaneous traction drive wheel 261W modulation is less than about 10 ms, and about less than 2 ms. The multi-input/multi-output velocity controller 1035 is configured to determine modulation of applied torque in response to wheel position data from the wheel position sensor 1080W, and to determine relative incipient slip of the traction drive wheel 261W to the rolling surface 395 based on the wheel position data.

In accordance with the aspects of the disclosed embodiment, the velocity estimator 1030 includes (left and right) wheel velocity estimators 1030W1, 1030W2 and a chassis (or frame) velocity estimator 1030C. The velocity controller 1035 includes (left and right) wheel velocity (sub-)controllers 1035W1, 1035W2 and a chassis (or frame) velocity (sub-)controller 1035C that operate in parallel with each other. The output of each wheel velocity controller 1035W1, 1035W2 is summed with the output of the chassis velocity controller 1035C for determining a respective net torque for each of the (left and right) drive wheels 260A, 260B.

The wheel velocity estimators 1030W1, 1030W2 provide respective wheel 261W velocity estimates (e.g., velocity vectors) to the respective wheel velocity controller 1035W1, 1035W2 based on the wheel encoder measurements of the respective wheel 261W. The wheel velocity estimators 1030W1, 1030W2 are configured to estimate the respective wheel velocity by differentiating the respective wheel encoder data and passing it through a low pass filter with minimal (e.g., within the less than about 2 ms sampling rate) delay. It is noted that a low pass filter may be integrated into the respective wheel velocity estimators 130W1, 130W2.

The chassis velocity estimator 1030C provides frame or chassis 200 velocity estimates (e.g. velocity vectors) to the chassis velocity controller 1035 based on the wheel encoder measurements (e.g., for both drive wheels 260A, 260B) and the inertial measurements of the autonomous transport vehicle 110. The chassis velocity estimator 1030C is also configured to transform the frame 200 velocity estimates to nominal wheel velocities (e.g., wheel velocities that would result from the wheels being synchronized with the frame velocity without the presence of wheel slip) for each wheel 261W of the drive wheels 260A, 260B where the nominal wheels speeds are provided to the respective wheel velocity controller 1035W1, 1035W2.

As noted above, the chassis velocity controller 1035C receives the chassis velocity estimates (or vectors) as well as a target velocity (e.g., velocity vector) of the frame 200. The chassis velocity controller 1035C may have any suitable configuration that outputs (left and right) motor 261M torques for each of the (right and left) drive wheels 260A, 260B, which motor torques impart forces/moments on the frame 200 to achieve the target chassis velocity. The wheel velocity controllers 1035W1, 1035W2 receive the nominal wheel velocities and velocity estimates for the respective wheel 261W of the respective drive wheel 260A, 260B. Each wheel velocity controller 1035W1, 1035W2 is configured with and employs a non-linear control law.

The non-linear control law is configured to minimize an amount of encoder differentiation noise that may be amplified by the wheel velocity controllers 1035W1, 1035W2 and the chassis velocity controller 1035C. The non-linear control law also configures the traction control system 1000 so that the output of the wheel velocity controller 1035W1, 1035W2 is small where error (e.g., difference) between the wheel velocity estimate and the nominal wheel velocity is small; however, the output of the wheel velocity controller 1035W1, 1035W2 increases rapidly as the error between the wheel velocity estimate and the nominal wheel velocity increases. Here, in accordance with the aspects of the disclosed embodiment, the contribution of the wheel velocity controllers 1035W1, 1035W2 to the drive wheel torque commands (e.g., the net wheel torques) is minimized where wheel slip is substantially not present; however, where wheel slip is present the contribution of the wheel velocity controllers 1035W1, 1035W2 to the drive torque commands dominates the drive wheel control output (e.g., the contribution of the wheel velocity controllers to determination the net wheel torques dominates the contribution of the chassis velocity controller to the determination of the net wheel torques). An example of the non-linear control law of the wheel velocity controllers 1035W1, 1035W2 is as follows:

$$\text{Torque} = K_p * e^2 * \sin(e)$$

where e is the error between the nominal wheel velocity and the estimated wheel velocity and $K_p$ is a gain that can be tuned to select how much the velocity controller 1035 prioritizes achieving the target wheel velocities versus the target chassis velocity.

Referring to FIGS. 1, 10, 11, and 12, an exemplary application of drive wheel 260A, 260B traction control employing the above non-linear control law will be described. The autonomous transport vehicle 110 chassis velocity controller 1035C issues commands to the drive wheels 290A, 260B so that each motor 261M applies a maximum torque (i.e., a maximum available torque as per motor specifications) to the respective wheel 261W (FIG. 12, Block 1200) to accelerate the autonomous transport vehicle 110 along a given trajectory on the transfer deck 130B or along a picking aisle 130A. Here, the wheels 261W and the frame 200 accelerate proportionately and the respective velocities are synchronized (e.g., no slipping of the wheels 261W). The drive wheel 260A, 260B control commands from the chassis velocity controller 1035C dominate in determining (e.g., in the respective summing of the torques from each of the wheel velocity controllers 1035W1, 1035W2 with the chassis velocity controller 1035C—see FIG. 11) the respective (left and right) net drive wheel torques such that the wheel velocity controllers 1035W1, 1035W2 (also referred to as wheel slip controllers) have little to no effect on the respective (left and right) net drive wheel torques when wheel slip is not present.

Figure 12:
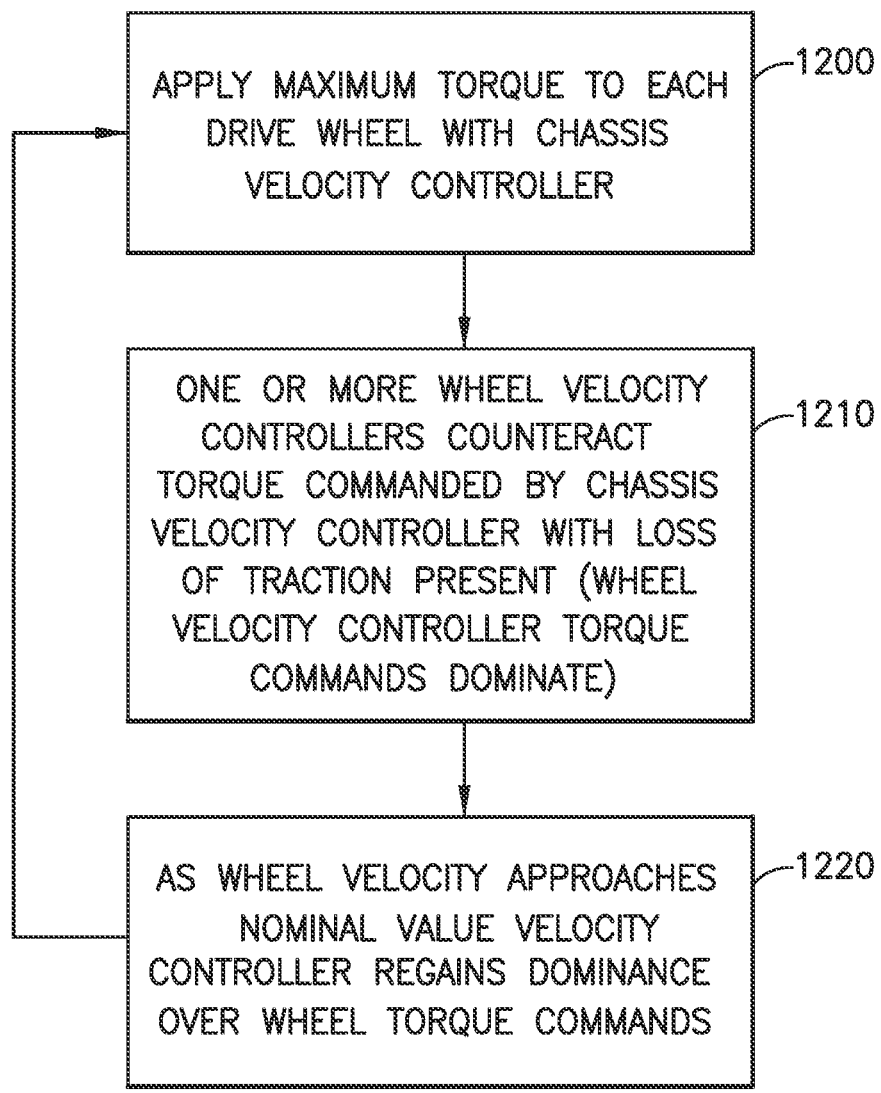
FIG. 12 is an exemplary flow diagram of a method in accordance with aspects of the disclosed embodiment.

At the occurrence of a wheel slip event (e.g., one or more of the wheels 261W of the drive wheels 260A, 260B slips/loses traction on the rolling surface) the slipping wheel(s) 261W begins to accelerate at a faster rate than the acceleration of the autonomous transport vehicle 110 frame 200. The slipping/loss of traction of the one or more wheels 261W results in a difference between the drive wheel velocity of the slipping drive wheel(s) 260A, 260B and the velocity of the frame 200. A respective one or more of the wheel velocity controllers 1035W1, 1035W2 (employing the non-linear control law) issues respective drive wheel 260A, 260B torque commands that counteract the torque commands of the chassis velocity controller 1035C so that the drive wheel 260A, 260B torque commands issued by the one or more of the wheel velocity controllers 1035W1, 1035W2 begins to dominate or dominates in determining (e.g., in the respective summing of the torques from each of the wheel velocity controllers 1035W1, 1035W2 with the chassis velocity controller 1035C—see FIG. 11) the respective (left and right) net drive wheel torques for the slipping drive wheel(s) 260A, 260B (FIG. 12, Block 1210) such that the chassis velocity controller 1035C has a diminished (or in some instances, depending on the amount of wheel slip, no affect) on the net drive wheel torque for a slipping drive wheel 260A, 260B when wheel slip is present. As the torque commands issued by the one or more of the wheel velocity controllers 1035W1, 1035W2 decrease the wheel 261W velocity of the slipping drive wheel(s) 260A, 260B and the velocity of the slipping drive wheel 260A, 260B approaches the nominal wheel velocity, the influence of the torque commands issued by the one or more of the wheel velocity controllers 1035W1, 1035W2 on the respective net drive wheel torque(s) decreases and the torque commands issued by the chassis velocity controller regain dominance in determining the net drive wheel torque(s) (FIG. 12, Block 1220).

The traction control system 1000 continuously monitors for available traction of the drive wheels 260A, 260B by applying the maximum available motor torque of the respective drive wheels 260A, 260B until a point the respective wheel 261W begins to slip, at which point the non-linear control law drives the velocity of the slipping drive wheel 260A, 260B back to its nominal wheel velocity (e.g., so that the wheel velocity and chassis velocity are substantially synchronized as described herein). With the loss of traction of the drive wheel(s) 260A, 260B mitigated, the chassis velocity controller employs the maximum available motor torque of the drive wheels 260A, 260B to effect traverse of the autonomous transport vehicle along the transfer deck 130B and/or picking aisle 130A. As described above, the low latency of the traction control system 1000 and the limits the wheel slip to about less than 1° relative rotation between the wheels 261W of the drive wheels 260A, 260B. In accordance with the aspects of the disclosed embodiment, the traction control system 1000 described herein substantially eliminates the explicit detection and reaction to a slip event. Rather, the traction control system 1000 substantially continuously reacts to wheel slip events where the magnitude of reaction by the traction control system varies with and depends on the magnitude of the slip event.

In accordance with the aspects of the disclosed embodiment, and as noted herein, the fully independent suspension system and the traction control system 1000 provide a dynamic response of the autonomous transport vehicle 110 in transit that effects superior takt times for fulfilling product orders. For example, with the fully independent suspension maintaining a substantially constant/steady state ride height RHT (see FIG. 8A) and reducing vibration of the autonomous transport vehicle (due to traverse of the autonomous transport vehicle through the storage structure), the traction control system resolves any wheel slip that may otherwise cause yawing of the autonomous transport vehicle. The reduced vibrations, steady state ride height RHY, and the substantial prevention of wheel slip (e.g., bot stability smoothness effected by synergism of the fully independent suspension, chassis/suspension tuning, and traction control system) provide for a stable case unit holding platform that substantially maintains a position (e.g., without jostling/movement) of the case unit(s) on the case unit support surface 210AFS with the case unit(s) substantially ungripped/unrestrained. Here, the predetermined rigidity characteristic 289 of the frame 200 is set so that transient loads, from transients (e.g., induced from rolling over transients 395T on the rolling surface 395) of the at least one of the at least one caster wheel 250A, 250B and the at least one traction drive wheel 260A, 260B, imparted to the payload (e.g., case unit(s) CU) on the payload seat surface 210AFS via the frame 200, are minimized. The transient loads are minimized so that the payload unrestrained pose on the payload seat surface 210AFS is substantially constant (in at least one degree of freedom, e.g., at least one of X, Y, θ—see FIG. 13) in response to the transient loads with the autonomous transport vehicle 110 rolling on the rolling surface 395 (for a predetermined kinematic state such as an acceleration and/or deceleration of the autonomous transport vehicle 110). Here, the synergistic dynamic response of the autonomous transport vehicle 110 in transit provides for ungripped/released manipulation of case unit(s) CU within the payload bed 210B substantially simultaneously with start and stop traverse motions of the autonomous transport vehicle 110 along the rolling surface as described herein, which effects the superior takt times compared to conventional autonomous transport vehicles whose traversal along a surface is stopped prior to releasing the case unit(s) for manipulation.

Figure 14:
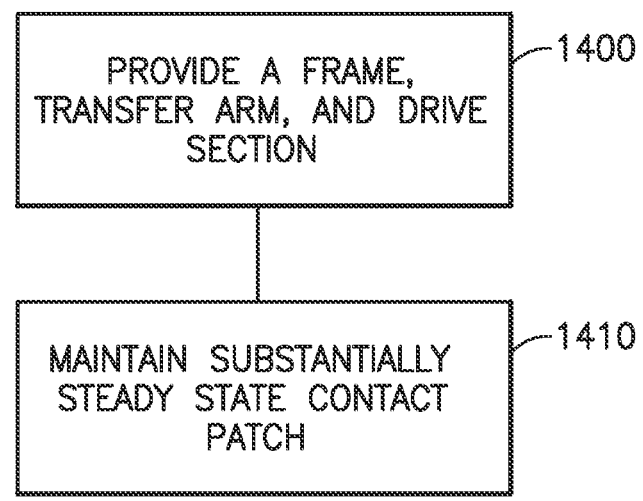
FIG. 14 is an exemplary flow diagram of a method in accordance with aspects of the disclosed embodiment.

Referring to FIGS. 2, 3A-8B, and 14, an exemplary method for the autonomous transport vehicle 110 will be described in accordance with aspects of the disclosed embodiment. In the method the autonomous transport vehicle 110 is provided with the frame 200, the transfer arm 210A, and the drive section 261D (FIG. 14, Block 1400). As described herein, the frame 200 has an integral payload support (e.g., also referred to as the payload support bed 210B); the transfer arm 210A provides autonomous transfer of payload (e.g., case units CU) to and from the frame 200; and the drive section is connected to the frame 200 and has a pair of traction drive wheels 260A, 260B astride the drive section 261D. In the method a substantially steady state traction contact patch CNTC is maintained (FIG. 14, Block 1410), with a fully independent suspension coupling each wheel of the at least the pair of traction drive wheels to the frame, between the at least one traction drive wheel 260A, 260B and a rolling surface 395 over rolling surface transients 395T throughout traverse of the at least one traction drive wheel 260A, 260B over the rolling surface 395, wherein the fully independent suspension has at least one intervening pivot link (e.g., the upper and lower frame links 310, 311) between at least one traction drive wheel 260A, 260B and the frame 200.

Figure 15:
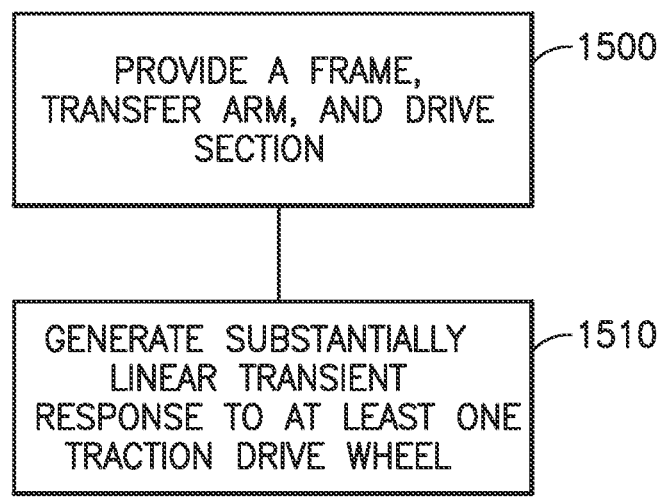
FIG. 15 is an exemplary flow diagram of a method in accordance with aspects of the disclosed embodiment.

Still referring to FIGS. 2, 3A-8B, and also to FIG. 15, an exemplary method for the autonomous transport vehicle 110 will be described in accordance with aspects of the disclosed embodiment. In the method the autonomous transport vehicle 110 is provided with the frame 200, the transfer arm 210A, and the drive section 261D (FIG. 15, Block 1500). As described herein, the frame 200 has an integral payload support (e.g., also referred to as the payload support bed 210B); the transfer arm 210A provides autonomous transfer of payload (e.g., case units CU) to and from the frame 200;

and the drive section is connected to the frame 200 and has a pair of traction drive wheels 260A, 260B astride the drive section 261D. In the method a substantially linear transient response is generated (with the at least one intervening pivot link, e.g., the upper and lower frame links 310, 311) to at least one traction drive wheel (FIG. 15, Block 1510), to rolling over surface transients of a rolling surface in a linear direction substantially normal to the frame throughout each transient, wherein the at least the pair of traction drive wheels have the fully independent suspension coupling each wheel 261W of the at least the pair of traction drive wheels 260A, 260B to the frame 200, with the at least one intervening pivot link between at least one traction drive wheel 260A, 260B and the frame 200.

Referring to FIGS. 2, 3A-8B, and 18, an exemplary method for the autonomous transport vehicle 110 will be described in accordance with aspects of the disclosed embodiment. In the method the autonomous transport vehicle 110 is provided with the frame 200 (FIG. 18, Block 1800), the transfer arm 210A (FIG. 18, Block 1810), the caster wheel(s) 250A, 250B (FIG. 18, Block 1820), and the drive section 261D (FIG. 18, Block 1830). The at least one caster wheel 250A, 250D and at least one traction drive wheel 260A, 260B of the pair of traction drive wheels 260A, 260B are disposed on the frame 200 (FIG. 18, Block 1840) astride the integral payload support 210B so that the payload seat surface 210AFS at the payload datum position PDP is disposed at a minimum distance above the rolling surface 395, wherein the at least one caster wheel 250A, 250B and at least one traction drive wheel 260A, 260B of the pair of traction drive wheels 260A, 260B roll, on a rolling surface effecting autonomous transport vehicle 110 traversal over the rolling surface 395, and each of the at least one caster wheel 250A, 250B and at least one traction drive wheel 260A, 260B of the pair of traction drive wheels 260A, 260B having a fully independent suspension 780, 280.

Referring to FIGS. 2, 3A-8B, and 19, an exemplary method for the autonomous transport vehicle 110 will be described in accordance with aspects of the disclosed embodiment. In the method the autonomous transport vehicle 110 is provided with the frame 200 (FIG. 19, Block 1900), the transfer arm 210A (FIG. 19, Block 1910), the caster wheel(s) 250A, 250B (FIG. 19, Block 1920), and the drive section 261D (FIG. 19, Block 1930). The predetermined rigidity characteristic 289 is set (FIG. 19, Block 1940) based on a predetermined transient response characteristic of the fully independent suspension 780, 280 of at least one of the at least one caster wheel 250A, 250B and the at least one traction drive wheel 260A, 260B.

Figure 20:
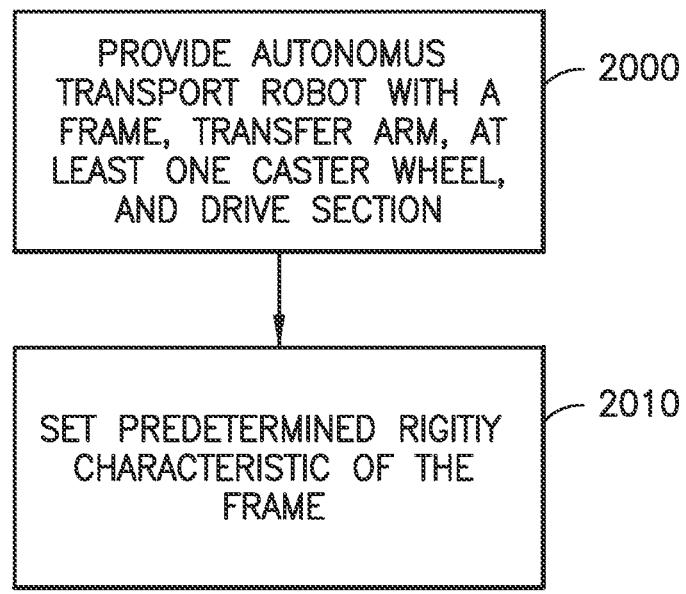
FIG. 20 is an exemplary flow diagram of a method in accordance with aspects of the disclosed embodiment.
Figure 21:
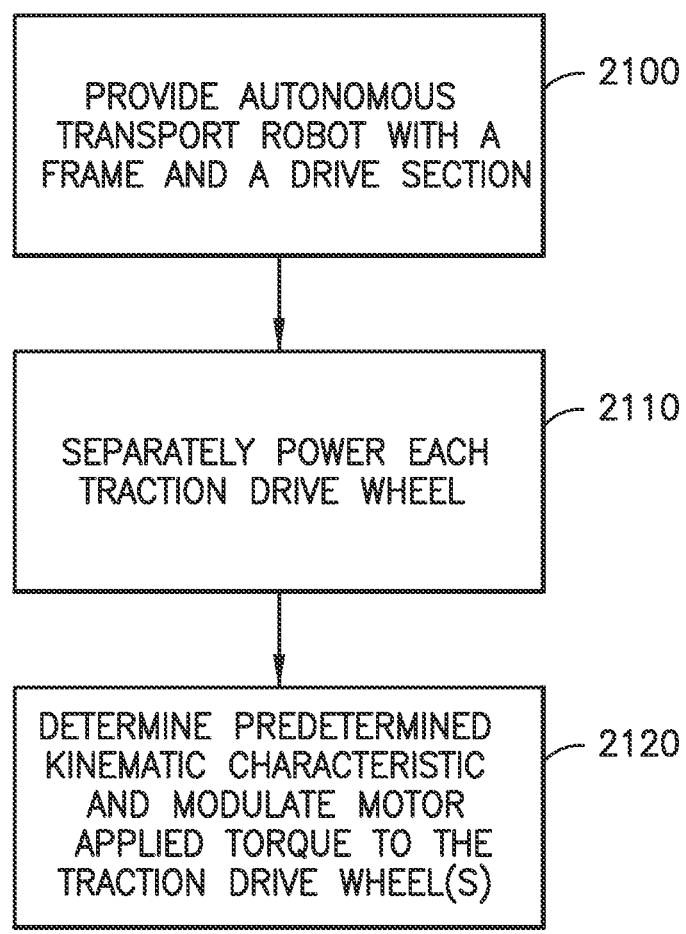
FIG. 21 is an exemplary flow diagram of a method in accordance with aspects of the disclosed embodiment.

Referring to FIGS. 2, 3A-8B, and 20, an exemplary method for the autonomous transport vehicle 110 will be described in accordance with aspects of the disclosed embodiment. In the method the autonomous transport robot is provided with a frame 200, a transfer arm 210A, at least one caster wheel 250A, 250B, and a drive section 261D (FIG. 20, Block 2000). The frame 200 has an integral payload support 210B. The transfer arm 210A is connected to the frame 200 and is configured for autonomous transfer of payload (e.g., case units CU) to and from the frame 200. The at least one caster wheel 250A, 250B is mounted to the frame 200, and a drive section 261D has at least a pair of traction drive wheels 260A, 260B astride the drive section 261D. The drive section 261D is connected to the frame 200, where the at least one caster wheel 250A, 250B and at least one traction drive wheel 260A, 260B of the pair of traction drive wheels 260A, 260B roll, on a rolling surface 395 effecting autonomous transport vehicle traversal over the rolling surface 395. Each of the at least one caster wheel 250A, 250B and at least one traction drive wheel 260A, 260B having a fully independent suspension 780, 280. A predetermined rigidity characteristic 289 of the frame 200 is set (FIG. 20, Block 2010) based on a predetermined transient response characteristic of the frame 200 determining the transient response of the frame 200 from transients of the at least one caster wheel 250A, 250B and at least one traction drive wheel 260A, 260B of the pair of traction drive wheels 260A, 260B rolling on the rolling surface 395, where the predetermined rigidity characteristic 298 defines a transient response of the frame 200 from transient loads imparted to the frame 200 via at least one of the at least one caster wheel 250A, 250B and at least one traction drive wheel 260A, 260B.

Referring to FIGS. 2, 3A-8B, and 21, an exemplary method for the autonomous transport vehicle 110 will be described in accordance with aspects of the disclosed embodiment. In the method the autonomous transport robot is provided with: a frame 200 and a drive section 261D (FIG. 20, Bock 2100). The frame 200 has an integral payload support 210B, and the drive section 261D has at least a pair of traction drive wheels 260A, 260B (e.g., see wheels 261W) astride the drive section 261D. The drive section 261D is connected to the frame 200 and is configured so that each traction drive wheel 260A, 260B of the at least the pair of traction drive wheels 260A, 260B is separately powered by a corresponding traction motor 261W closely coupled with the respective traction drive wheel 260A, 260B, and distinct and separate from each other traction motor 261M of the drive section 261D corresponding to each other traction drive wheel 260A, 260B. Each traction drive wheel 260A, 260B of the at least the pair of traction drive wheels 260A, 260B is separately powered, with the drive section 261D, (FIG. 21, Block 2110) by a corresponding traction motor 261M closely coupled with the respective traction drive wheel 260A, 260B, and distinct and separate from each other traction motor 261M of the drive section 261D corresponding to each other traction drive wheel 260A, 260B. The multi-input/multi-output (velocity) controller 1035, determines based on optimal robot trajectory a predetermined kinematic characteristic of the autonomous transport vehicle 110, and modulates motor applied torque to the traction drive wheel 260A, 260B (FIG. 21, Block 2120) to match traction drive wheel rotation with the predetermined kinematic characteristic of the autonomous transport vehicle 110 within a predetermined wheel slip characteristic of the traction drive wheel 260A, 260B relative to the rolling surface 395.

Figure 22:
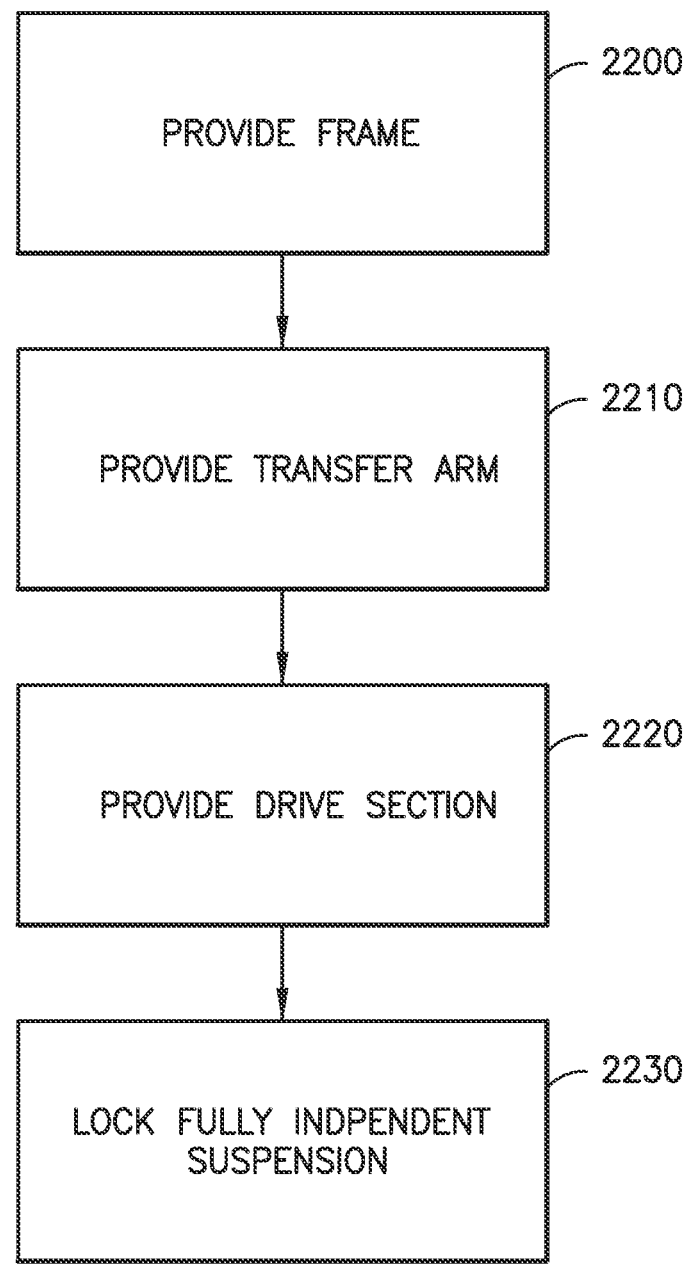
FIG. 22 is an exemplary flow diagram of a method in accordance with aspects of the disclosed embodiment.

Referring to FIGS. 2, 3A-8B, and 22, an exemplary method for an autonomous transport vehicle 110 will be described in accordance with one or more aspects of the disclosed embodiment. In the method, the autonomous transport robot with is provided a frame (FIG. 22, Block 2200), a transfer arm 210A (FIG. 22, Block 2210), and a drive section (FIG. 22, Block 2220). The frame 200 has the integral payload support 210B. The transfer arm 210A is connected to the frame 200 and configured for autonomous transfer of payload (e.g., case units CU) to and from the frame 200. The drive section 261D is connected to the frame 200 and has at least a pair of traction drive wheels 260A, 260B astride the drive section 261D, where the at least the pair of traction drive wheels 260A, 260B has a fully independent suspension 280 coupling each traction drive wheel 260A, 260B of the at least the pair of traction drive wheels 260A, 260B to the frame 200. The fully independent suspension 280 is locked in a predetermined position relative to the frame 200 with a lock/suspension lockout system 500 that is releasably coupled to the fully independent suspension 280 (FIG. 22, Block 2230). As described herein the controller 2330 automatically effects actuating the lock 500 of a respective fully independent suspension 280 with extension of the transfer arm 210A (e.g., from the datum payload position PDP), and releasing the lock 500 of the respective fully independent suspension 280 with retraction of the transfer arm (e.g., to the datum payload position PDP).

In accordance with one or more aspects of the disclosed embodiment an autonomous transport robot for transporting a payload is provided, the autonomous transport robot comprising: a frame with an integral payload support; a transfer arm connected to the frame and configured for autonomous transfer of payload to and from the frame; a drive section with at least a pair of traction drive wheels astride the drive section, the drive section being connected to the frame; wherein the at least the pair of traction drive wheels have a fully independent suspension coupling each traction drive wheel of the at least the pair of traction drive wheels to the frame, with at least one intervening pivot link between at least one traction drive wheel and the frame configured to maintain a substantially steady state traction contact patch between the at least one traction drive wheel and a rolling surface over rolling surface transients throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment an autonomous transport robot for transporting a payload is provided, the autonomous transport robot comprising: a frame with an integral payload support; a transfer arm connected to the frame and configured for autonomous transfer of payload to and from the frame; a drive section with at least a pair of traction drive wheels astride the drive section, the drive section being connected to the frame; wherein the at least the pair of traction drive wheels have a fully independent suspension coupling each wheel of the at least the pair of traction drive wheels to the frame, with at least one intervening pivot link between at least one traction drive wheel and the frame configured to generate a substantially linear transient response to the at least one traction drive wheel, to rolling over surface transients of a rolling surface in a linear direction substantially normal to the frame throughout each transient.

In accordance with one or more aspects of the disclosed embodiment the least one intervening pivot link between the at least one traction drive wheel and the frame is configured to maintain a substantially steady state traction contact patch between the at least one traction drive wheel and the rolling surface over the rolling surface transients throughout traverse of the at least one traction drive wheel over the rolling surface; and the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment a method for an autonomous transport robot is provided, the method comprising: providing the autonomous transport robot with: a frame, the frame having an integral payload support, a transfer arm connected to the frame, the transfer arm providing autonomous transfer of payload to and from the frame, and a drive section with at least a pair of traction drive wheels astride the drive section, where the drive section is connected to the frame; and maintaining, with a fully independent suspension coupling each wheel of the at least the pair of traction drive wheels to the frame, a substantially steady state traction contact patch between the at least one traction drive wheel and a rolling surface over rolling surface transients throughout traverse of the at least one traction drive wheel over the rolling surface, wherein the fully independent suspension has at least one intervening pivot link between at least one traction drive wheel and the frame.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the further comprises defining a payload datum position with a payload seat surface of the integral payload support, wherein the payload datum position determines a predetermined payload position relative to the autonomous transport robot, and the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the method further comprises locking, with a lock of the fully independent suspension, the fully independent suspension in a predetermined position relative to the frame.

In accordance with one or more aspects of the disclosed embodiment a method for an autonomous transport robot is provided. The method comprising: providing the autonomous transport robot with: a frame, the frame having an integral payload support, a transfer arm connected to the frame, the transfer arm providing autonomous transfer of payload to and from the frame, and a drive section with at least a pair of traction drive wheels astride the drive section, where the drive section is connected to the frame; and generating a substantially linear transient response to at least one traction drive wheel, to rolling over surface transients of a rolling surface in a linear direction substantially normal to the frame throughout each transient, wherein the at least the pair of traction drive wheels have a fully independent suspension coupling each wheel of the at least the pair of traction drive wheels to the frame, with at least one intervening pivot link between at least one traction drive wheel and the frame.

In accordance with one or more aspects of the disclosed embodiment the method further comprises: maintaining, with the least one intervening pivot link between the at least one traction drive wheel and the frame, a substantially steady state traction contact patch between the at least one traction drive wheel and the rolling surface over the rolling surface transients throughout traverse of the at least one traction drive wheel over the rolling surface; wherein, the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the method further comprises defining a payload datum position with the integral payload support, wherein the payload datum position determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment an autonomous transport robot for transporting a payload is provided, the autonomous transport robot comprising: a frame with an integral payload support that has a payload seat surface defining a payload datum position that determines a predetermined payload position relative to the autonomous transport robot; a transfer arm connected to the frame and configured for autonomous transfer of payload to and from the frame; at least one caster wheel mounted to the frame; and a drive section with at least a pair of traction drive wheels astride the drive section, the drive section being connected to the frame; wherein the at least one caster wheel and at least one traction drive wheel of the pair of traction drive wheels roll, on a rolling surface effecting autonomous transport robot traversal over the rolling surface, each having a fully independent suspension, and are disposed on the frame astride the integral payload support so that the payload seat surface at the payload datum position is disposed at a minimum distance above the rolling surface.

In accordance with one or more aspects of the disclosed embodiment the autonomous transport robot has fully independent suspension at each of the at least one caster wheel and each traction drive wheel.

In accordance with one or more aspects of the disclosed embodiment the fully independent suspension of the at least one traction drive wheel is configured to maintain a substantially steady state traction contact patch between the at least one traction drive wheel and the rolling surface over each rolling surface transient throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over the each rolling surface transient.

In accordance with one or more aspects of the disclosed embodiment the substantially steady state traction contact patch is disposed at a predetermined reference position of the at least one traction drive wheel substantially independent of transients of the at least one traction drive wheel due to traverse over the each rolling surface transient.

In accordance with one or more aspects of the disclosed embodiment the fully independent suspension is disposed to maintain each of the at least one caster and each of the at least one traction drive wheel in a steady state position relative to the frame during one or more of transients of the transfer arm and with the integral payload support in a loaded and unloaded payload condition.

In accordance with one or more aspects of the disclosed embodiment the payload seat surface at the payload datum position is disposed at a minimum distance above the rolling surface.

In accordance with one or more aspects of the disclosed embodiment the at least the pair of traction drive wheels are disposed so that the payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment an autonomous transport robot for transporting a payload is provided, the autonomous transport robot comprising: a frame with an integral payload support; a transfer arm connected to the frame and configured for autonomous transfer of payload to and from the frame; at least one caster wheel mounted to the frame; and a drive section with at least a pair of traction drive wheels astride the drive section, the drive section being connected to the frame; wherein the at least one caster wheel and at least one traction drive wheel of the pair of traction drive wheels roll, on a rolling surface effecting autonomous transport robot traversal over the rolling surface, each having a fully independent suspension; and wherein the frame has a predetermined rigidity characteristic defining a transient response of the frame from transient loads imparted to the frame via at least one of the at least one caster wheel and at least one traction drive wheel, the predetermined rigidity characteristic is set based on a predetermined transient response characteristic of the fully independent suspension of at least one of the at least one caster wheel and the at least one traction drive wheel.

In accordance with one or more aspects of the disclosed embodiment the predetermined transient response characteristic of the at least one of the at least one caster wheel and the at least one traction drive wheel is set based on the predetermined rigidity characteristic of the frame.

In accordance with one or more aspects of the disclosed embodiment the integral payload support has a payload seat surface defining a payload datum position that determines a predetermined payload position relative to the autonomous transport robot, and the predetermined rigidity characteristic is set so that transient loads, from transients of the at least one of the at least one caster wheel and at least one traction drive wheel, imparted to the payload on the payload seat surface via the frame, are minimized.

In accordance with one or more aspects of the disclosed embodiment the transient loads are minimized so that the payload unrestrained pose on the payload seat surface is substantially constant in response to the transient loads with the bot rolling on the rolling surface.

In accordance with one or more aspects of the disclosed embodiment the fully independent suspension of the at least one traction drive wheel is configured to maintain a substantially steady state traction contact patch between the at least one traction drive wheel and the rolling surface over each rolling surface transient throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over the each rolling surface transient.

In accordance with one or more aspects of the disclosed embodiment the substantially steady state traction contact patch is disposed at a predetermined reference position of the at least one traction drive wheel substantially independent of transients of the at least one traction drive wheel due to traverse over the each rolling surface transient.

In accordance with one or more aspects of the disclosed embodiment the fully independent suspension is disposed to maintain each of the at least one caster and each of the at least one traction drive wheel in a steady state position relative to the frame during one or more of transients of the transfer arm and with the integral payload support in a loaded and unloaded payload condition.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that the payload datum position, defined by the integral payload support, is at the minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment the predetermined rigidity characteristic is set based on a predetermined transient response characteristic of the fully independent suspension of at least one of the at least one caster wheel and the at least one traction drive wheel with the autonomous transport robot carrying a payload.

In accordance with one or more aspects of the disclosed embodiment a method for an autonomous transport robot is provided, the method comprising: providing the autonomous transport robot with a frame having an integral payload support, the integral payload support having a payload seat surface and defining, with the payload seat surface a payload datum position that determines a predetermined payload position relative to the autonomous transport robot; providing a transfer arm connected to the frame and configured for autonomous transfer of payload to and from the frame; providing at least one caster wheel mounted to the frame; providing a drive section with at least a pair of traction drive wheels astride the drive section, the drive section being connected to the frame; and disposing the at least one caster wheel and at least one traction drive wheel of the pair of traction drive wheels on the frame astride the integral payload support so that the payload seat surface at the payload datum position is disposed at a minimum distance above the rolling surface; wherein the at least one caster wheel and at least one traction drive wheel of the pair of traction drive wheels roll, on a rolling surface effecting autonomous transport robot traversal over the rolling surface, and each of the at least one caster wheel and at least one traction drive wheel of the pair of traction drive wheels having a fully independent suspension.

In accordance with one or more aspects of the disclosed embodiment the autonomous transport robot has fully independent suspension at each of the at least one caster wheel and each traction drive wheel.

In accordance with one or more aspects of the disclosed embodiment the method further comprises, maintaining, with the fully independent suspension of the at least one traction drive wheel, a substantially steady state traction contact patch between the at least one traction drive wheel and the rolling surface over each rolling surface transient throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over the each rolling surface transient.

In accordance with one or more aspects of the disclosed embodiment the substantially steady state traction contact patch is disposed at a predetermined reference position of the at least one traction drive wheel substantially independent of transients of the at least one traction drive wheel due to traverse over the each rolling surface transient.

In accordance with one or more aspects of the disclosed embodiment the method further comprises, disposing the fully independent suspension on the frame to maintain each of the at least one caster and each of the at least one traction drive wheel in a steady state position relative to the frame during one or more of transients of the transfer arm and with the integral payload support in a loaded and unloaded payload condition.

In accordance with one or more aspects of the disclosed embodiment the payload seat surface at the payload datum position is disposed at a minimum distance above the rolling surface.

In accordance with one or more aspects of the disclosed embodiment the at least the pair of traction drive wheels are disposed so that the payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the method further comprises locking the fully independent suspension in a predetermined position relative to the frame.

In accordance with one or more aspects of the disclosed embodiment a method for an autonomous transport robot is provided, the method comprising: providing the autonomous transport robot with a frame having an integral payload support; providing a transfer arm connected to the frame, the transfer arm being configured for autonomous transfer of payload to and from the frame; providing at least one caster wheel mounted to the frame; providing a drive section with at least a pair of traction drive wheels astride the drive section, the drive section being connected to the frame, wherein the at least one caster wheel and at least one traction drive wheel of the pair of traction drive wheels roll, on a rolling surface effecting autonomous transport robot traversal over the rolling surface, each having a fully independent suspension, and wherein the frame has a predetermined rigidity characteristic defining a transient response of the frame from transient loads imparted to the frame via at least one of the at least one caster wheel and at least one traction drive wheel; and setting the predetermined rigidity characteristic based on a predetermined transient response characteristic of the fully independent suspension of at least one of the at least one caster wheel and the at least one traction drive wheel.

In accordance with one or more aspects of the disclosed embodiment the predetermined transient response characteristic of the at least one of the at least one caster wheel and the at least one traction drive wheel is set based on the predetermined rigidity characteristic of the frame.

In accordance with one or more aspects of the disclosed embodiment the predetermined rigidity characteristic is set based on a predetermined transient response characteristic of the fully independent suspension of at least one of the at least one caster wheel and the at least one traction drive wheel with the autonomous transport robot carrying a payload.

In accordance with one or more aspects of the disclosed embodiment the integral payload support has a payload seat surface defining a payload datum position that determines a predetermined payload position relative to the autonomous transport robot, and the predetermined rigidity characteristic is set so that transient loads, from transients of the at least one of the at least one caster wheel and at least one traction drive wheel, imparted to the payload on the payload seat surface via the frame, are minimized.

In accordance with one or more aspects of the disclosed embodiment the transient loads are minimized so that the payload unrestrained pose on the payload seat surface is substantially constant in response to the transient loads with the bot rolling on the rolling surface.

In accordance with one or more aspects of the disclosed embodiment the fully independent suspension of the at least one traction drive wheel is configured to maintain a substantially steady state traction contact patch between the at least one traction drive wheel and the rolling surface over each rolling surface transient throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over the each rolling surface transient.

In accordance with one or more aspects of the disclosed embodiment the substantially steady state traction contact patch is disposed at a predetermined reference position of the at least one traction drive wheel substantially independent of transients of the at least one traction drive wheel due to traverse over the each rolling surface transient.

In accordance with one or more aspects of the disclosed embodiment the fully independent suspension is disposed to maintain each of the at least one caster and each of the at least one traction drive wheel in a steady state position relative to the frame during one or more of transients of the transfer arm and with the integral payload support in a loaded and unloaded payload condition.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that the payload datum position, defined by the integral payload support, is at the minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the method further comprises locking the fully independent suspension in a predetermined position relative to the frame.

In accordance with one or more aspects of the disclosed embodiment an autonomous transport robot for transporting a payload is provided, the autonomous transport robot comprising: a frame with an integral payload support; a transfer arm connected to the frame and configured for autonomous transfer of payload to and from the frame; at least one caster wheel mounted to the frame; and a drive section with at least a pair of traction drive wheels astride the drive section, the drive section being connected to the frame; wherein the at least one caster wheel and at least one traction drive wheel of the pair of traction drive wheels roll, on a rolling surface effecting autonomous transport robot traversal over the rolling surface, each having a fully independent suspension; and wherein the frame has a predetermined rigidity characteristic defining a transient response of the frame from transient loads imparted to the frame via at least one of the at least one caster wheel and at least one traction drive wheel, the predetermined rigidity characteristic is set based on a predetermined transient response characteristic of the frame determining the transient response of the frame from transients of the at least one caster wheel and at least one traction drive wheel of the pair of traction drive wheels rolling on the rolling surface.

In accordance with one or more aspects of the disclosed embodiment the predetermined rigidity characteristic of the frame determines the frame as being substantially rigid relative to the fully independent suspension of the at least one caster wheel and at least one traction drive wheel of the pair of traction drive wheels rolling on the rolling surface.

In accordance with one or more aspects of the disclosed embodiment the integral payload support has a payload seat surface defining a payload datum position that determines a predetermined payload position relative to the autonomous transport robot, and the predetermined rigidity characteristic is set so that transient loads, from the transients of the at least one of the at least one caster wheel and at least one traction drive wheel, imparted to the payload on the payload seat surface via the frame, are minimized.

In accordance with one or more aspects of the disclosed embodiment the transient loads are minimized so that the payload unrestrained pose on the payload seat surface is substantially constant in response to the transient loads with the bot rolling on the rolling surface.

In accordance with one or more aspects of the disclosed embodiment the fully independent suspension of the at least one traction drive wheel is configured to maintain a substantially steady state traction contact patch between the at least one traction drive wheel and the rolling surface over each rolling surface transient throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over the each rolling surface transient.

In accordance with one or more aspects of the disclosed embodiment the substantially steady state traction contact patch is disposed at a predetermined reference position of the at least one traction drive wheel substantially independent of transients of the at least one traction drive wheel due to traverse over the each rolling surface transient.

In accordance with one or more aspects of the disclosed embodiment the fully independent suspension is disposed to maintain each of the at least one caster and each of the at least one traction drive wheel in a steady state position relative to the frame during one or more of transients of the transfer arm and with the integral payload support in a loaded and unloaded payload condition.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that the payload datum position, defined by the integral payload support, is at the minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment the predetermined rigidity characteristic is set based on a predetermined transient response characteristic of the frame with the autonomous transport robot one or more of carrying a payload and unloaded.

In accordance with one or more aspects of the disclosed embodiment an autonomous transport robot for transporting a payload is provided, the autonomous transport robot comprising: a frame with an integral payload support; a drive section with at least a pair of traction drive wheels astride the drive section, the drive section being connected to the frame, the drive section being configured so that each traction drive wheel of the at least the pair of traction drive wheels is separately powered by a corresponding traction motor closely coupled with the respective traction drive wheel, and distinct and separate from each other traction motor of the drive section corresponding to each other traction drive wheel; a multi-input/multi-output controller coupled to the drive section; and wherein the drive section being configured so that each traction drive wheel of the at least the pair of traction drive wheels is separately powered by a corresponding traction motor closely coupled with the respective traction drive wheel, and distinct and separate from each other traction motor of the drive section corresponding to each other traction drive wheel; wherein the multi-input/multi-output controller is configured to determined, based on optimal robot trajectory, a predetermined kinematic characteristic of the autonomous transport robot, and modulates motor applied torque to the traction drive wheel to match traction drive wheel rotation with the predetermined kinematic characteristic of the autonomous transport robot within a predetermined wheel slip characteristic of the traction drive wheel relative to the rolling surface.

In accordance with one or more aspects of the disclosed embodiment the predetermined wheel slip characteristic results in near instantaneous wheel rotation modulation resolving wheel slip of the traction drive wheel based on modulated applied torque commanded by the multi-input/multi-output controller.

In accordance with one or more aspects of the disclosed embodiment the near instantaneous wheel rotation modulation is less than about 10 ms, and about less than 2 ms.

In accordance with one or more aspects of the disclosed embodiment multi-input/multi-output controller is configured to determine modulation of applied torque in response to wheel position data from the wheel position sensor, and to determine relative slip of the traction drive wheel to the rolling surface based on the wheel position data.

In accordance with one or more aspects of the disclosed embodiment each traction drive wheel of the drive section has the corresponding traction motor separately powering the traction drive wheel closely coupled with the respective traction drive wheel.

In accordance with one or more aspects of the disclosed embodiment the at least the pair of traction drive wheels have a fully independent suspension coupling each wheel of the at least the pair of traction drive wheels to the frame, with at least one intervening pivot link between at least one traction drive wheel and the frame configured to maintain a substantially steady state traction contact patch between the at least one traction drive wheel and a rolling surface over rolling surface transients throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the fully independent suspension has a lock configured to lock the fully independent suspension in a predetermined position relative to the frame.

In accordance with one or more aspects of the disclosed embodiment a method for an autonomous transport robot for transporting a payload is provided, the method comprising: providing the autonomous transport robot with: a frame having an integral payload support, a transfer arm connected to the frame and configured for autonomous transfer of payload to and from the frame, at least one caster wheel mounted to the frame, and a drive section with at least a pair of traction drive wheels astride the drive section, the drive section being connected to the frame, wherein the at least one caster wheel and at least one traction drive wheel of the pair of traction drive wheels roll, on a rolling surface effecting autonomous transport robot traversal over the rolling surface, each having a fully independent suspension; and setting a predetermined rigidity characteristic of the frame based on a predetermined transient response characteristic of the frame determining the transient response of the frame from transients of the at least one caster wheel and at least one traction drive wheel of the pair of traction drive wheels rolling on the rolling surface, where the predetermined rigidity characteristic defines a transient response of the frame from transient loads imparted to the frame via at least one of the at least one caster wheel and at least one traction drive wheel.

In accordance with one or more aspects of the disclosed embodiment the predetermined rigidity characteristic of the frame determines the frame as being substantially rigid relative to the fully independent suspension of the at least one caster wheel and at least one traction drive wheel of the pair of traction drive wheels rolling on the rolling surface.

In accordance with one or more aspects of the disclosed embodiment the integral payload support has a payload seat surface defining a payload datum position that determines a predetermined payload position relative to the autonomous transport robot, and the predetermined rigidity characteristic is set so that transient loads, from the transients of the at least one of the at least one caster wheel and at least one traction drive wheel, imparted to the payload on the payload seat surface via the frame, are minimized.

In accordance with one or more aspects of the disclosed embodiment the transient loads are minimized so that the payload unrestrained pose on the payload seat surface is substantially constant in response to the transient loads with the bot rolling on the rolling surface.

In accordance with one or more aspects of the disclosed embodiment the method further comprises maintaining, with the fully independent suspension of the at least one traction drive wheel, a substantially steady state traction contact patch between the at least one traction drive wheel and the rolling surface over each rolling surface transient throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over the each rolling surface transient.

In accordance with one or more aspects of the disclosed embodiment the substantially steady state traction contact patch is disposed at a predetermined reference position of the at least one traction drive wheel substantially independent of transients of the at least one traction drive wheel due to traverse over the each rolling surface transient.

In accordance with one or more aspects of the disclosed embodiment the fully independent suspension is disposed to maintain each of the at least one caster and each of the at least one traction drive wheel in a steady state position relative to the frame during one or more of transients of the transfer arm and with the integral payload support in a loaded and unloaded payload condition.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that the payload datum position, defined by the integral payload support, is at the minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the method further comprises locking the fully independent suspension in a predetermined position relative to the frame.

In accordance with one or more aspects of the disclosed embodiment the method further comprises setting the predetermined rigidity characteristic based on a predetermined transient response characteristic of the frame with the autonomous transport robot carrying a payload.

In accordance with one or more aspects of the disclosed embodiment a method for an autonomous transport robot is provided, the method comprising: providing the autonomous transport robot with: a frame with an integral payload support, and a drive section with at least a pair of traction drive wheels astride the drive section, the drive section being connected to the frame, the drive section being configured so that each traction drive wheel of the at least the pair of traction drive wheels is separately powered by a corresponding traction motor closely coupled with the respective traction drive wheel, and distinct and separate from each other traction motor of the drive section corresponding to each other traction drive wheel; separately powering, with the drive section, each traction drive wheel of the at least the pair of traction drive wheels by a corresponding traction motor closely coupled with the respective traction drive wheel, and distinct and separate from each other traction motor of the drive section corresponding to each other traction drive wheel; and determining, with a multi-input/multi-output controller, based on optimal robot trajectory, a predetermined kinematic characteristic of the autonomous transport robot, and modulating motor applied torque to the traction drive wheel to match traction drive wheel rotation with the predetermined kinematic characteristic of the autonomous transport robot within a predetermined wheel slip characteristic of the traction drive wheel relative to the rolling surface.

In accordance with one or more aspects of the disclosed embodiment the predetermined wheel slip characteristic results in near instantaneous wheel rotation modulation resolving wheel slip of the traction drive wheel based on modulated applied torque commanded by the multi-input/multi-output controller.

In accordance with one or more aspects of the disclosed embodiment the near instantaneous wheel rotation modulation is less than about 10 ms, and about less than 2 ms.

In accordance with one or more aspects of the disclosed embodiment the multi-input/multi-output controller determines modulation of applied torque in response to wheel position data from the wheel position sensor, and to determines relative slip of the traction drive wheel to the rolling surface based on the wheel position data.

In accordance with one or more aspects of the disclosed embodiment each traction drive wheel of the drive section has the corresponding traction motor separately powering the traction drive wheel closely coupled with the respective traction drive wheel.

In accordance with one or more aspects of the disclosed embodiment the at least the pair of traction drive wheels have a fully independent suspension coupling each wheel of the at least the pair of traction drive wheels to the frame, with at least one intervening pivot link between at least one traction drive wheel and the frame, the method further comprising maintaining, with the fully independent suspension a substantially steady state traction contact patch between the at least one traction drive wheel and a rolling surface over rolling surface transients throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof, including the intervening pivot link, define a minimum height profile.

In accordance with one or more aspects of the disclosed embodiment the method further comprises locking the fully independent suspension in a predetermined position relative to the frame.

In accordance with one or more aspects of the disclosed embodiment an autonomous transport robot for transporting a payload is provided, the autonomous transport robot comprising: a frame with an integral payload support; a transfer arm connected to the frame and configured for autonomous transfer of payload to and from the frame; a drive section connected to the frame and having at least a pair of traction drive wheels astride the drive section, the at least the pair of traction drive wheels has a fully independent suspension coupling each traction drive wheel of the at least the pair of traction drive wheels to the frame; and a lock releasably coupled to the fully independent suspension, the lock being configured to lock the fully independent suspension in a predetermined position relative to the frame.

In accordance with one or more aspects of the disclosed embodiment the autonomous transport robot further comprises a controller, the controller is configured to automatically effect: actuation of the lock of a respective fully independent suspension with extension of the transfer arm, and release of the lock of the respective fully independent suspension with retraction of the transfer arm.

In accordance with one or more aspects of the disclosed embodiment the fully independent suspension coupling has at least one intervening pivot link between at least one traction drive wheel and the frame configured to maintain a substantially steady state traction contact patch between the at least one traction drive wheel and a rolling surface over rolling surface transients throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof define a minimum height profile.

In accordance with one or more aspects of the disclosed embodiment a method for an autonomous transport robot is provided, the method comprises: providing the autonomous transport robot with a frame, the frame having an integral payload support; providing the autonomous transport robot with a transfer arm, the transfer arm being connected to the frame and configured for autonomous transfer of payload to and from the frame; providing the autonomous transport robot with a drive section, the drive section being connected to the frame and having at least a pair of traction drive wheels astride the drive section, the at least the pair of traction drive wheels has a fully independent suspension coupling each traction drive wheel of the at least the pair of traction drive wheels to the frame; and locking, with a lock releasably coupled to the fully independent suspension, the fully independent suspension in a predetermined position relative to the frame.

In accordance with one or more aspects of the disclosed embodiment the method further comprises, with a controller, automatically effecting: actuating the lock of a respective fully independent suspension with extension of the transfer arm, and releasing the lock of the respective fully independent suspension with retraction of the transfer arm.

In accordance with one or more aspects of the disclosed embodiment the fully independent suspension has at least one intervening pivot link between at least one traction drive wheel and the frame, the method further comprising maintaining, with the fully independent suspension, a substantially steady state traction contact patch between the at least one traction drive wheel and a rolling surface over rolling surface transients throughout traverse of the at least one traction drive wheel over the rolling surface.

In accordance with one or more aspects of the disclosed embodiment the substantially steady state traction contact patch is disposed at a predetermined reference position of the at least one traction drive wheel throughout traverse of the at least one traction drive wheel over the rolling surface.

In accordance with one or more aspects of the disclosed embodiment the substantially steady state traction contact patch is disposed at a predetermined reference position of the at least one traction drive wheel throughout transient of the at least one traction drive wheel due to traverse over rolling surface transients.

In accordance with one or more aspects of the disclosed embodiment the substantially steady state traction contact patch is disposed at a predetermined reference position of the at least one traction drive wheel substantially independent of transients of the at least one traction drive wheel due to traverse over the rolling surface transients.

In accordance with one or more aspects of the disclosed embodiment the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

In accordance with one or more aspects of the disclosed embodiment the at least the pair of traction drive wheels are disposed so that a payload datum position, defined by the integral payload support, is at a minimum distance above the rolling surface and extends within a height profile of the at least one traction drive wheel.

In accordance with one or more aspects of the disclosed embodiment the height profile of the at least one traction drive wheel and fully independent suspension thereof define a minimum height profile.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous transport robot for transporting a payload, the autonomous transport robot comprising:
   a frame with an integral payload support;
   a transfer arm connected to the frame and configured for autonomous transfer of payload to and from the frame; and
   a drive section with at least a pair of traction drive wheels astride the drive section, the drive section being connected to the frame;
   wherein the at least the pair of traction drive wheels have a fully independent suspension coupling each traction drive wheel of the at least the pair of traction drive wheels to the frame, with at least one intervening pivot link between at least one traction drive wheel and the frame configured to maintain a substantially steady state traction contact patch between the at least one traction drive wheel and a rolling surface over rolling surface transients throughout traverse of the at least one traction drive wheel over the rolling surface.

2. The autonomous transport robot of claim 1, wherein the substantially steady state traction contact patch is disposed at a predetermined reference position of the at least one traction drive wheel throughout traverse of the at least one traction drive wheel over the rolling surface.

3. The autonomous transport robot of claim 1, wherein the substantially steady state traction contact patch is disposed at a predetermined reference position of the at least one traction drive wheel throughout transient of the at least one traction drive wheel due to traverse over rolling surface transients.

4. The autonomous transport robot of claim 1, wherein the substantially steady state traction contact patch is disposed at a predetermined reference position of the at least one traction drive wheel substantially independent of transients of the at least one traction drive wheel due to traverse over the rolling surface transients.

5. The autonomous transport robot of claim 1, wherein the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

6. The autonomous transport robot of claim 1, wherein the at least the pair of traction drive wheels are disposed so that a payload datum position, defined by the integral payload support, is at a minimum distance above the rolling surface and extends within a height profile of the at least one traction drive wheel.

7. The autonomous transport robot of claim 6, wherein the height profile of the at least one traction drive wheel and fully independent suspension thereof, including the intervening pivot link, define a minimum height profile.

8. The autonomous transport robot of claim 1, wherein the fully independent suspension has a lock configured to lock the fully independent suspension in a predetermined position relative to the frame.

9. An autonomous transport robot for transporting a payload, the autonomous transport robot comprising:
  a frame with an integral payload support;
  a transfer arm connected to the frame and configured for autonomous transfer of payload to and from the frame;
  a drive section with at least a pair of traction drive wheels astride the drive section, the drive section being connected to the frame;
  wherein the at least the pair of traction drive wheels have a fully independent suspension coupling each wheel of the at least the pair of traction drive wheels to the frame, with at least one intervening pivot link between at least one traction drive wheel and the frame configured to generate a substantially linear transient response to the at least one traction drive wheel, to rolling over surface transients of a rolling surface in a linear direction substantially normal to the frame throughout each transient.

10. The autonomous transport robot of claim 9, wherein:
  the least one intervening pivot link between the at least one traction drive wheel and the frame is configured to maintain a substantially steady state traction contact patch between the at least one traction drive wheel and the rolling surface over the rolling surface transients throughout traverse of the at least one traction drive wheel over the rolling surface; and
  the substantially steady state traction contact patch is disposed at a predetermined reference position of the at least one traction drive wheel throughout traverse of the at least one traction drive wheel over the rolling surface.

11. The autonomous transport robot of claim 10, wherein the substantially steady state traction contact patch is disposed at a predetermined reference position of the at least one traction drive wheel throughout transient of the at least one traction drive wheel due to traverse over rolling surface transients.

12. The autonomous transport robot of claim 10, wherein the substantially steady state traction contact patch is disposed at a predetermined reference position of the at least one traction drive wheel substantially independent of transients of the at least one traction drive wheel due to traverse over the rolling surface transients.

13. The autonomous transport robot of claim 9, wherein the frame is configured so the integral payload support has a payload seat surface defining a payload datum position that determines a predetermined payload position relative to the autonomous transport robot, and wherein the payload seat surface at the payload datum position is disposed at a minimum distance above the rolling surface.

14. The autonomous transport robot of claim 9, wherein the at least the pair of traction drive wheels are disposed so that a payload datum position, defined by the integral payload support, is at a minimum distance above the rolling surface and extends within a height profile of the at least one traction drive wheel.

15. The autonomous transport robot of claim 14, wherein the height profile of the at least one traction drive wheel and fully independent suspension thereof, including the intervening pivot link, define a minimum height profile.

16. The autonomous transport robot of claim 9, wherein the fully independent suspension has a lock configured to lock the fully independent suspension in a predetermined position relative to the frame.

17. A method for an autonomous transport robot, the method comprising:
  providing the autonomous transport robot with:
    a frame, the frame having an integral payload support,
    a transfer arm connected to the frame, the transfer arm providing autonomous transfer of payload to and from the frame, and
    a drive section with at least a pair of traction drive wheels astride the drive section, where the drive section is connected to the frame; and
  maintaining, with a fully independent suspension coupling each wheel of the at least the pair of traction drive wheels to the frame, a substantially steady state traction contact patch between the at least one traction drive wheel and a rolling surface over rolling surface transients throughout traverse of the at least one traction drive wheel over the rolling surface, wherein the fully independent suspension has at least one intervening pivot link between at least one traction drive wheel and the frame.

18. The method of claim 17, wherein the substantially steady state traction contact patch is disposed at a predetermined reference position of the at least one traction drive wheel throughout traverse of the at least one traction drive wheel over the rolling surface.

19. The method of claim 17, wherein the substantially steady state traction contact patch is disposed at a predetermined reference position of the at least one traction drive wheel throughout transient of the at least one traction drive wheel due to traverse over rolling surface transients.

20. The method of claim 17, wherein the substantially steady state traction contact patch is disposed at a predetermined reference position of the at least one traction drive wheel substantially independent of transients of the at least one traction drive wheel due to traverse over the rolling surface transients.

* * * * *